US007403695B2

(12) United States Patent
Kikuchi et al.

(10) Patent No.: US 7,403,695 B2
(45) Date of Patent: *Jul. 22, 2008

(54) DIGITAL INFORMATION RECORDING/PLAYBACK SYSTEM AND DIGITAL INFORMATION RECORDING MEDIUM

(75) Inventors: Shinichi Kikuchi, Yokohama (JP); Masafumi Tamura, Chofu (JP); Hideo Ando, Hino (JP); Shuichi Hisatomi, Fuchu (JP); Mitsuyuki Nozaki, Toshima-ku (JP); Kazuhiko Taira, Yokohama (JP); Yuji Ito, Ota-ku (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1048 days.

This patent is subject to a terminal disclaimer.

(21) Appl. No.: 10/357,740

(22) Filed: Feb. 5, 2003

(65) Prior Publication Data

US 2003/0147629 A1    Aug. 7, 2003

Related U.S. Application Data

(60) Division of application No. 09/621,812, filed on Jul. 21, 2000, now Pat. No. 6,553,180, which is a continuation of application No. PCT/JP99/00210, filed on Jan. 21, 1999.

(30) Foreign Application Priority Data

Jan. 21, 1998    (JP)    ................................ 10-009907

(51) Int. Cl.
    *H04N 5/781*    (2006.01)

(52) U.S. Cl. .......................... 386/95; 386/111; 386/125
(58) Field of Classification Search .................. 386/33, 386/45, 95, 98, 111–112, 125–126
See application file for complete search history.

(56) References Cited

U.S. PATENT DOCUMENTS 6,434,326 B1 *    8/2002    Kondo et al. ................. 386/125

(Continued)

FOREIGN PATENT DOCUMENTS

EP    0 545 727 A2    6/1993

(Continued)

OTHER PUBLICATIONS

Japanese Office Action (Notification of Reasons for Rejection) re: Patent Application JP 9907/98, Mailing Date: Sep. 17, 2002, Mailing No. 308821 (with English Translation).

(Continued)

*Primary Examiner*—Thai Tran
*Assistant Examiner*—Mishawn Dunn
(74) *Attorney, Agent, or Firm*—Oblon, Spivak, McClelland, Maier & Neustadt, P.C.

(57) ABSTRACT

In a system for recording/playing back video data together with control information, a thumbnail, or thumbnail control information, extracted from a moving picture of a video is used as the control information. The thumbnail control information includes information for generating a thumbnail image which is generated based on the contents of the video data, and information for using the generated thumbnail picture in a menu corresponding to the contents of the video data. The user can create a menu corresponding to the video recorded contents.

5 Claims, 56 Drawing Sheets

U.S. PATENT DOCUMENTS

| | | | |
|---|---|---|---|
| 6,438,315 B1 * | 8/2002 | Suzuki et al. | 386/95 |
| 6,442,333 B1 * | 8/2002 | Izawa | 386/95 |
| 2003/0086568 A1 * | 5/2003 | Kato et al. | 380/201 |
| 2003/0152365 A1 * | 8/2003 | Nagayama | 386/69 |

FOREIGN PATENT DOCUMENTS

| | | |
|---|---|---|
| EP | 677842 A1 | 10/1995 |
| JP | 2-179179 | 7/1990 |
| JP | 3-183091 | 8/1991 |
| JP | 6-44744 | 2/1994 |
| JP | 6-309841 | 11/1994 |
| JP | 7-168855 | 7/1995 |
| JP | 8-111843 | 4/1996 |
| JP | 8-147939 | 6/1996 |
| JP | 8-163507 | 6/1996 |
| JP | 8-298645 A | 11/1996 |
| JP | A-8-298645 | 11/1996 |
| JP | 8-339665 | 12/1996 |
| JP | 9-182019 | 7/1997 |
| JP | 9-247602 | 9/1997 |
| JP | 9-261584 A | 10/1997 |
| JP | A-9-261584 | 10/1997 |
| JP | 10-13773 | 1/1998 |
| JP | 11-176137 | 7/1999 |
| WO | WO 95/12197 | 4/1995 |
| WO | WO 97/07509 | 2/1997 |

OTHER PUBLICATIONS

Korean Office Action (Notification of Request for Filing Opinion) re: Korean Patent Application 10-2000-7007913, Mailing Date: Jun. 25, 2002 (with English translation).

Explanation of Circumstances concerning Accelerated Examination for Japanese Patent Application No. JP 10-009907 (with English translation).

* cited by examiner

PHYSICAL FORMAT INFORMATION

| BYTE POSITION | CONTENTS | NUMBER OF BYTES |
|---|---|---|
| 0 | VERSION | 1 BYTE |
| 1 | DISC SIZE AND MINIMUM READ RATE | 1 BYTE |
| 2 | DISC STRUCTURE | 1 BYTE |
| 3 | RECORDING DENSITY | 1 BYTE |
| 4-15 | DATA AREA ALLOCATION | 12 BYTES |
| 16 | BURST CUTTING AREA (BCA) DESCRIPTOR | 1 BYTE |
| 17-20 | FREE SPACE | 4 BYTES |
| 21-31 | RESERVED | 11 BYTES |
| 32-2047 | RESERVED | 2,016 BYTES |

DIRECTORY RECORD

| RBP | FILE NAME | CONTENTS |
|---|---|---|
| 0 | DIRECTORY RECORD LENGTH | |
| 1 | EXTENT ATTRIBUTE RECORD LENGTH | |
| 2 | EXTENT POSITION | |
| 10 | DATA LENGTH | |
| 18 | RECORDING DATE/TIME (SEE ISO9660 TABLE 9) | |
| 25 | FILE FLAG (SEE ISO9660 TABLE 10) | |
| 26 | FILE UNIT SIZE | |
| 27 | INTERLEAVED GAP SIZE | |
| 28 | VOLUME SEQUENCE NUMBER | |
| 32 | FILE ID LENGTH (LEN_FI) | |
| 33 | FILE ID | |
| | PADDING | |
| | SYSTEM USE (COPYRIGHT MANAGEMENT INFORMATION) | |
| | READ FLAG (PLAYED BACK FLAG) | 0 = NOT PLAYED BACK; 1 = PLAYED BACK |
| | ARCHIVE FLAG (PERMANENT SAVE FLAG) | 0 = FREE; 1 = PERMANENT SAVE |

RBP = RELATIVE BYTE POSITION

FIG. 10

V1 PACK 88A = MAIN PICTURE PACK (MPEG2 VIDEO): STREAM ID = 0xe0
V2 PACK 88B = SEARCH PICTURE PACK (STREAM ID = 0xe1 FOR MPEG2 VIDEO), ETC.

TITLE SEARCH POINTER TABLE TT_SRPT

| BYTE POSITION | SYMBOL | CONTENTS | NUMBER OF BYTES |
|---|---|---|---|
| 0-3 | TT_SRPTI | TT_SRPT INFORMATION | 4 |
| 4-4 | TT_PB_TY | TITLE PLAYBACK TYPE | 1 |
| 5-5 | AGLNs | NUMBER OF ANGLES | 1 |
| 6-7 | PTT_Ns | NUMBER OF PTT (CHAPTERS) | 2 |
| 8-9 | TT_PTL_ID_FLD | PARENTAL ID FIELD | 2 |
| 10-10 | VTSN | VTS NUMBER | 1 |
| 11-11 | VTS_TTN | VTS TITLE NUMBER | 1 |
| 12-15 | VTS_SA | VTS START ADDRESS | 4 |
| 16-16 | USER TITLE MENU FLAG | WHETHER OR NOT TITLE INCLUDES USER MENU 01= PRESENT; 00=ABSENT | 1 |
| 17-18 | MAIN PGC NUMBER | PGC NUMBER OF REPRESENTATIVE THUMBNAIL PICTURE | 2 |
| 19-22 | DISPLAY POSITION (X, Y) | X- AND Y-COORDINATES OF DISPLAY | 4 |
| ⋮ | ⋮ | ⋮ | ⋮ |

FIG. 16

PLAYBACK MANAGEMENT TABLE PLY_MAT

| BYTE POSITION | SYMBOL | CONTENTS | NUMBER OF BYTES |
|---|---|---|---|
| 0-11 | ID | IDENTIFIER | 12 |
| 12-15 | VOBS_SA | VOBS START ADDRESS | 4 |
| 16-19 | VOBS_EA | VOBS END ADDRESS | 4 |
| 20-23 | CTLI_EA | CONTROL INFORMATION END ADDRESS | 4 |
| 24-24 | PLYCI_EA | PLAYBACK CONTROL INFORMATION END ADDRESS | 1 |
| 25-28 | CAT | CATEGORY | 4 |
| 29-30 | V_ATR | VIDEO ATTRIBUTE | 2 |
| 31-32 | AST_Ns | NUMBER OF AUDIO STREAMS | 2 |
| 33-34 | AST_ATRT | AST ATTRIBUTE TABLE | 2 |
| 35-36 | SPST_Ns | NUMBER OF SUB-PICTURE STREAMS | 2 |
| 37-38 | SPST_ATRT | SPST ATTRIBUTE TABLE | 2 |
| 39-39 | USER MENU FLAG | 01 = PRESENT; 00 = ABSENT | 1 |
| 40-40 | MAIN PGC NUMBER | PGC NUMBER OF REPRESENTATIVE THUMBNAIL PICTURE | 1 |
| 41-44 | DISPLAY POSITION (X, Y) | X- AND Y-COORDINATES OF DISPLAY | 4 |
| 45-45 | PLAYBACK END FLAG | 0 = NOT PLAYED BACK; 1 = PLAYED BACK | 1 |

FIG. 18

RECORDING MANAGEMENT TABLE REC_MAT

| BYTE POSITION | SYMBOL | CONTENTS | NUMBER OF BYTES |
|---|---|---|---|
| 0-3 | RECI_EA | RECORDING CONTROL INFORMATION END ADDRESS | 4 |
| 4-7 | REC_MAT_EA | REC_MAT END ADDRESS | 4 |
| 8-11 | FREE_SPACE | FREE SPACE | 4 |
| 12-12 | ARCHIVE FLAG | 0 = FREE; 1 = PERMANENT SAVE | 1 |

FIG. 19

PGC MANAGEMENT INFORMATION PGC_MAI

| BYTE POSITION | SYMBOL | CONTENTS | NUMBER OF BYTES |
|---|---|---|---|
| 0-3 | PGCI_TABLE_EA | PGCI TABLE END ADDRESS | 4 |
| 4-7 | PGC_MAI_EA | PGC MANAGEMENT INFORMATION END ADDRESS | 4 |
| 8-11 | PGC_SRP_SA | PGC SEARCH POINTER START ADDRESS | 4 |
| 12-15 | PGC-SRP_EA | PGC SEARCH POINTER END ADDRESS | 4 |
| 16-19 | PGCI_SA | PGCI START ADDRESS | 4 |
| 20-23 | PGCI_EA | PGCI END ADDRESS | 4 |
| 24-25 | PGC_Ns | TOTAL NUMBER OF PGCs | 2 |

FIG. 20

PGC INFORMATION (PGCI#1 - PGCI#n)

| BYTE POSITION | SYMBOL | CONTENTS | NUMBER OF BYTES |
|---|---|---|---|
| 0-3 | PGC_GI | PGC GENERAL INFORMATION | 4 |
|  | PGC_PGMAP | NUMBER OF ENTRIES OF PROGRAMS |  |
|  | CELL_PLY_INF#1 | PLAYBACK INFORMATION OF CELL#1 | 4 |
|  | ⋮ | ⋮ |  |
|  | CELL_PLY_INF#m | PLAYBACK INFORMATION OF CELL#m | 4 |

FIG. 21

PGC GENERAL INFORMATION PGC_GI

| BYTE POSITION | SYMBOL | CONTENTS | NUMBER OF BYTES |
|---|---|---|---|
| 0-3 | PGC_CNT | PGC CONTENTS | 4 |
| 4-7 | PGC_PB_TM | PGC PLAYBACK TIME | 4 |
| 8-23 | PGC_AST_CTLT | PGC AUDIO STREAM CONTROL TABLE | 16 |
| 24-151 | PGC_SPST_CTLT | PGC SUB-PICTURE STREAM CONTROL TABLE | 128 |
| 152-159 | PGC_NV_CTL | PGC NAVIGATION CONTROL | 8 |
| 160-223 | PGC_SP_PLT | SUB-PICTURE PALLET TABLE | 64 |
| 224-225 | PGC_PGMAP_SA | PGC PROGRAM MAP START ADDRESS | 2 |
| 226-227 | CELL_PLY_I_SA | CELL PLAYBACK INFORMATION START ADDRESS | 2 |
| 228-229 | CELL_Ns | NUMBER OF USED CELLS | 2 |
| 230-230 | PGC MENU DATA EXISTENCE FLAG | 01 = PRESENT; 00 = ABSENT | 1 |
| 231-234 | DISPLAY POSITION (X, Y) | X- AND Y-COORDINATES OF DISPLAY | 4 |
| 235-235 | PLAYBACK END FLAG | 0 = NOT PLAYED BACK; 1 = PLAYED BACK | 1 |
| 236-236 | ARCHIVE FLAG | 0 = FREE; 1 = PERMANENT SAVE | 1 |

FIG. 22

CELL PLAYBACK INFORMATION CELL_PLY_INF

| BYTE POSITION | SYMBOL | CONTENTS | NUMBER OF BYTES |
|---|---|---|---|
| 0-3 | C_CAT | CELL CATEGORY | 4 |
| 4-7 | C_PBTM | CELL PLAYBACK TIME | 4 |
| 8-8 | PLAYBACK END FLAG | 0 = NOT PLAYED BACK; 1 = PLAYED BACK | 1 |
| 9-9 | ARCHIVE FLAG | 0 = FREE; 1 = PERMANENT SAVE | 1 |
| 10-12 | CELL_SA | CELL START ADDRESS | 4 |
| 13-16 | CELL_EA | CELL END ADDRESS | 4 |

FIG. 23

VIDEO TITLE SET INFORMATION VTSI

| VIDEO TITLE SET INFORMATION MANAGEMENT TABLE VTSI_MAT (MANDATORY) |
| --- |
| VIDEO TITLE SET PART-OF-TITLE SEARCH POINTER TABLE VTS_PTT_SRPT (MANDATORY) |
| VIDEO TITLE SET PROGRAM CHAIN INFORMATION TABLE VTS_PGCIT (MANDATORY) |
| VIDEO TITLE SET MENU PROGRAM CHAIN INFORMATION UNIT TABLE VTSM_PGCI_UT (OPTION) |
| VIDEO TITLE SET TIME MAP TABLE VTS_TMAPT (OPTION) |
| VIDEO TITLE SET MENU CELL ADDRESS TABLE VTSM_C_ADT (MANDATORY WHEN VTSM_VOBS IS PRESENT) |
| VIDEO TITLE SET MENU VIDEO OBJECT UNIT ADDRESS MAP VTSM_VOBU_ADMAP (MANDATORY WHEN VTSM_VOBS IS PRESENT) |
| VIDEO TITLE SET CELL ADDRESS TABLE VTS_C_ADT (MANDATORY) |
| VIDEO TITLE SET VIDEO OBJECT UNIT ADDRESS MAP VTS_VOBU_ADMAP (MANDATORY) |

| VIDEO TITLE SET PROGRAM CHAIN INFORMATION TABLE INFORMATION VTS_PGCITI |
| --- |
| VIDEO TITLE SET PROGRAM CHAIN INFORMATION SEARCH POINTER #1 VTS_PGCI_SRP#1 |
| ⋮ |
| VIDEO TITLE SET PROGRAM CHAIN INFORMATION SEARCH POINTER #n VTS_PGCI_SRP#n |
| VIDEO TITLE SET PROGRAM CHAIN INFORMATION VTS_PGCI |
| ⋮ |
| VIDEO TITLE SET PROGRAM CHAIN INFORMATION VTS_PGCI |

| CELL PLAYBACK INFORMATION #1 (C_PBI#1) |
| --- |
| CELL PLAYBACK INFORMATION #2 (C_PBI#2) |
| ⋮ |
| CELL PLAYBACK INFORMATION #n (C_PBI#n) |

| PROGRAM CHAIN GENERAL INFORMATION PGC_GI |
| --- |
| PGC_CMDT |
| PGC_PGMAP |
| CELL PLAYBACK INFORMATION TABLE C_PBIT |
| C_POSIT |

FIG. 24

PROGRAM CHAIN GENERAL INFORMATION PGC_GI

| BYTE POSITION | SYMBOL | CONTENTS | NUMBER OF BYTES |
|---|---|---|---|
| 0-3 | PGC_CNT | PGC CONTENTS | 4 |
| 4-7 | PGC_PB_TM | PGC PLAYBACK TIME | 4 |
| 8-11 | PGC_UOP_CTL | PGC USER OPERATION CONTROL | 4 |
| 12-27 | PGC_AST_CTLT | PGC AUDIO STREAM CONTROL TABLE | 16 |
| 28-115 | PGC_SPST_CTLT | PGC SUB-PICTURE STREAM CONTROL TABLE | 128 |
| 156-163 | PGC_NV_CTL | PGC NAVIGATION CONTROL | 8 |
| 164-227 | PGC_SP_PLT | PGC SUB-PICTURE PALLET | 4×16 |
| 228-229 | PGC_CMDT_SA | PGC COMMAND TABLE START ADDRESS | 2 |
| 230-231 | PGC_PGMAP_SA | PGC PROGRAM MAP START ADDRESS | 2 |
| 232-233 | C_PBIT_SA | CELL PLAYBACK INFORMATION START ADDRESS | 2 |
| 234-235 | C_POSIT_SA | CELL POSITION INFORMATION TABLE START ADDRESS | 2 |
| 236-236 | PGC MENU DATA EXISTENCE FLAG | WHETHER OR NOT USER MENU DATA IS INCLUDED 01=PRESENT; 00=ABSENT | 1 |
| 237-240 | DISPLAY POSITION (X, Y) | X- AND Y-COORDINATES OF DISPLAY | 4 |
| | | | TOTAL 241 BYTES |

FIG. 25

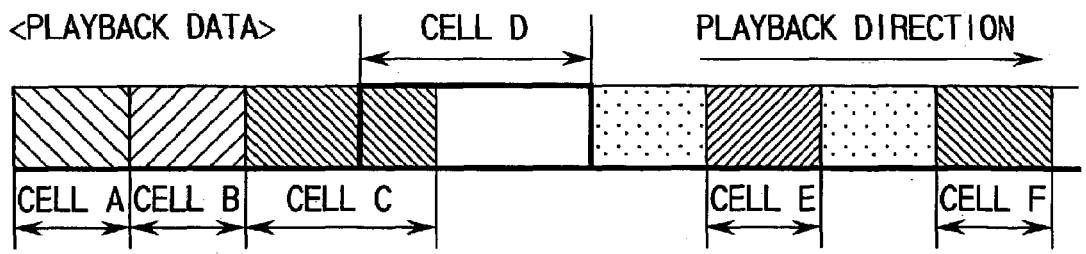
FIG. 26
PGC INFORMATION
| PGC#1 | | PGC#2 | | PGC#3 | |
|---|---|---|---|---|---|
| NUMBER OF CELLS = 3 | | NUMBER OF CELLS = 3 | | NUMBER OF CELLS = 5 | |
| CELL#1 | CELL A | CELL#1 | CELL D | CELL#1 | CELL E |
| CELL#2 | CELL B | CELL#2 | CELL E | CELL#2 | CELL A |
| CELL#3 | CELL C | CELL#3 | CELL F | CELL#3 | CELL D |
| — | — | — | — | CELL#4 | CELL B |
| — | — | — | — | CELL#5 | CELL E |
FIG. 27
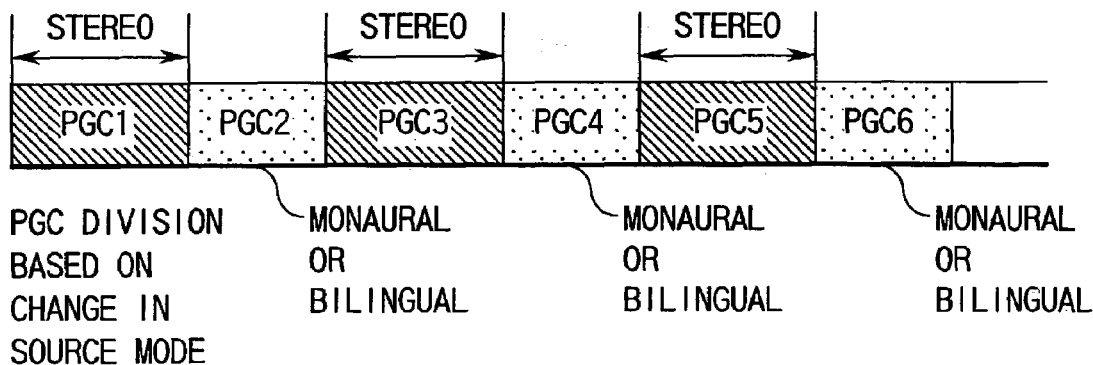
FIG. 28

PGC DIVISION BASED ON ELAPSE OF SET TIME

PGC DIVISION BASED ON MANUAL MARKER

PGC DIVISION BASED ON USER ACTION

PGC DIVISION BASED ON SCENE CORRESPONDING TO ABRUPT CHANGE IN PICTURE

NOTE= WHEN SEQUENCE END CODE (000001B7) IS ADDED, PACKET LENGTH IS CHANGED ACCORDINGLY.

| DESCRIPTOR | CONTENTS | NUMBER OF BYTES |
|---|---|---|
| FIRST ANCHOR POINTER FOR PICTURE ADDRESS TABLE (32kbytes) | | |
| | PICTURE ADDRESS TABLE START POSITION (LOGICAL SECTOR NUMBER OF START POSITION FROM HEAD OF MENU FILE) | 2 |
| | PICTURE ADDRESS TABLE END POSITION (LOGICAL SECTOR NUMBER OF END POSITION FROM HEAD OF MENU FILE) | 2 |
| | AUXILIARY PICTURE ADDRESS TABLE START POSITION (LOGICAL SECTOR NUMBER OF START POSITION FROM HEAD OF MENU FILE) | 2 |
| | AUXILIARY PICTURE ADDRESS TABLE END POSITION (LOGICAL SECTOR NUMBER OF END POSITION FROM HEAD OF MENU FILE) | 2 |
| | PADDING | 32k-8 |
| PICTURE ADDRESS TABLE (32kbytes×N) | | |
| | MENU INDEX INFORMATION | |
| | | NUMBER OF INDEX PICTURES | 2 |
| | | NUMBER OF INFORMATION PICTURES | 2 |
| | | NUMBER OF SLIDE & STILL PICTURES | 2 |
| | | NUMBER OF DEFECTIVE AREAS | 2 |
| | | NUMBER OF WALLPAPER PICTURES | 1 |
| | INDEX PICTURE INFORMATION | |
| | | CONTENT CHARACTERISTIC = 1 (1 = STILL PICTURE INFORMATION ALREADY RECORDED; 0 = ONLY VTS ADDRESS DESIGNATION POINTER) | 1 |
| | | ID OF INDEX PICTURE PGC | 4 |
| | | TIME CODE OF INDEX PICTURE (TIME CODE OF INDEX PICTURE DESIGNATION POSITION) | 4 |
| | | INDEX PICTURE START POSITION (LOGICAL SECTOR NUMBER OF RECORDING START POSITION FROM HEAD OF MENU FILE) | 2 |
| | | NUMBER OF USED SECTORS UPON RECORDING INDEX PICTURE | 1 |
| | | PICTURE SIZE (PICTURE SIZE: X, Y) | 6 |
| | | ADDRESS OF ORIGINAL AV DATA | 4 |
| | | TEXT DATA (FOR SEARCH) | 40 |
| | INDEX PICTURE INFORMATION (CONTENTS ARE THE SAME AS ABOVE) (66bytes) | |

FIG. 37

| | | |
|---|---|---|
| INDEX PICTURE INFORMATION (CONTENTS ARE THE SAME AS ABOVE) (66bytes) | | |
| INDEX PICTURE INFORMATION (CONTENTS ARE THE SAME AS ABOVE) (66bytes) | | |
| INDEX PICTURE INFORMATION (DESIGNATE PICTURE BY ONLY ADDRESS) | | |
| | CONTENT CHARACTERISTIC = 0 ( 0 = ONLY VTS ADDRESS DESIGNATION POINTER; 1 = STILL PICTURE INFORMATION ALREADY RECORDED) | 1 |
| | | |
| | | |
| | ID OF SLIDE & STILL PICTURE PGC | 4 |
| | ADDRESS OF ORIGINAL AV DATA | 4 |
| | TIME CODE OF SLIDE & STILL PICTURE (TIME CODE VALUE IN VTS INDICATING RECORDED POSITION) | 4 |
| DEFECTIVE AREA INFORMATION | | |
| | | |
| WALLPAPER PICTURE INFORMATION | | |
| | NUMBER OF WALLPAPER PICTURE (REGISTRATION NUMBER OF BACKGROUND PICTURE) | 1 |
| | WALLPAPER PICTURE START POSITION (LOGICAL SECTOR NUMBER OF CORRESPONDING WALLPAPER RECORDING START POSITION FROM HEAD OF MENU FILE) | 2 |
| | NUMBER OF USED SECTORS OF AREA WHERE WALLPAPER PICTURE IS RECORDED | 1 |
| PADDING (TO ASSURE 32k×N bytes IN PICTURE ADDRESS TABLE) | | |
| | CONTENTS OF INDEX PICTURE | 32k |
| | CONTENTS OF INDEX PICTURE | 32k |
| | CONTENTS OF INDEX PICTURE | 64k |
| | CONTENTS OF INDEX PICTURE | 32k |
| | DEFECTIVE AREA | 32k |
| | CONTENTS OF WALLPAPER PICTURE | 96k |
| SECOND ANCHOR POINTER FOR PICTURE ADDRESS TABLE (10bytes) | | |
| | PICTURE ADDRESS TABLE START POSITION (LOGICAL SECTOR NUMBER OF START POSITION FROM HEAD OF MENU FILE) | 2 |
| | PICTURE ADDRESS TABLE END POSITION (LOGICAL SECTOR NUMBER OF END POSITION FROM HEAD OF MENU FILE) | 2 |
| | RESERVED PICTURE ADDRESS TABLE START POSITION (LOGICAL SECTOR NUMBER FROM HEAD OF FIRST MENU FILE) | 2 |
| | RESERVED PICTURE ADDRESS TABLE END POSITION (LOGICAL SECTOR NUMBER FROM HEAD OF LAST MENU FILE) | 2 |

FIG. 38

COUNT TRIGGER POINT tb OF COUNTER 31

(NOTE = EMBODIMENT WITHOUT NAVIGATION PACK)

DIGITAL INFORMATION RECORDING/PLAYBACK SYSTEM AND DIGITAL INFORMATION RECORDING MEDIUM

CROSS REFERENCE TO RELATED APPLICATIONS

This is a continuation of Application No. PCT/JP99/00210, filed Jan. 21, 1999.

This application is based upon and claims the benefit of priority from the prior Japanese Patent Application No. 10-009907, filed Jan. 21, 1998, the entire contents of which are incorporated herein by reference.

BACKGROUND OF THE INVENTION

The present invention relates to a digital information recording/playback system which allows the user to create a menu corresponding to recorded contents, and an information recording medium used in this system.

In particular, the present invention relates to a digital information recording/playback system which has a function of supporting the user to create a visual menu that partially uses actual recorded contents (a still picture, a short movie, or the like), and an information recording medium used in this system.

DESCRIPTION OF PRIOR ART

In recent years, systems for playing back the contents of optical discs that have recorded video (moving picture) data; audio data, and the like have been developed, and have prevailed for the purpose of playing back movie software, karaoke, and so on like LDs (laser discs), video CDs (video compact discs), and the like.

Among such systems, a DVD (Digital Versatile Disc) standard that uses MPEG2 (Moving Picture Experts Group) international standard, and adopts an audio compression scheme such as AC-3 (digital audio compression) or the like has been proposed. The DVD standard includes read-only DVD video (or DVD-ROM), write-once DVD-R, and erasable/rewritable DVD-RW (or DVD-RAM).

The DVD video standard supports MPEG2 as a movie compression scheme, and AC3 audio and MPEG audio in addition to linear PCM as an audio recording scheme, in accordance with MPEG2 system layer. Furthermore, this DVD video standard is configured by appending sub-picture data for superimposed dialogs obtained by runlength-compressing bitmap data, and control data (navigation data) for playback control such as fastforwarding, rewinding, data search, and the like. Also, this standard supports ISO9660 and UDF Bridge format to allow a computer to read data.

An optical disc currently used as a DVD video (DVD-ROM) disc is a single-sided, single-layered 12-cm disc, which has a storage size of around 4.7 GB (gigabytes). A single-sided, double-layered disc has a storage size of around 9.5 GB, and a double-sided, double-layered disc allows large size recording of around 18 GB (when a laser having a wavelength of 650 nm is used to read).

On the other hand, an optical disc currently used as a DVD-RW (DVD-RAM) disc is a 12-cm disc, which has a storage size of around 2.6 GB (gigabytes) in case of a single-sided disc, and a storage size of 5.2 GB in case of a double-sided disc. Currently available DVD-RAM optical discs have a smaller storage size than DVD-ROM discs of equivalent size. However, technical developments for increasing the DVD-RAM disc storage size are being incessantly made, and DVD-RAM discs having a storage size of 4.7 GB or more per side will definitely become commercially available in the near future.

In the DVD video standard, a video manager menu (VMG menu) and video title set menu (VTS menu) are prepared as disc search menu pictures for contents providers (companies that produce contents, i.e., titles recorded on DVD discs).

A DVD video disc records video data (main picture) including video (moving picture) data as principal part of the recorded contents, and sub-picture data including auxiliary information such as superimposed dialogs and the like. The VMG menu or VTS menu is formed by some video data (still picture or short movie), and buttons (visual markers used by the user to select a selection item in the menu) using sub-picture data.

In this menu, a menu background and menu selection items are displayed by a still picture of main picture data, and a specific portion of sub-picture data is emphasized and displayed in a predetermined color, so that the user can visually recognize a specific menu selection item. The emphasized display portion using the sub-picture data serves as a button. The user can select a desired selection item using the button.

An example of a menu in DVD video will be explained below. Assume a menu for a single movie title divided into five chapters. In this case, five mini pictures obtained by reducing still pictures of starting portions of the respective chapters are output onto a single menu screen. A button is formed by a frame that fringes one of the five mini screens in a specific color (e.g., green). This green button frame can move on the menu by operating cursor keys of a remote controller of a DVD video player.

When the user wants to play back the movie from chapter 3, he or she moves the green button frame to a position where the frame surrounds the mini picture of chapter 3 by operating cursors. When the user then presses an enter button on the remote controller, the color of the button frame that surrounds the mini picture of chapter 3 changes from green to another color (e.g., red), and the user can confirm that selection of chapter 3 has been settled. At the same time, the DVD player searches for the recorded position of chapter 3, and starts video playback from chapter 3.

The aforementioned chapter search can be implemented by the visual menu that uses the main picture background and sub-picture button. That is, when a plurality of dedicated menu pictures (mini pictures described above) obtained by adding a sub-picture button to normal video data are prepared, the user can play back the scene of the selected chapter by selecting the button.

(Problem)

However, a title creator must create all the dedicated menu pictures by himself or herself. In order to specially create such menu pictures (background picture, selection item pictures corresponding to the mini pictures), elaborate edit processes are required. However, it is difficult for the users of home-use DVD video recorders to perform such elaborate edit processes (which are complicated and troublesome, and are too much for elder or underage users).

In case of read-only DVD video, since the number of recorded titles remains the same, a menu need not be changed once it is created. However, when the number of recorded titles increases/decreases like in a DVD video recorder (DVD-RAM or DVD-RW) that can erase and rewrite data more than once, every time the number of titles changes, the entire menu screen must often be re-created. Such menu re-creation (or modification of the already created menu) is also troublesome for general users.

(Object)

It is an object of the present invention to provide a digital information recording/playback system which allows the user to create a menu corresponding to the recorded contents, and an information recording medium used in this system.

BRIEF SUMMARY OF THE INVENTION

In order to achieve the above object, a digital information recording/playback system of the present invention uses at least thumbnail picture control information as control information upon recording/playing back video data and the control information. At this time, the thumbnail picture control information includes information for generating a thumbnail picture generated based on contents of the video data, and information for using the generated thumbnail picture in a menu corresponding to the contents of the video data.

Also, in order to achieve the above object, a digital information recording medium of the present invention, which records video data and control information, includes at least thumbnail picture control information as the control information; and the thumbnail picture information includes information for generating a thumbnail picture generated based on contents of the video data, and information for using the generated thumbnail picture in a menu corresponding to the contents of the video data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a table for explaining an example of a directory record corresponding to the directory structure shown in FIG. 9;

FIG. 16 is a table for explaining the contents of title search pointer table TT_SRPT shown in FIG. 15;

FIG. 18 is a table for explaining the contents of playback management table PLY_MAT shown in FIG. 3;

FIG. 19 is a table for explaining the contents of recording management table REC_MAT shown in FIG. 3;

FIG. 20 is a table for explaining the contents of PGC management information PGC_MAI shown in FIG. 3;

FIG. 21 is a table for explaining the contents of PGC Information PGCI shown in FIG. 3;

FIG. 22 is a table for explaining the contents of PGC general information PGC_GI shown in FIG. 21;

FIG. 23 is a table for explaining the contents of cell playback information CELL_PLY_INF shown in FIG. 21;

FIG. 24 is a view for explaining the contents of video title set program chain information table VTSI_PGCIT shown in FIG. 17;

FIG. 25 is a table for explaining the contents of program chain general information PGC_GI shown in FIG. 24;

FIG. 26 is a view for explaining a playback process of cell data recorded on the disc shown in FIG. 1;

FIG. 27 is a table for explaining an example of the relationship between cells that form playback data shown in FIG. 26 and program chain information;

FIG. 28 is a view for explaining the first example of a method of determining a divide point of video contents recorded on the disc shown in FIG. 1;

FIG. 37 is a table (part 1) for explaining a practical example of the file structure of a menu created by the user of the video contents recorded on the disc shown in FIG. 1;

FIG. 38 is a table (part 2) for explaining a practical example of the file structure of a menu created by the user of the video contents recorded on the disc shown in FIG. 1;

DETAILED DESCRIPTION OF THE INVENTION

A digital information recording/playback system according to an embodiment of the present invention will be explained hereinafter with reference to the accompanying drawings.

As a typical embodiment of a digital information recording/playback system according to the present invention, an apparatus which records/plays back moving picture data encoded based on MPEG2, e.g., a DVD video recorder, is known. (A practical example of this DVD digital video recorder will be explained later.)

Figure 1:
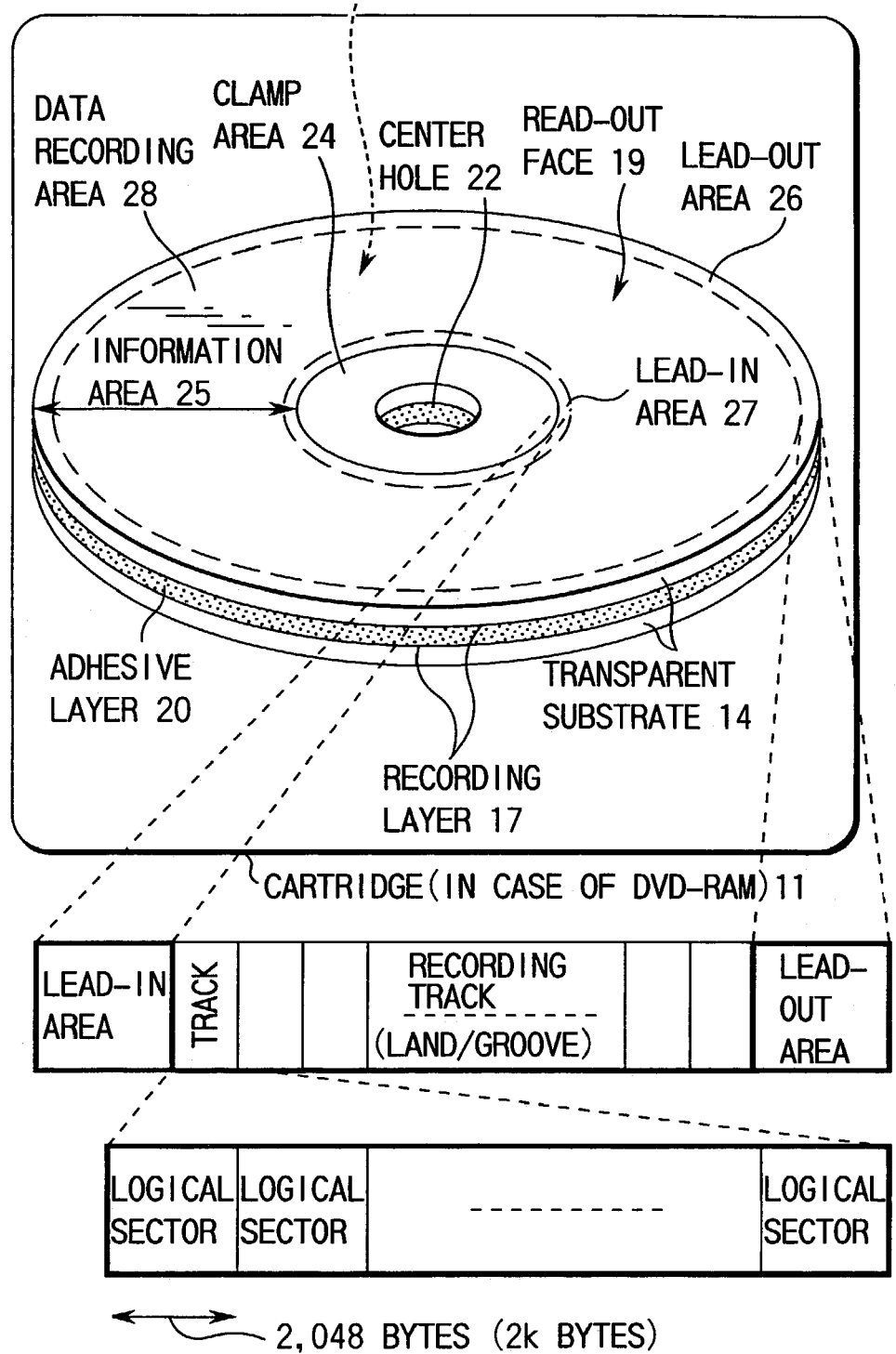
FIG. 1 is a view for explaining the structure of a recordable/reproducible optical disc (DVD-RAM/DVD-RW or DVD-R disc), and the correspondence between data recorded on a data recording area and recording tracks.

FIG. 1 is a perspective view for explaining the structure of recordable optical disc 10 used in the DVD digital video recorder.

As shown in FIG. 1, optical disc 10 has a structure obtained by adhering a pair of transparent substrates 14 each having recording layer 17 using adhesive layer 20. Each substrate 14 can be formed of a 0.6-mm thick polycarbonate film, and adhesive layer 20 can consist of a very thin (e.g., 40 μm to 70 μm thick) ultraviolet setting resin. When these pair of 0.6-mm thick substrates 14 are adhered to each other so that their recording layers 17 contact each other on the surfaces of adhesive layer 20, a 1.2-mm thick large-size optical disc 10 is obtained.

Optical disc 10 has center hole 22, and clamp areas 24 used to clamp optical disc 10 upon its rotation are formed around center hole 22 on the two surfaces of the disc. Center hole 22 receives the spindle of a disc motor when disc 10 is loaded into a disc drive device (not shown). Optical disc 10 is clamped at its clamp areas 24 by a disc damper (not shown) during disc rotation.

Optical disc 10 has information areas 25 that can record information such as video data, audio data, and the like around clamp areas 24.

In each information area 25, lead-out area 26 is assured on the outer periphery side. Also, lead-in area 27 is assured on the inner periphery side of area 25 that contacts clamp area 24. The area between lead-out and lead-in areas 26 and 27 is defined as data recording area 28.

On recording layer (light reflection layer) 17 of information area 25, a recording track is continuously formed in, e.g., a spiral pattern. The continuous track is divided into a plurality of physical sectors, which have serial numbers. Various data are recorded on optical disc 10 using those sectors as recording units.

Data recording area 28 serves as an actual data recording area, and records video data (main picture data) such as a movie or the like, sub-picture data such as superimposed dialogs, menus, and the like, and audio data such as words, effect sounds, and the like as recording/playback information in the form of similar pit trains (physical shapes or phase states that bring about optical change in laser reflected light).

When optical disc 10 is a double-sided recording RAM disc in which each surface has one recording layer, each recording layer 17 can be formed by three layers, i.e., by sandwiching a phase-change recording material layer (e.g., $Ge_2Sb_2Te_5$) between two zinc sulfide.silicon oxide ($ZnS$-$SiO_2$) mixture layers.

When optical disc 10 is a single-sided recording RAM disc in which each surface has one recording layer, recording layer 17 on the side of read-out face 19 can be formed by three layers including the aforementioned phase-change recording material layer. In this case, layer 17 on the side opposite to read-out face 19 need not be an information recording layer but may merely be a dummy layer.

When optical disc 10 is a single-sided read type double-layered RAM/ROM disc, two recording layers 17 can comprise a single phase-change recording layer (on the side farther from read-out face 19; read/write), and a single semi-transparent metal reflection layer (on the side closer to read-out face 19; read-only).

When optical disc 10 is a write-once DVD-R, a polycarbonate substrate is used, gold can be used as a reflection layer (not shown), and an ultraviolet setting resin can be used as a protection layer (not shown). In this case, an organic dye is used in recording layer 17. As the organic dyes, cyanine, squarilium, chroconic, and triphenylmenthane dyes, xanthene and quinone dyes (naphthoquinone, anthraquinone, and the like), metal complex dyes (phthalocyanine, porphyrin, dithiol complex, and the like), and so forth can be used.

Data can be written on such DVD-R disc using a semiconductor laser having a wavelength of 650 nm and an output of around 6 to 12 mW.

When optical disc 10 is a single-sided read type double-layered ROM disc, two recording layers 17 can comprise a single metal reflection layer (on the side farther from read-out face 19), and a single semi-transparent metal reflection layer (on the side closer to read-out face 19).

On read-only DVD-ROM disc 10, pit trains are formed in advance on substrate 14 by a stamper, a reflection layer of a metal or the like is formed on the surface of substrate 14 on which the pit trains are formed, and the reflection layer is used as recording layer 17. On such DVD-ROM disc 10, grooves as recording tracks are not particularly formed, and the pit trains formed on the surface of substrate 14 serve as tracks.

In various types of optical discs 10 described above, read-only ROM information is recorded on recording layer 17 as an embossed pattern signal. By contrast, no such embossed pattern signal is formed on substrate 14 having read/write (or write-once) recording layer 17, and a continuous groove is formed instead. A phase-change recording layer is formed on such groove. In case of a read/write DVD-RAM disc, the phase-change recording layer in land portions is also used for information recording in addition to the groove.

When optical disc 10 is of single-sided read type (independently of one or two recording layers), substrate 14 on the rear side viewed from read-out face 19 need not always be transparent to the read/write laser beam used. In this case, a label may be printed on the entire surface of substrate 14 on the rear side.

A DVD digital video recorder (to be described later) can be designed to attain write many/read many (read/write) for a DVD-RAM disc (or DVD-RW disc), write once/read many for a DVD-R disc, and read many for a DVD-ROM disc.

FIG. 1 also exemplifies the correspondence between data recording area 28 of optical disc (DVD-RAM) 10 and recording tracks of data recorded there.

When disc 10 is a DVD-RAM (or DVD-RW), disc 10 itself is stored in cartridge 11 to protect its delicate disc surface. When DVD-RAM disc 10 in cartridge 11 is inserted into the disc drive of a DVD video recorder (to be described later), disc 10 is pulled out from cartridge 11, is clamped by the turntable of a spindle motor (not shown), and is rotated to face an optical head (not shown).

On the other hand, when disc 10 is a DVD-R or DVD-ROM, disc 10 itself is not stored in cartridge 11, and bare disc 10 is directly set on the disc tray of a disc drive.

Recording layer 17 of information area 25 is formed with a continuous data recording track in a spiral pattern. The continuous track is segmented into a plurality of logical sectors (minimum recording units) each having a given storage size, and data are recorded with reference to these logical sectors.

The recording size per logical sector is determined to be 2,048 bytes (or 2 kbytes) which are equal to one pack data length. (to be described later).

Data recording area 28 is an actual data recording area, which similarly records management data, main picture (video) data, sub-picture data, and/or audio data.

Note that data recording area 28 of disc 10 can be segmented into a plurality of ring-shaped (annular) recording areas (a plurality of recording zones), although not shown. The disc rotational velocity varies in units of recording zones. However, within each zone, a constant linear or angular velocity can be set. In this case, an auxiliary recording area (free space) can be provided for each zone. These free spaces in units of zones may collectively form a reserve area for that disc 10.

Figure 2:
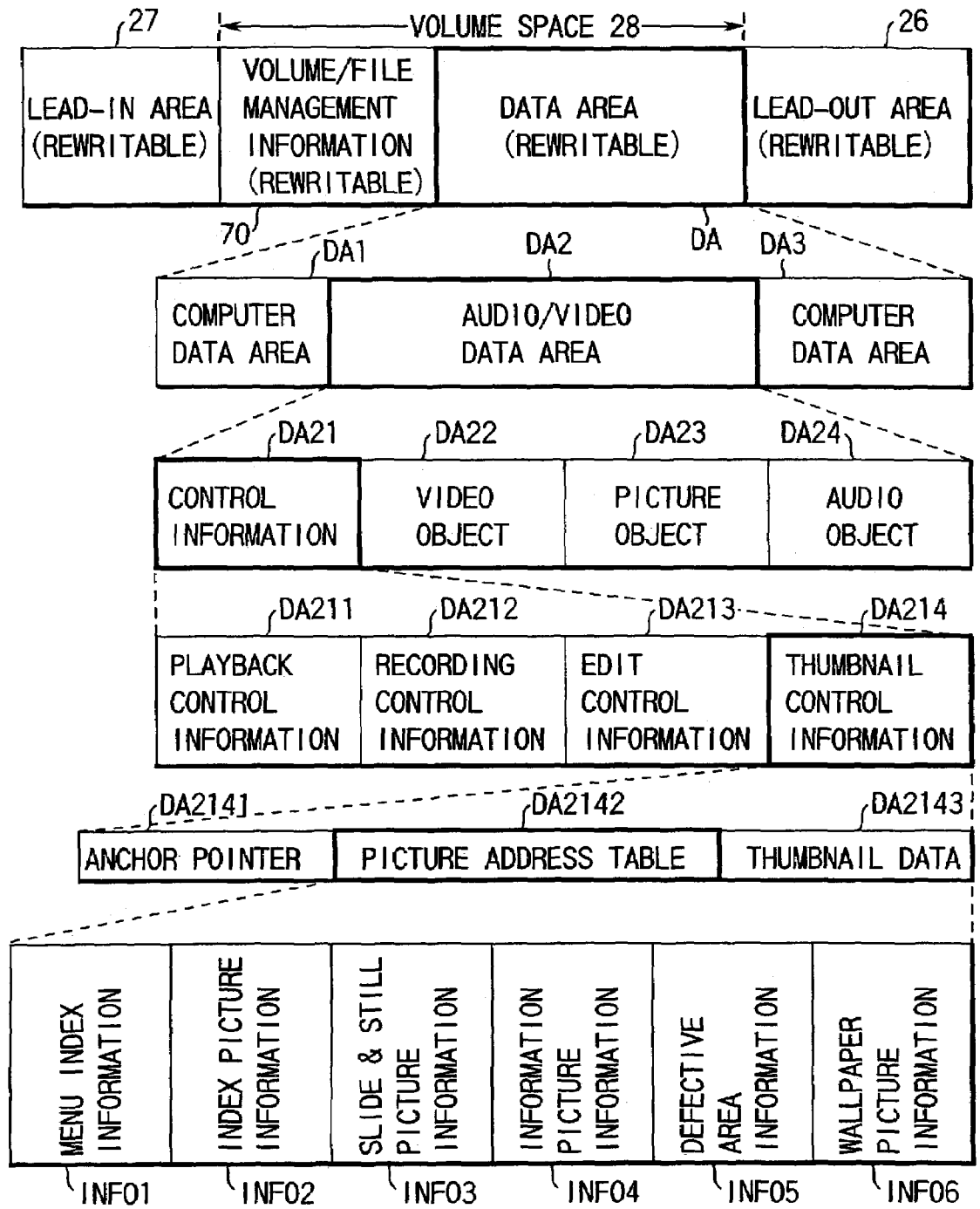
FIG. 2 is a view for explaining an example of the hierarchical structure of information recorded on the optical disc shown in FIG. 1.

FIG. 2 is a view for explaining an example of the hierarchical structure of information recorded on optical disc 10 (DVD-RAM or DVD-RW disc) shown in FIG. 1.

Lead-in area 27 includes an embossed data zone whose light reflection surface has an embossed pattern, a mirror zone whose surface is flat (mirror surface), and a rewritable data zone capable of information rewrites.

Data recording area (volume space) 28 is comprised of volume/file management information 70 and data area DA, which can be rewritten by the user. Data area DA records computer data, video data, audio data, and the like. Volume/file management information 70 records file information of audio/video data recorded on data area DA, and information that pertains to the entire volume.

Lead-out area 26 is also capable of information rewrites.

The embossed data zone of lead-in area 27 records, for example, in advance:

(1) information which pertains to the entire information storage medium: the disc type (a DVD-ROM, DVD-RAM (or DVD-RW), DVD-R, or the like); disc size (12 cm, 8 cm, or the like); recording density; physical sector numbers indicating the recording start/end positions, and the like;

(2) information which pertains to the recording/playback/erasure characteristics: the recording power and recording pulse width; erase power; playback power; linear velocity upon recording and erasure, and the like; and (3) information which pertains to the manufacture of each information storage medium: the manufacturing number and the like.

The rewritable zone of each of lead-in area 27 and lead-out area 26, for example, includes:

(4) a field for recording a unique disc name of each information recording medium;

(5) a test recording field (for confirming recording/erasure conditions); and (6) a field for recording management information that pertains to defective fields in data area DA.

On fields (4) to (6), a DVD recording apparatus (a DVD video recorder or the like) can record information.

Data area DA can record audio/video data DA2 and computer data DA1 and DA3 together.

Note that the recording order, recording information size, and the like of computer data and audio/video data are arbitrary. Data area DA can record computer data or audio/video data alone.

Audio/video data area DA2 includes control information DA21, video object DA22, picture object DA23, and audio object DA24.

Control information DA21 can include control information required upon executing various processes such as recording (video recording and/or audio recording), playback, edit, search, and the like.

Video object DA22 can include information of the contents of recorded video data.

Picture object DA23 can include still picture information such as still pictures, slide pictures, and the like.

Audio object DA24 can include information of the contents of recorded audio data.

Note that recording information of the playback target (contents) of audio/video data is included in video object set VOBS (to be described later).

Control information DA21 includes playback control information DA211, recording control information DA212, edit control information DA213, and thumbnail picture control information DA214.

Playback control information DA211 includes control information required upon playback.

Recording control information DA212 includes control information required upon recording (video recording and/or audio recording).

Edit control information DA213 includes control information required upon edit.

Thumbnail picture control information DA214 includes management information that pertains to thumbnail pictures used to search for a scene that the user wants to see in video data or those to be edited, and thumbnail picture data (corresponding to DA2143).

Thumbnail picture control information DA214 can include anchor pointer DA2141, picture address table DA2142, and thumbnail picture data DA2143. (Anchor pointer DA2141 will be explained later.)

Thumbnail picture control information DA214 can also include, as lower-layer information of picture address table DA2142 and thumbnail picture data 2143, menu index information INFO1, index picture information INFO2, slide & still picture information INFO3, information picture information INFO4, defective area information INFO5, and wallpaper picture information INFO6.

Figure 3:
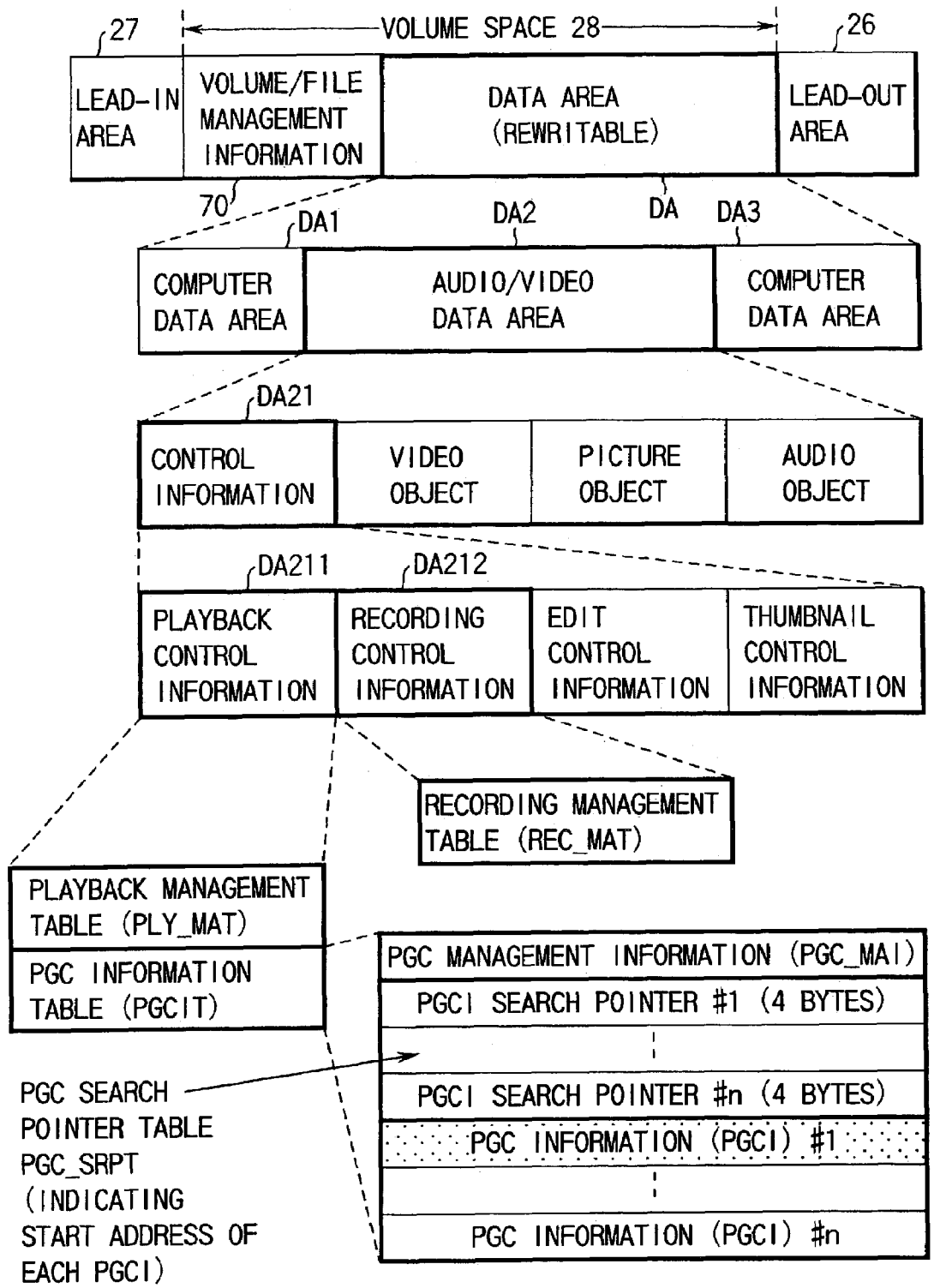
FIG. 3 is a view for explaining the information hierarchical structure shown in FIG. 2 in more detail.

FIG. 3 is a view for explaining the information hierarchical structure in FIG. 2 in more detail. FIG. 3 exemplifies the configuration of playback control information DA211.

That is, playback control information DA211 comprises playback management table PLY_MAT and program chain management table PGCIT. (Details of playback management table PLY_MAT will be described later.)

Program chain management table PGCIT includes program chain management information PGC_MAI (to be described in detail later), program chain search pointer table PGC_SRPT consisting of one or more program chain information search pointers PGCI_SRP#1 to PGCI_SRP#n, and one or more pieces of program chain information PGCI#1 to PGCI#n (to be described in detail later). Each PGCI search pointer has a 4-byte size, and points to the start address of each program chain information PGCI.

Note that PGC designates the cell playback order, and indicates a unit for implementing playback of a series of cells. Each cell indicates a playback period that designates playback data by its start and end addresses. The playback order of contents of audio/video data area DA2 is determined by program chain PGC and cells.

Note that recording control information DA212 comprises recording management table REC_MAT (to be described in detail later).

Figure 4:
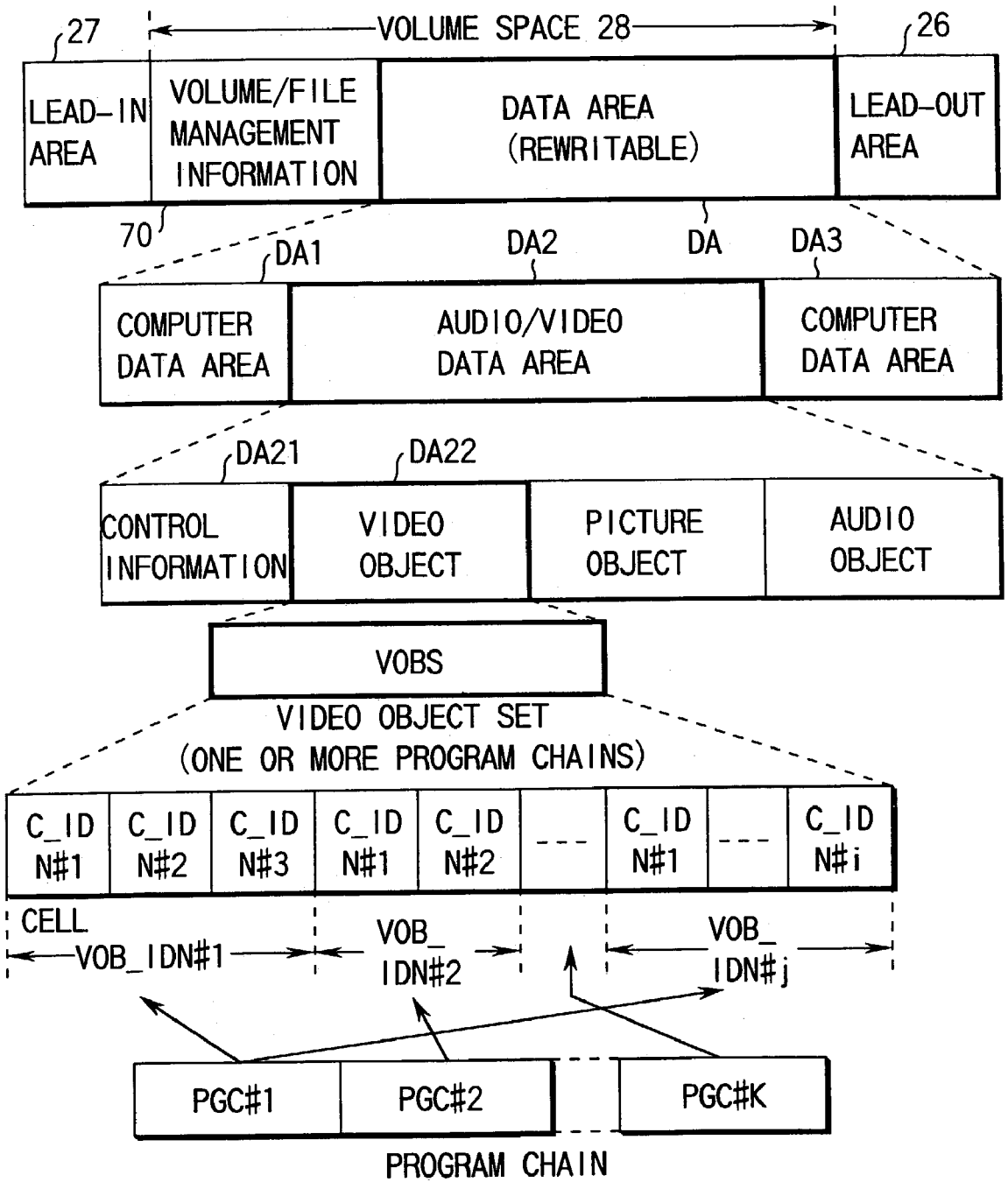
FIG. 4 is a view that exemplifies an example of the correspondence between the cell configuration of a video object and program chain PGC in the information hierarchical structure shown in FIG. 2.

FIG. 4 exemplifies the correspondence between the cell configuration of a video object and program chain PGC in the information hierarchical structure shown in FIG. 2. This information hierarchical structure does not handle an information unit "video title set VTS" unlike a case (in case of a DVD video ROM) to be described later with reference to FIG.

5. On the other hand, the functions of video manager information VMGI and video title set information VTSI are combined into control information DA21.

In the information hierarchical structure shown in FIG. 4, video object DA22 is comprised of video object set VOBS. This VOBS has contents corresponding to one or more program chains PGC#1 to PGC#k which respectively designate the cell playback order in different methods.

Figure 5:
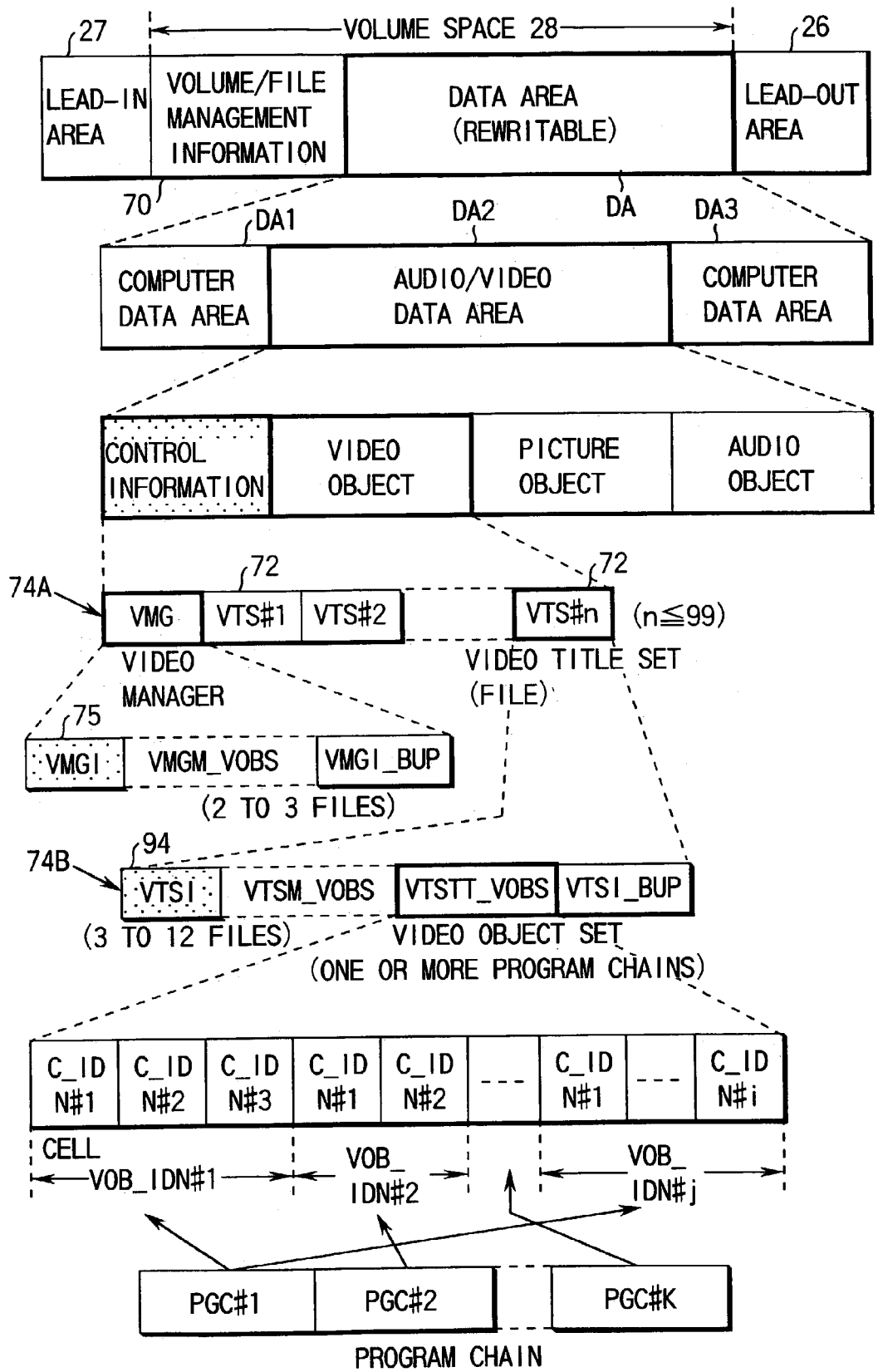
FIG. 5 is a view for explaining another example of the hierarchical structure of information recorded on the optical disc shown in FIG. 1.

FIG. 5 is a view for explaining the hierarchical structure of information recorded on optical disc (e.g. DVD-R disc) 10 shown in FIG. 1.

Data recording area 28 formed on optical disc 10 shown in FIG. 1 can have a structure shown in FIG. 5. The logical format of this structure is defined to comply with the ISO9660 and Universal Disc Format. (UDF) Bridge as one of standard formats.

Data recording area 28 from lead-in area 27 to lead-out area 26 is assigned as a volume space. Volume space 28 can include space (volume/file management information) 70 for information of the volume and file structures, and rewritable data area DA consisting of a space for audio/video applications (audio/video data), and a space for other applications (computer data).

Volume space 28 is physically segmented into a large number of sectors, which have serial numbers. The logical addresses of data recorded on this volume space (data recording area) 28 mean logical sector numbers, as specified by the ISO9660 and UDF Bridge. The logical sector size in this space is 2,048 bytes (2 kbytes) as in the effective data size of the physical sector. The logical sector numbers are assigned serial numbers in ascending order of physical sector number.

That is, volume space 28 has a hierarchical structure, and includes volume/file management information 70, computer data area DA1, audio/video data area DA2, and computer data area DA3. These data areas are split up on the boundaries of logical sectors. Note that one logical sector is defined to be 2,048 bytes, and one logical block is also defined to be 2,048 bytes. Hence, one logical sector is defined equivalently with one logical block. Note that each physical sector is appended with error correction information and the like unlike logical sectors. For this reason, the physical sector size does not strictly match the logical sector size.

Volume/file management information 70 corresponds to a management area defined by the UDF Bridge. Based on the description of this area 70, the contents of video manager VMG are stored in an internal system memory (not shown) of the DVD video recorder (to be described later).

In a layer below audio/video data area DA2, control information, video object, picture object, and audio object shown in FIG. 2 are allocated. The control information and video object respectively correspond to video manager VMG file 74A, and a file including one or more video title sets VTS#1 to VTS#n 72.

In FIG. 5, video manager VMG consists of a plurality of files 74A. Each file 74A describes information (video manager information VMGI 75, video object set VMGM_VOBS for a video manager menu, video manager information backup file VMGI_BUP) for managing video title sets (VTS#1 to VTS#n) 72.

Each video title set VTS 72 stores video data compressed based on the MPEG standard (a video pack to be described later), audio data compressed based on a predetermined standard or non-compressed audio data (an audio pack to be described later), and sub-picture data (a sub-picture pack to be described later; including bitmap data, one pixel of which is defined by a plurality of bits), and information for playing back these data (a navigation pack to be described later; including presentation control information PCI and data search information DSI).

Note that an embodiment that does not use any navigation pack is available, and will be explained later with reference to FIG. 72.

Video title set VTS 72 also consists of a plurality of files 74B as in video manager VMG. This file 74B includes video title set information VTSI 94, object set VTSM_VOBS for a video title set menu, video object set VTSTT_VOBS for a video title set title, and backup VTSI_BUP of video title set information.

In this case, the number of video title sets VTS (VTS#1 to VTS#n) 72 is limited to a maximum of 99, and the number of files 74B that form each video title set VTS 72 is determined to be a maximum of 12. These files 74A and 74B are similarly split up at the boundaries of the logical sectors.

Control information in a lower layer of audio/video data area DA2 corresponds to video manager information VMGI 75 and video title set information VTSI 94 in terms of its function.

As will be described later, video object set VTSTT_VOBS for a video title set title defines a set of one or more video objects VOB. Each VOB defines a set of one or more cells. A set of one or more cells forms program chain PGC.

Assuming that one PGC corresponds to one drama, a plurality of cells that make up this PGC can be taken to correspond to various scenes in that drama. The contents of PGC (or contents of a cell) are determined by a software provider (or a software producer including the apparatus user) who produces the contents to be recorded on disc 10.

Figure 6:
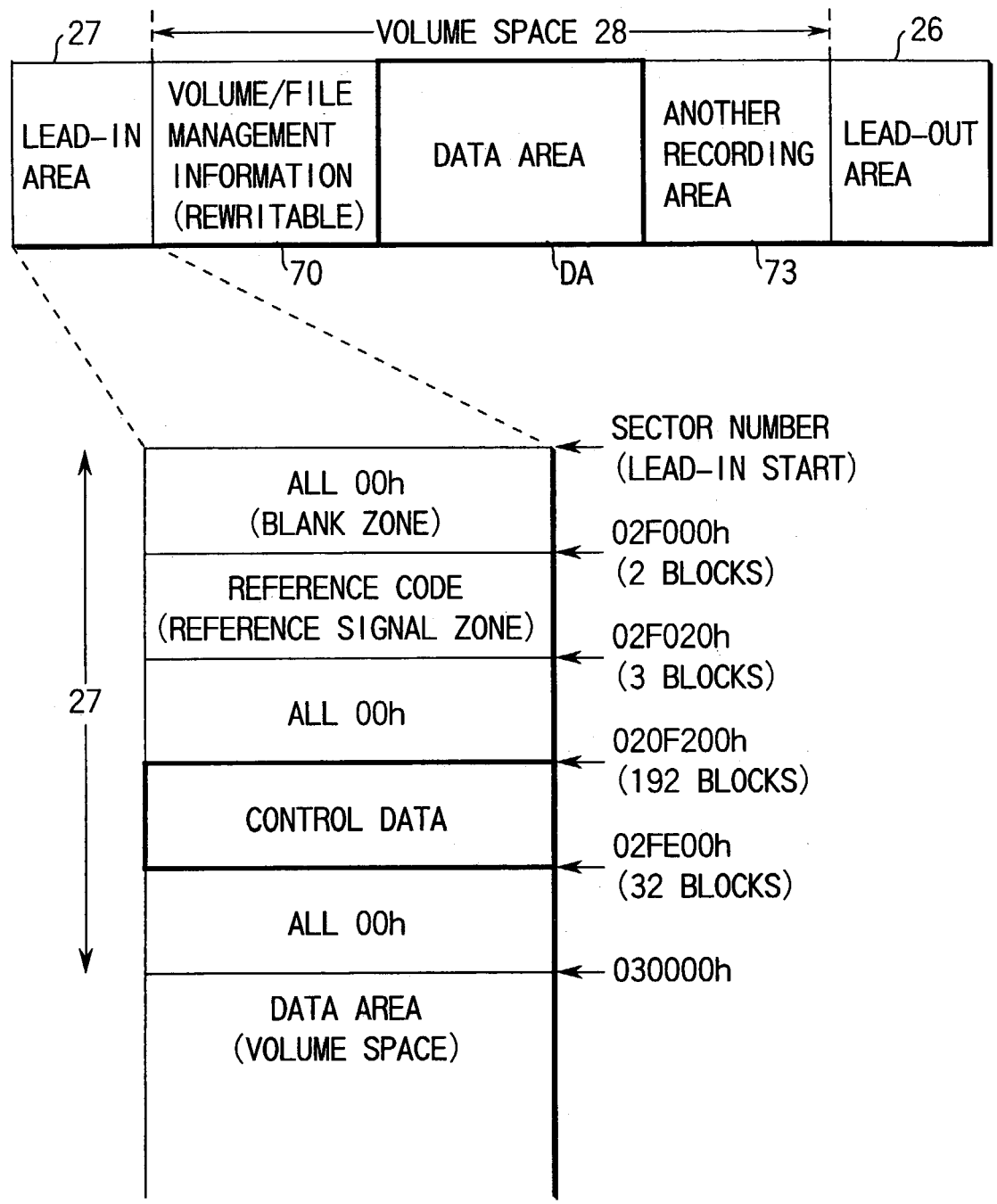
FIG. 6 is a view for explaining the logical structure of information (lead-in area) recorded on the optical disc shown in FIG. 1.

FIG. 6 is a view for explaining information recorded on lead-in area 27 of optical disc 10. When disc 10 is set in a DVD video recorder to be described later (or a DV video player; not shown), information in lead-in area 27 is read first. Lead-in area 27 records a predetermined reference code and control data in ascending order of sector number.

The reference code in lead-in area 27 consists of two error correction code blocks (ECC blocks). Each ECC block has 16 sectors. These two ECC blocks (32 sectors) are generated by appending scramble data. Upon playing back the reference code appended with the scramble data, filter operation or the like on the playback side is done to play back a specific data symbol (e.g., 172) to assure precision in subsequent data reads.

Control data in lead-in area 27 is made up of 192 ECC blocks. In this control data field, the contents for 16 sectors in the respective blocks are repetitively recorded 192 times.

Figures 7, 8:
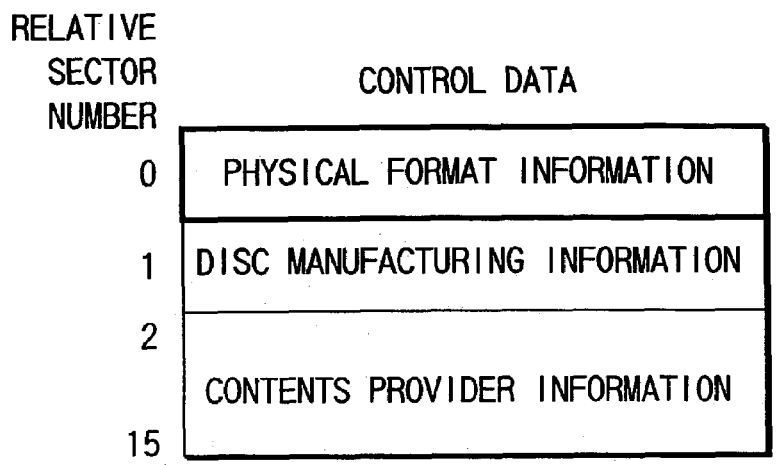
FIG. 7 is a table for explaining an example of the contents of control data recorded on the lead-in area shown in FIG. 6.
FIG. 8 is a table for explaining an example of the contents of physical format information included in the control data shown in FIG. 7.

FIG. 7 shows the contents of control data in lead-in area 27. This control data consisting of 16 sectors contains physical format information in the first sector (2,048 bytes), and disc manufacturing information and contents provider information in the subsequent sectors.

FIG. 8 shows the contents of 2,048-byte physical format information contained in the control data shown in FIG. 7.

That is, the first byte position "0" describes the version of the DVD standard which the recording information complies with.

The second byte position "1" describes the size (12 cm, 8 cm, or the like) of the recording medium (optical disc 10) and minimum read rate. In case of read-only DVD video, 2.52 Mbps, 5.04 Mbps, and 10.08 Mbps are specified as minimum read rates, and other minimum read rates are reserved. For example, when video recording is done at an average bit rate of 2 Mbps by a DVD video recorder capable of variable bit-rate recording, the minimum read rate can be set at 1.5 to 1.8 Mbps using the reserved field.

The third byte position "2" describes the disc structure (the number of recording layers, track pitch, type of recording layer, and the like) of the recording medium (optical disc 10). Based on the type of recording layer, it can be identified if that disc 10 is a DVD-ROM, DVD-R, or DVD-RAM (DVD-RW).

The fourth byte position "3" describes the recording density (linear density and track density) of the recording medium (optical disc 10). The linear density indicates the recording length per bit (0.267 μm/bit, 0.293 μm/bit, or the like). The track density indicates the spacing between neighboring tracks (0.74 μm/track, 0.80 μm/track, or the like). The fourth byte position "3" includes a reserved field to designate other numerical values as linear and track densities for a DVD-RAM or DVD-R.

The fifth byte position "4 to 15" describes the start and end sector numbers and the like of data area 28 of the recording medium (optical disc 10).

The sixth byte position "16" describes a burst cutting area (BCA) descriptor. This BCA applies to only a DVD-ROM disc as an option, and is an area for storing recording information after completion of the disc manufacturing process.

The seventh byte position "17 to 20" describes a free space of the recording medium (optical disc 10). For example, when disc 10 is a single-sided, single-layered recording DVD-RAM disc, information indicating 2.6 GB (or the number of sectors corresponding to this number of bytes) is described at this location of disc 10. When disc 10 is a double-sided recording DVD-RAM disc, information indicating 5.2 GB (or the number of sectors corresponding to this number of bytes) is described at that location.

The eighth byte position "21 to 31" and the ninth byte position "32 to 2047" are reserved for future use.

Figure 9:
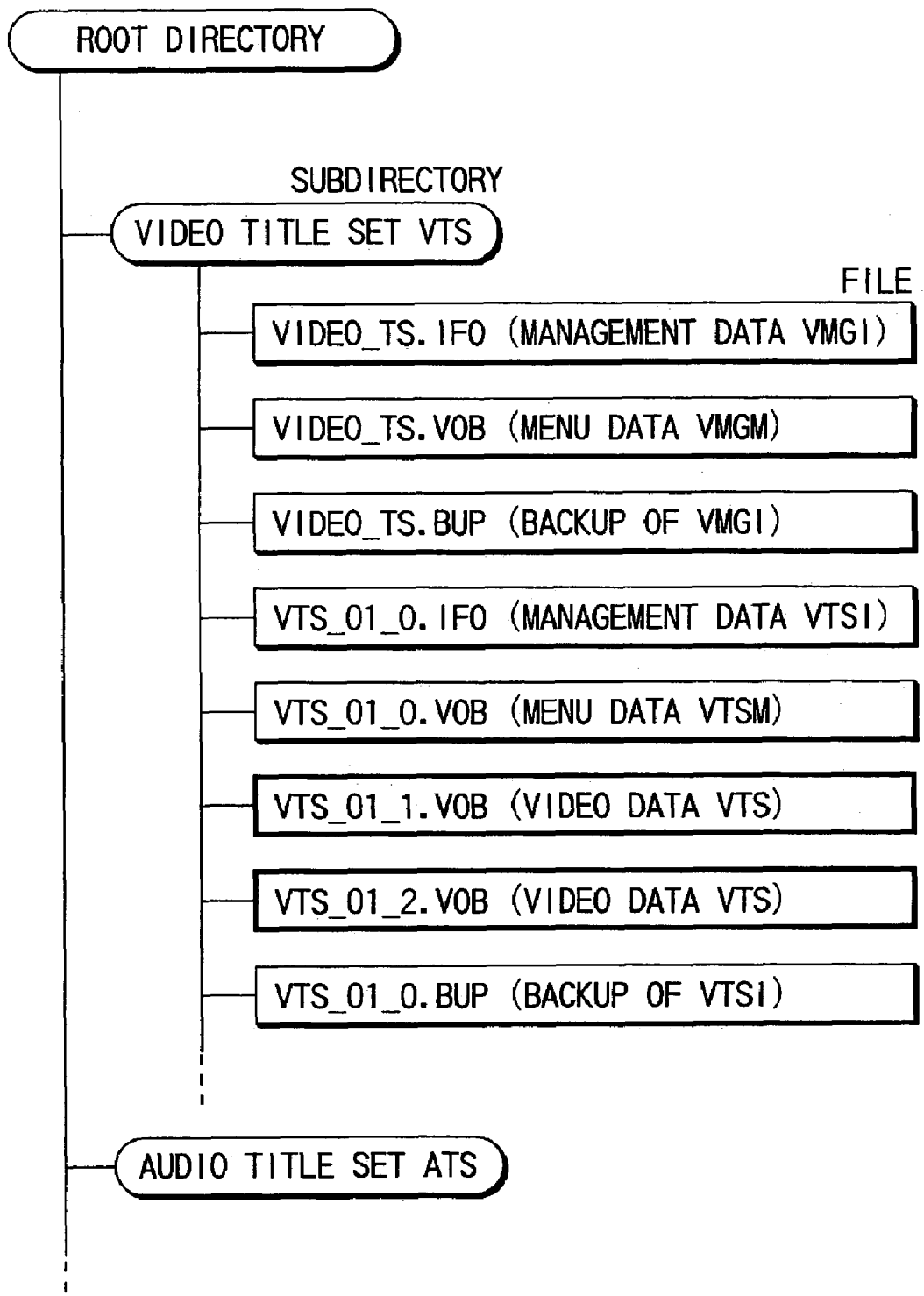
FIG. 9 is a view for explaining an example of the directory structure of information (data files) recorded on the optical disc shown in FIG. 1.

FIG. 9 exemplifies the directory structure of information (data files) recorded on optical disc 10. When the hierarchical structure shown in FIG. 5 is adopted, the subdirectory of video title set VTS and that of audio title set ATS are linked under the root directory as in the hierarchical file structure adopted by a versatile operating system of a computer. Various video files (files VMGI, VMGM, VTSI, VTSM, VTS, and the like) are contained in the subdirectory of VTS and managed systematically. A specific file (e.g., specific VTS) can be accessed by designating the path from the root directory to that file.

On the other hand, when the hierarchical structure shown in FIGS. 2 to 4 is adopted, the subdirectory of audio/video data replaces that of video title set VTS.

The subdirectory of audio/video data stores (a) a file of control information DA21 in place of files of video manager information VMGI, video title set information VTSI, video manager menu data VMGM, and video title set menu data VTSM, and (b) files of video object DA22, picture object DA2, and audio object DA24 in place of video data VTS.

A specific file (e.g., specific control information) can be accessed by designating the path from the root directory to that file.

DVD-RAM (DVD-RW) disc 10 or DVD-R disc 10 shown in FIG. 1 may be pre-formatted to have the directory structure shown in FIG. 9, and pre-formatted discs 10 may be put on the market as unused discs (raw discs) for DVD video recording.

For example, the root directory of pre-formatted raw disc 10 can include a subdirectory named "video title set" or "audio/video data". This subdirectory can also include a menu data file (VMGM, VTSM, thumbnail picture control information DA214, or the like) for storing predetermined menu information.

FIG. 10 shows the contents of directory records corresponding to the directory structure shown in FIG. 9.

The first relative byte position "0" describes the directory record length.

The second relative byte position "1" describes the record length of an assigned extent attribute.

The third relative byte position "2" describes the first logical sector number assigned to an extent.

The fourth relative byte position "10" describes the data length of the file field.

The fifth relative byte position "18" describes the recording date/time of information in the extent described in the directory record. Data at the relative byte position "18" can be used to record the recording date/time of a video-recorded program (corresponding to specific VTS or specific audio/video data) in the DVD video recorder.

The sixth relative byte position "25" describes a file flag indicating the characteristics of files specified in Table 10 of ISO9660.

The seventh relative byte position "25" describes the file unit size assigned to the file field.

The eighth relative byte position "27" describes the interleaved gap size assigned to the file field.

The ninth relative byte position "28" describes the volume sequence number in the volume set on the extent described in the directory record.

The 10th relative byte position "32" describes the file ID field length of the directory record.

The 11th relative byte position "33" describes the file ID or the directory specified by ISO9660.

Next to the file ID, a padding field serving as stuffing when the file ID field has an even-byte length is described.

Next to the padding field, copyright management information used by the system is described.

After the copyright management information, a read flag (or played back flag) indicating whether or not a specific recorded file (e.g., VTS_01_1.VOB in FIG. 9) has been read out once (or whether or not that file has been played back at least once previously) is described. The read flag for a file which is not yet read out is set at "0". If the file has been read out at least once, the read file of that file is set at "1".

Next to the read flag, an archive flag (or permanent save flag) indicating whether or not a specific recorded file has contents to be saved permanently (or contents that are prevented from being erroneously erased) is described. The archive flag for a file which can be erased is set at "0". The archive flag for a file which is to be saved permanently without being erased is set at "1".

Figure 11:
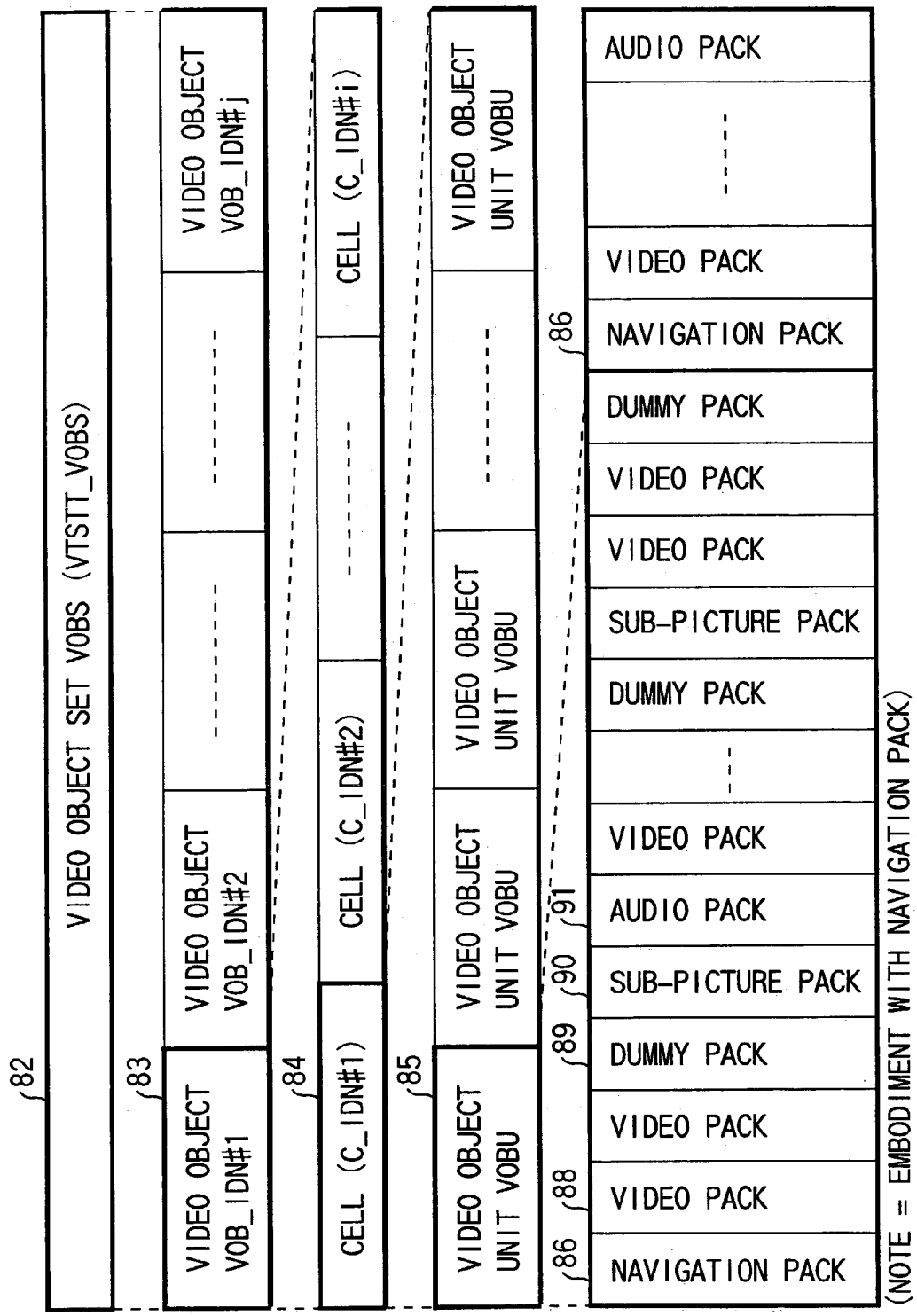
FIG. 11 is a view showing an example of the hierarchical structure of information included in video object set VOBS shown in FIG. 5.

FIG. 11 shows the hierarchical structure of information contained in video object set VTSTT_VOBS shown in FIG. 5.

As shown in FIG. 11, each cell 84 consists of one or more video object units (VOBU) 85. Each video object unit 85 is constituted as a set (pack sequence) of video packs (V packs) 88, sub-picture packs (SP packs) 90, and audio packs (A packs) 91 to have navigation pack (NV pack) 86 at the beginning of the sequence. That is, video object unit VOBU 85 is defined as a set of all packs recorded from certain navigation pack 86 to a pack immediately before the next navigation pack 86.

Each of these packs serves as a minimum unit for data transfer. The minimum unit for logical processing is a cell, and logical processing is done in units of cells.

Navigation pack 86 is built in each video object unit VOBU 85 to seamlessly or non-seamlessly change the angle to any one of various camera angles of multi-angle video data.

The playback time of video object unit VOBU 85 corresponds to that of video data made up of one or more picture groups (groups of pictures; to be abbreviated as GOPs), and is set to fall within the range from 0.4 sec to 1.2 sec. One GOP is screen data which normally has a playback time of about 0.5 sec in the MPEG format, and is compressed to play back approximately 15 frame pictures during this interval.

When video object unit VOBU 85 includes video data, a video datastream is formed by arranging GOPs (complying with MPEG) each consisting of video packs 88, sub-picture packs 90, and audio packs 91. However, independently of the number of GOPs, video object unit VOBU 85 is defined with reference to the playback time of GOPs, and navigation pack 86 is always set at the beginning of unit 85 in the embodiment shown in FIG. 11.

Even playback data consisting of audio data and/or sub-picture data alone is formed using video object unit VOBU 85 as one unit. For example, when video object unit VOBU 85 is formed by audio packs 91 alone to have navigation pack 86 at its beginning, audio packs 91 to be played back in the playback time of video object unit VOBU 85 to which the audio data belong are stored in that video object unit VOBU 85 as in video object VOB 83 of video data.

When a DVD video recorder can record video title set VTS containing VOBS 82 with the structure shown in FIG. 11 on optical disc 10, the user often wants to edit the recorded contents after this VTS is recorded. In order to meet such requirement, dummy packs 89 can be appropriately inserted in each VOBU 85. Each dummy pack 89 can be used to record edit data later.

As shown in FIG. 11, video object set (VTSTT_VOBS) 82 is defined as a set of one or more video objects (VOB) 83. Video objects VOB 83 in video object set VOBS 82 are used for the same purpose.

VOBS 82 for a menu normally consists of one VOB 83, which stores a plurality of menu screen display data. By contrast, VOBS 82 for a title set normally consists of a plurality of VOBs 83.

Taking a concert video title of a certain rock band as an example, VOBs 83 that form video object set VTSTT_VOBS for a title set correspond to picture data of the performance of that band. In this case, by designating given VOB 83, for example, the third tune in the concert of that band can be played back.

VOB 83 that forms video object set VTSM_VOBS for a menu stores menu data of all the tunes performed in the concert of the band, and a specific tune, e.g., an encore, can be played back according to the menu display.

Note that one VOB 83 can form one VOBS 82 in a normal video program. In this case, a single video stream comes to an end in one VOB 83.

On the other hand, in case of a collection of animations having a plurality of stories or an omnibus movie, a plurality of video streams (a plurality of video chains PGC) can be set in single VOB 82 in correspondence with the respective stories. In this case, the individual video streams are stored in corresponding VOBs 83. An audio stream and sub-picture stream pertaining to each video stream end in corresponding VOB 83.

VOBs 83 are assigned identification numbers (IDN#i; i=0 to i), and that VOB 83 can be specified by the identification number. VOB 83 consists of one or a plurality of cells 84. A normal video stream consists of a plurality of cells, but a video stream for a menu often consists of single cell 84. Cells 84 are assigned identification numbers (C_IDN#j) like VOBs 83.

Note that information included in video object set VOBS in FIG. 4 is that obtained by removing navigation packs 86 from the hierarchical structure shown in FIG. 11.

Figure 12:
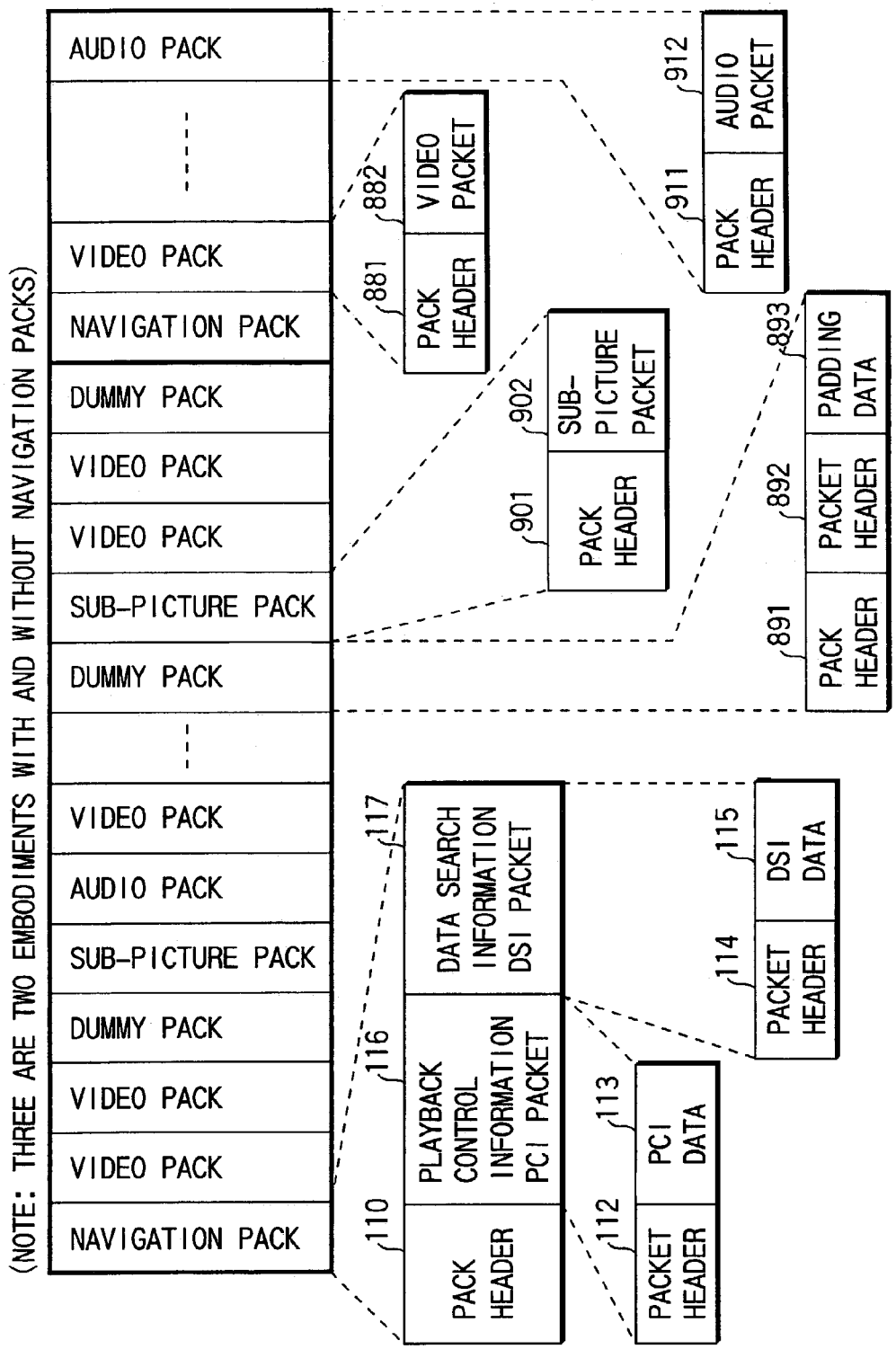
FIG. 12 is a view for explaining an example of the contents of a lowermost layer pack in the hierarchical structure shown in FIG. 11 (note that navigation packs are deleted when the present invention is applied to the structure shown in FIG. 4)

FIG. 12 exemplifies a data sequence (pack sequence) in the pack format, which is obtained after data recorded on the optical disc 10 are read out, and undergo signal demodulation/error correction in a disc drive (not shown). This pack sequence includes navigation pack (control pack) 86, video packs 88, dummy packs 89, sub-picture packs 90, and audio packs 91. All these packs consist of data in units of 2 kbytes as in the logical sectors shown in FIG. 1.

Navigation pack 86 includes pack header 110, playback control information/presentation control information (PCI) packet 116, and data search information (DSI) packet 117. PCI packet 116 is made up of packet header 112 and PCI data 113, and DSI packet 117 of packet header 114 and DSI data 115. PCI packet 116 contains control data used in non-seamless angle switching, and DSI packet 117 contains control data used in seamless angle switching.

Note that the angle switching means changes in angle (camera angle) of watching the object picture. In case of a rock concert video title, for example, the user can watch scenes from various angles, e.g., a scene that mainly captures a vocalist, a scene that mainly captures a guitarist, a scene that mainly captures a drummer, and the like in a performance scene of an identical tune (identical event).

The angle is switched (changed) when the viewer can select angles in accordance with his or her favor, and when an identical scene automatically repeats itself with different angles in the flow of story (if the software producer/provider has programmed the story in such way; or if the user of the DVD video recorder to be described later edits in such way).

The angles are set in the following cases: temporally discontinuous, non-seamless playback that presents an identical scene of different angles (for example, in a scene at the instant when a certain boxer throws a counterpunch, the camera angle is changed to another angle to play back a scene in which the counterpunch begins to be thrown), and temporally continuous, seamless playback that changes the angle between temporally continuous scenes (for example, at the instant when a certain boxer has made a counterpunch, the camera angle is changed to another angle to play back a scene in which the other boxer who got the punch is blown off).

Video pack 88 is comprised of pack header 881 and video packet 882. Dummy pack 89 is comprised of pack header 891 and padding packet 890, and padding packet 890 of packet header 892 and padding data 893. Note that padding data 893 stores insignificant data.

Sub-picture pack 90 is made up of pack header 901 and sub-picture packet 902. Audio pack 91 is made up of pack header 911 and audio packet 912.

Note that video packet 882 in FIG. 12 contains a packet header (not shown), which records a decoding time stamp (DST) and presentation time stamp (PTS). Each of sub-picture packet 902 and audio packet 912 contains a packet header (not shown), which records a presentation time stamp (PTS).

On the other hand, a pack sequence included in video object set VOBS recorded on DVD-RAM or DVD-RW optical disc 10 can be configured not to include any navigation packs 86 in FIG. 12. FIG. 72 shows an example of the structure of a pack sequence which does not include any navigation packs.

Figure 13:
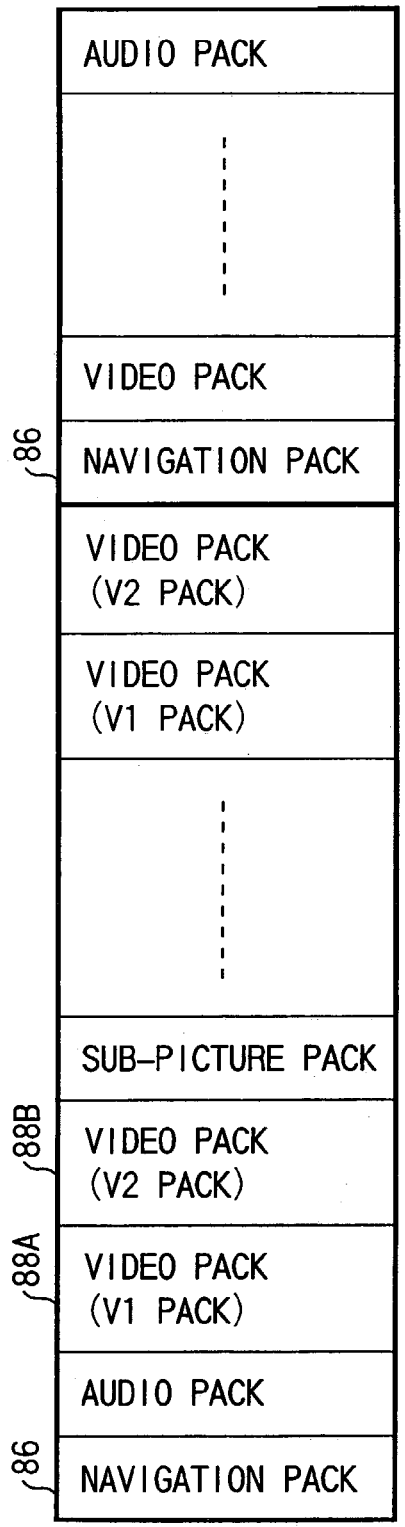
FIG. 13 is a view for explaining another example of the contents of a lowermost layer pack in the hierarchical structure shown in FIG. 11 (note that navigation packs are deleted when the present invention is applied to the structure shown in FIG. 4)

FIG. 13 shows another example of the contents of lowermost layer packs in the hierarchical structure shown in FIG. 11 (when the present invention is applied to the structure shown in FIGS. 2 to 4, navigation packs 86 are removed).

The pack configuration shown in FIG. 13 uses two different types of video packs. That is, V1 pack 88A including a main picture pack (MPEG2 video) and V2 pack 88B including a search picture pack and the like are prepared as video packs. V1 pack 88 is assigned stream ID=0xe0. V2 pack 88B is assigned stream ID=0xe1 in case of MPEG2 video.

Figure 14:
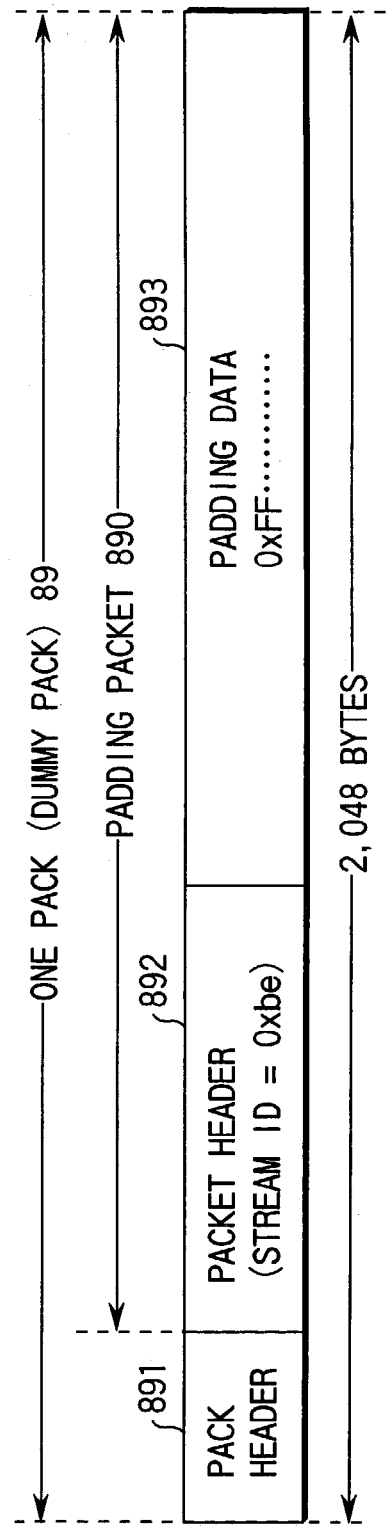
FIG. 14 is a view for explaining the contents of a dummy pack shown in FIG. 12.

FIG. 14 shows the structure for one dummy pack shown in FIG. 12. That is, one dummy pack 89 is made up of pack header 891, packet header 892 with a predetermined stream ID, and padding data 893 padded with a predetermined code. (Packet data 892 and padding data 893 form padding packet 890). The contents of padding data 893 in a non-used dummy pack have no specific meaning.

This dummy pack 89 can be used as needed when the recorded contents are edited after predetermined recording is done on disc 10 shown in FIG. 1. Also, dummy pack 89 can be used to store thumbnail picture data (thumbnail data) DA2143 shown in FIG. 2, which is used for a user menu.

For example, a case will be examined below wherein the contents of a video tape that recorded a family trip using a portable video camera are recorded and edited on DVD-RAM (or DVD-RW) disc 10.

In this case, only the video scenes to be stored in a single disc are selectively recorded on disc 10. These video scenes are recorded in video pack 88 in FIG. 11 (or V1 pack 88A in FIG. 13). Also, audio data simultaneously recorded by the video camera is recorded in audio pack 91.

On the other hand, thumbnail picture data for a menu, which indicate the respective chapters of the video scenes recorded on a single disc, can be recorded as needed in V2 pack 88B in FIG. 13.

When the data structure shown in FIG. 5 is adopted, each VOBU 85 that includes video pack 88 and the like has navigation pack 86 at its beginning (the structure shown in FIGS. 2 to 4 does not have any navigation pack). As shown in FIG. 12, this navigation pack 86 contains presentation control information PCI and data search information DSI. Using this PCI or DSI, the playback procedure of each VOBU can be controlled (for example, discontinuous scenes can be automatically connected or a multiangle scene can be recorded).

After the contents of the video tape are edited and recorded on disc 10, when a voice, effect sound, and the like are to be postrecorded in each scene in units of VOBUs or background music BGM is added, such postrecorded audio data or BGM can be recorded in dummy pack 89. When a comment for the recorded contents is to be added, sub-pictures such as additional characters, figures, and the like can be recorded in dummy pack 89. Furthermore, when an additional video picture is to be inserted, the inserted video picture can be recorded in dummy pack 89.

The above-mentioned postrecorded audio data or the like is written in padding data 893 of dummy pack 89 used as an audio pack. The additional comment is written in padding data 893 of dummy pack 89 used as a sub-picture pack. Similarly, the inserted video picture is written in padding data 893 of dummy pack 89 used as a video pack.

More specifically, dummy pack 89 is a wildcard pack that can become any of audio, sub-picture, and video packs depending on its purpose.

Figure 15:
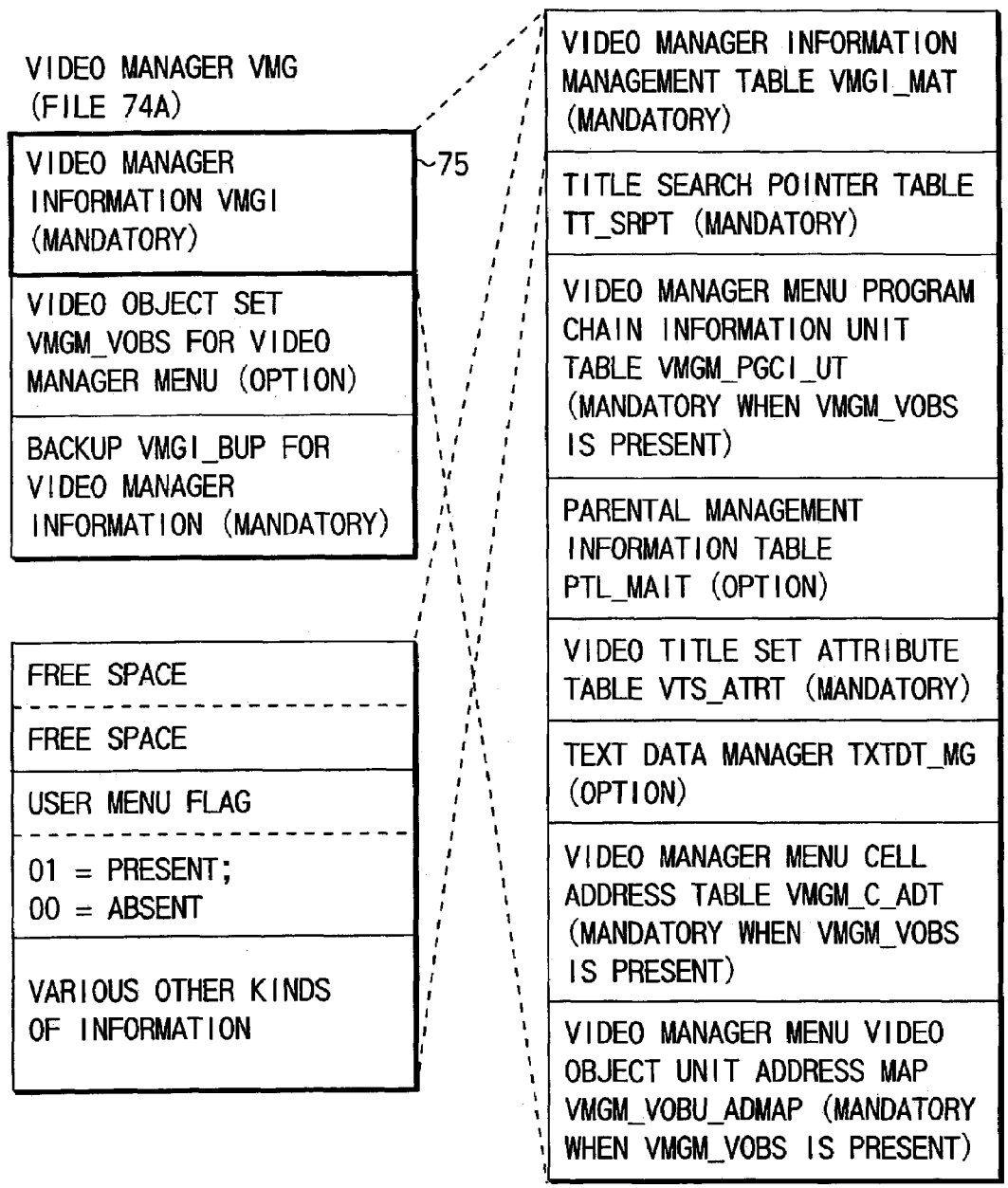
FIG. 15 is a view for explaining the contents of video manager information VMGI shown in FIG. 5.

FIG. 15 shows the contents of video manager VMG shown in FIG. 5. This VMG consists of a plurality of files 74A. Video manager VMG includes video manager information (VMGI) 75, object set (VMGM_VOBS) for a video manager menu, and backup (VMGI_BUP) of video manager information in correspondence with each file.

Note that video manager information VMGI and backup VMGI_BUP of video manager information are mandatory items, and video object set VMGM_VOBS for displaying video manager information menu VMGM is optional.

As shown in FIG. 15, video manager information (VMGI) 75 set at the beginning of video manager VMG describes a video manager information management table (VMGI_MAT; mandatory), title search pointer table (TT_SRPT; mandatory), video manager menu program chain information unit table (VMGM_PGCI_UT; mandatory when VMGM_VOBS exists), parental management information table (PTL_MAIT; option), video title set attribute table (VTS_ATRT; mandatory), text data manager (TXTDT_MG; option), video manager menu cell address table (VMGM_C_ADT; mandatory when VMGM_VOBS exists), and video manager menu video object unit address map (VMGM_VOBU_ADMAP; mandatory when VMGM_VOBS exists) in this order.

Note that the addresses such as an end address (VMGI_MAT EA) of video manager information management table VMGI_MAT, a start address (TT_SRPT_SA) of title search pointer TT_SRPT, and the like are described as the relative numbers of logical blocks from the head logical block that stores this table VMGI_MAT.

Video manager information (VMGI) 75 contains information used upon playing back each video title set (VTS) 72 shown in FIG. 5, and such information is recorded on optical disc 10 to match a logical sector boundary.

Video manager information menu video object set VMGM_VOBS stores menu information (managed by video manager VMG) which pertains to video data, audio data, and sub-picture data recorded on optical disc 10.

With this video manager information menu video object set (VMGM_VOBS), the volume name of the optical disc to be played back, and audio and sub-picture comments upon displaying the volume-name can be displayed. Also, selectable items can be displayed as sub-picture data.

For example, video manager information menu video object set (VMGM_VOBS) allows to display a comment indicating that the optical disc to be played back contains as sub-picture data a video (in a single story or multi-story format) of matches fought by given boxer X until he finally winds the title of the world champion. That is, the fighting pose of boxer X is played back as video data together with the volume name such as "glorious history of boxer X" or the like, his theme (if any) is output as audio data, and the chronological table of his career/records and the like are displayed as sub-picture data.

Also, as the selection items displayed as sub-picture data by VMGM video object set (VMGM_VOBS), (1) an inquiry as to whether a narration voice of the match is played back in English, Japanese, French, German, and the like, (2) an inquiry as to whether or not a superimposed dialog in a predetermined language is displayed as sub-picture data, and (3) an inquiry as to which one of a plurality of selectable language superimposed dialogs is selected, are output in the form of a menu. The viewer (the user of the DVD video recorder; to be described later) can select English as the narration voice and Japanese as the sub-picture superimposed dialog from the displayed items by the VMGM video object set (VMGM_VOBS). In this way, the user is ready to watch the video of a match of boxer X.

The above-mentioned features such as comments of the recorded contents using sub-picture data and/or audio data, arbitrary selection of a spoken language and superimposed dialog language, and the aforementioned playback angle changes are not available in a conventional video recorder (VHS VCR or the like), but the DVD video recorder that adopts the data structure shown in FIG. 5 can have such features.

FIG. 15 also exemplifies some contents of video manager information management table VMGI_MAT. More specifically, video manager information management table VMGI_MAT describes free space (recordable amount)

FREE_SPACE of optical disc 10, a user menu flag indicating if a user menu exists in optical disc 10, and various other kinds of information.

Note that video manager category VMG CAT (not shown in FIG. 15) contained in video manager information management table VMGI_MAT describes video copy flags and audio copy flags of the video manager and video title sets. Depending on the contents of these flags, whether or not video and audio data can be copied are independently determined.

Free space (recordable amount) FREE_SPACE shown in FIG. 15 equals free space data in the physical format information shown in FIG. 8, in non-used blank disc 10. The free space of disc 10 may be stored in either a file descriptor (physical format information) or management information (VMGI_MAT or the like). The disc free space after disc 10 is partially used to record can be written in FREE_SPACE in FIG. 15 and/or the free space field of the physical format information shown in FIG. 8 (in this case, that data is written in both FREE-SPACE and physical format information).

For example, in case of single-sided DVD-RAM disc 10 having a storage size of 2.6 GB, information indicating 2.6 GB is written at the byte positions "17 to 20" in FIG. 8. If no data is recorded on this disc 10 at all, information indicating a value obtained by subtracting management data (including video manager VMG) and the like from 2.6 GB is written in FREE_SPACE in FIG. 15.

If this disc 10 has undergone video recording for 1 GB, information at the byte positions "17 to 20" in FIG. 8 indicates 2.6 GB or equivalent, but information in FREE_SPACE in FIG. 15 is rewritten to contents indicating approximately 1.6 GB or equivalent. When such partially recorded disc 10 is set in the DVD video recorder (to be described later), this DVD video recorder initially reads the information at the byte positions "17 to 20" in FIG. 8 to detect that set disc 10 is a 2.6-GB disc, and then reads the information in FREE_SPACE in FIG. 15 to detect that the free space of set disc 10 is 1.6 GB. If all the data on this disc 10 are erased, the contents of FREE_SPACE in FIG. 15 and information in the free space field of the physical format information in FIG. 8 are rewritten to indicate 2.6 GB or equivalent.

That is, upon expressing "free space", the free space in FIG. 8 and FREE_SPACE in FIG. 15 can have different contents.

FIG. 16 is a table for explaining the contents of title search pointer table TT_SRPT shown in FIG. 15. This title search pointer table TT_SRPT records information such as title search pointer information TT_SRPTI, title playback type TT_PB_TY, the number AGLNs of angles, the number PTT_Ns of part-of-titles (chapters), a parental ID field, video title set number VTSN, video title set title number VTS_TTN, video title set start address VTS_SA, a user title menu flag, a main PGC number, a display position (X, Y), and the like.

If that title includes a user title menu, the user title menu flag is set at "01"; if no user title menu is available, the user title menu flag is set at "00".

The main PGC number is written with a PGC number that includes a representative thumbnail picture used for the user title menu.

The display position (X, Y) is written with the X-Y coordinates of a thumbnail picture on the user title menu screen.

Figure 17:
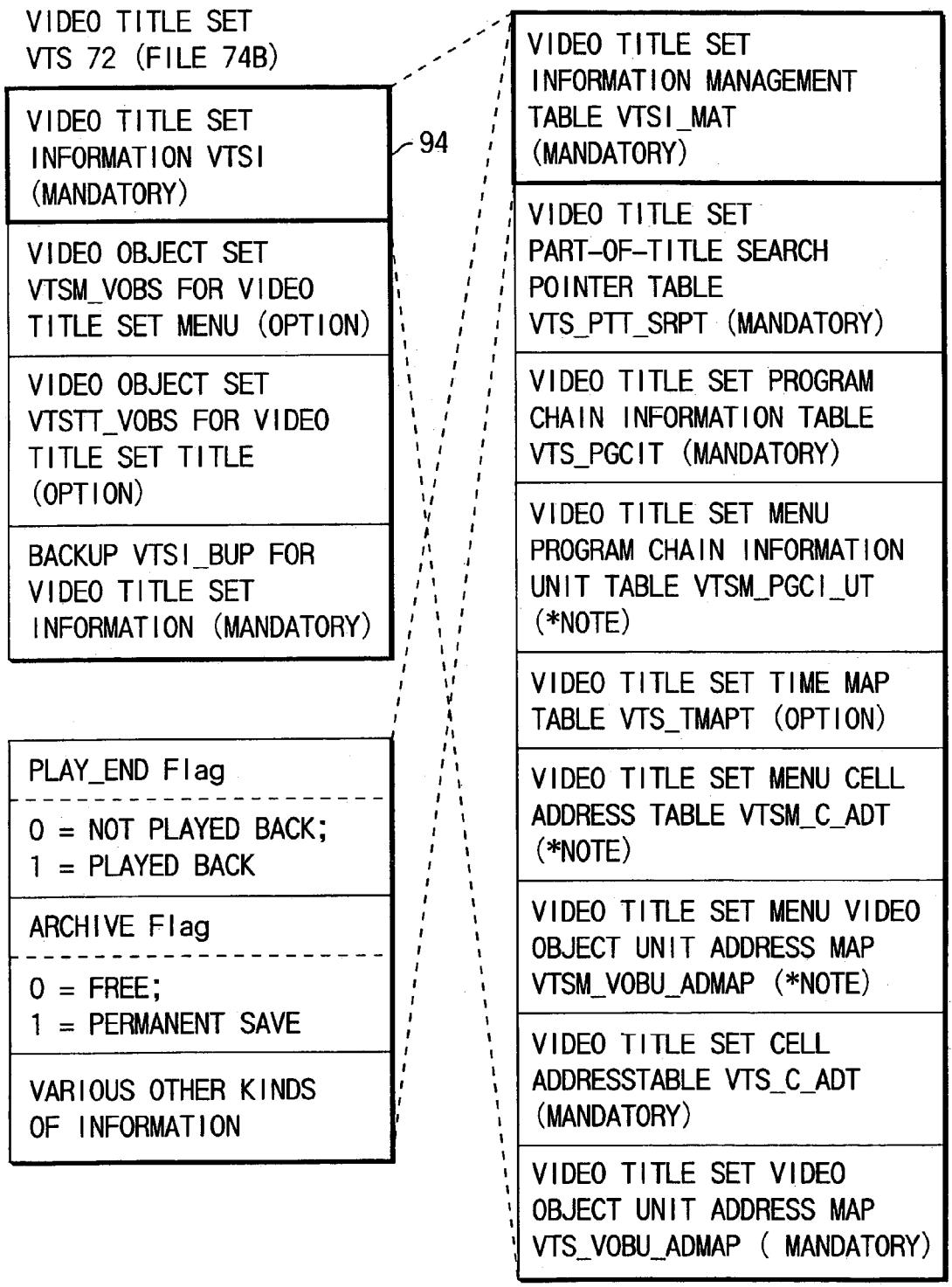
FIG. 17 is a view for explaining the contents of video title set information VTSI shown in FIG. 5.

FIG. 17 shows the contents of video title set VTS 72 in FIG. 5. Video title set VTS consists of a plurality of files 74B like video manager VMG shown in FIG. 15. Each file 74B contains video title set information (VTSI) 94, object set (VTSM_VOBS) for a video title set menu, video object sets (VTSTT_VOBS; nine files in maximum) for video title set titles, and backup (VTSI_BUP) for video title set information.

As shown in FIG. 17, video title set information VTSI 94 set at the beginning of video title set VTS 72 describes a video title set information management table (VTSI_MAT; mandatory), a title search pointer table (VTS_PTT_SRPT; mandatory) for a video title set part-of-title (e.g., chapter of a program), a video title set program chain information table (VTS_PGCIT; mandatory), a video title set menu program chain information unit table (VTSM_PGCI_UT; mandatory when VTSM_VOBS is present), a video title set time map table (VTS_TMAPT; option), a video title set menu cell address table (VTSM_C_ADT; mandatory when VTSM_VOBS is present), a video title set menu video object unit address map (VTSM_VOBU_ADMAP; mandatory when VTSM_VOBS is present), a video title set cell address table (VTS_C_ADT; mandatory), and a video title set video object unit address map (VTS_VOBU_ADMAP; mandatory) in this order.

FIG. 17 also shows some contents of video title set information management table VTSI_MAT. That is, this video title set information management table VTSI_MAT describes a played back flag (PLAY_END Flag) indicating whether or not a program recorded on optical disc 10 has been completely played back at least once, an archive flag (ARCHIVE Flag) which serves to prevent erase errors when a program recorded on optical disc 10 is to be saved without being erased, and various other information.

Note that the respective information items of table VTSI_MAT are aligned to the logical block boundaries of data recorded on optical disc 10.

FIG. 18 is a table for explaining the contents of playback management table PLY_MAT shown in FIG. 3. This playback management table PLY_MAT records identifier ID of data which is to undergo playback management, start address VOBS_SA of a video object set, end address VOBS_-EA of a video object set, end address CTLI_EA of control information, end address PLYCI_EA of playback control information, category CAT of data which is to undergo playback management, video attribute V_ATR, the number AST_Ns of audio streams, audio stream attribute AST_ATRT, the number SPST_Ns of sub-picture streams, sub-picture stream attribute SPST_ATRT, a user menu flag, a main PGC number, a display position (X, Y), a playback end flag, and the like.

If the data which is to undergo playback management includes a user title menu, the user title menu flag is set at "01"; if no user title menu is available, the user title menu flag is set at "00".

The main PGC number is written with a PGC number that includes a representative thumbnail picture used for the user title menu.

The display position (X, Y) is written with the X-Y coordinates of a thumbnail picture on the user title menu screen.

If the data which is to undergo playback management has not been played back yet after recording, "0" is written in the playback end flag; if that data has been played back even at least once, "1" is written in this flag.

FIG. 19 is a table for explaining the contents of recording management table REC_MAT shown in FIG. 3. This recording management table REC_MAT describes end address RECI_EA of recording control information, end address REC_MAT_EA of recording management table REC_MAT, free space FREE_SPACE, an archive flag, and the like.

Free space FREE_SPACE stores the remaining recordable size on disc 10 after the user has recorded or erased various data.

On the other hand, "1" is written in the archive flag for data, which is to be permanently saved, of those recorded on disc 10. "0" is written in the archive flag of data which can be erased entirely.

FIG. 20 is a table for explaining the contents of PGC management information PGC_MAI shown in FIG. 3. This PGC management information PGC_MAI includes end address PGCI_TABLE_EA of program chain information table PGCIT, end address PGC_MAI_EA of program chain management information, start address PGC_SRP_SA of a program chain search pointer, end address PGC_SRP_EA of a program chain search pointer, start address PGCI_SA of program chain information, end address PGCI_EA of program chain information, and the total number PGC_Ns of program chains.

Program chain search pointer PGC_SRP points to the beginning of each program chain information PGCI, and a search for each PGCI can be easily executed using this pointer.

FIG. 21 is a table for explaining the contents of PGC information PGCI shown in FIG. 3. This PGC information PGCI includes program chain general information PGC_GI, program chain program map PGC_PGMAP indicating the number of entries of programs, and one or more cell playback information CELL_PLY_INF#1 to CELL_PLY_INF#m.

FIG. 22 is a table for explaining the contents of PGC general information PGC_GI shown in FIG. 21. This PGC general information PGC_GI includes program chain contents PGC_CNT, program chain playback time PGC_PB_TM, program chain audio stream control table PGC_AST_CTLT, program chain sub-picture stream control table PGC_SPST_CTLT, program chain navigation control PGC_NV_CTL, sub-picture color palette table PGC_SP_PTL, start address PGC_PGMAP_SA of a program chain program map, start address CELL_PLY_I_SA of cell playback information, the number CELL_Ns of cells used in a target program chain, a menu data flag of a program chain, a display position (X, Y), a playback end flag, an archive flag, and the like.

If a target program chain includes menu data, the PGC menu data flag is set at "01"; if no menu data is available, the PGC menu data flag is set at "00".

The display position (X, Y) is written with the X-Y coordinates upon displaying PGC menu data.

If a target program chain has not been played back yet after recording, "0" is written in the playback end flag; if that program chain has been completely played back even at least once, "1" is written in this flag.

If a target program chain is to be permanently saved, "1" is written in the archive flag; if that program chain can be erased later, "0" is written in the archive flag.

FIG. 23 is a table for explaining the contents of cell playback information CELL_PLY_INF shown in FIG. 21. This cell playback information CELL_PLY_INF includes cell category C_CAT, cell playback time C_PBTM, a playback end flag, an archive flag, cell start address CELL_SA, cell end address CELL_EA, and the like. Cell start address CELL_SA is written with the start address of a period to be played back as a cell, and cell end address CELL_EA is written with the end address of that period.

If a target cell has not been played back yet after recording, "0" is written in the playback end flag; if that cell has been completely played back even at least once, "1" is written in this flag.

If a target cell is to be permanently saved, "1" is written in the archive flag; if that cell can be erased later, "0" is written in the archive flag.

Note that cell category C_CAT and cell playback time C_PBTM are used as cell general information (CELL_GI).

FIG. 24 shows the contents of video title set program chain information table VTSI_PGCIT shown in FIG. 17.

This video title set program chain information table VTS_PGCIT contains program title set program chain information table information (VTS_PGCITI), video title set program chain information search pointers (VTS_PGCI_SRP#1 to VTS_PGCI_SRP#n), and video title set program chain information (VTS_PGCI).

Note that the order of a plurality of pieces of video title set program chain information VTS_PGCI is set independently of that of the plurality of video title set program chain information search pointers VTS_PGCI_SRP#1 to VTS_PGCI_SRP#n. Hence, for example, single program chain information VTS_PGCI can be indicated by one or more program chain information search pointers VTS_PGCI_SRP.

FIG. 24 exemplifies the contents of video title set program chain information VTS_PGCI. That is, program chain information (PGCI) is made up of program chain general information (PGC_GI; mandatory), a program chain command table (PGC_CMDT; option), a program chain program map (PGC_PGMAP; mandatory when C_PBIT to be described below is present), a cell playback information table (C_PBIT; option), and a cell position information table (C_POSIT; mandatory when C_PBIT above is present).

FIG. 24 also exemplifies the contents of cell playback information table C_PBIT. Cell playback information table C_PBIT has the structure shown in FIG. 24, and contains a maximum of 255 pieces of cell playback information (C_PBIn; #n=#1 to #255).

Each cell playback information C_PBI (C_PBI#1 to C_PBI#n) shown in FIG. 24 includes a cell category (C_CAT), cell playback time (C_PBTM), the start address (C_FVOBU_SA) of the first video object unit (VOBU) in the cell, the end address (C_FILVU_EA) of the first interleaved unit (ILVU) in the cell, the start address (C_LVOBU_SA) of the last video object unit (VOBU) in the cell, and the end address (C_LVOBU_EA) of the last video object unit (VOBU) in the cell, although not shown.

Cell category C_CAT can contain the following contents although not shown in FIG. 24. That is, this cell category (C_CAT) indicates the number of cell commands by the lower 8 bits (b0 to b7), the cell still time by the next 8 bits (b8 to b15); the cell type (e.g., karaoke or the like) by the next 5 bits (b16 to b20), an access denial flag by the next 1 bit (b21), the cell playback mode (e.g., movie or still) by the next 1 bit (b22), a seamless angle change flag by 1 bit (b24) after the next reserved bit, a system time clock STC discontinuity flag (to reset STC or not) by the next 1 bit (b25), an interleave/non-interleave flag (indicating if the cell designated by C_PBI is located in a continuous block or an interleaved block) by the next 1 bit (b26), a seamless playback flag (indicating if the cell designated by C_PBI is to be played back seamlessly) by the next 1 bit (b27), the cell block type (e.g., angle block) by the next two bits (b28 and b29), and the cell block mode (e.g., first cell in the block) by the last two bits (b30 and b31).

If the cell block mode bits are 00b (b means binary), this means that the cell is not the one in the block; if the bits are 01b, the cell is the first one in the block; if the bits are 10b, the cell is the one in the block; and if the bits are 11b, the cell is the last one in the block.

If the cell block type bits are 00b, this indicates that the cell block does not belong to the block of interest; if the bits are 01b, the block of interest is an angle block (a block containing multiangle cells).

If the cell block type bits are not 01b during playback of a title containing multiangle cells, for example, an angle mark (not shown) is kept ON.

On the other hand, if this cell block type=01b is detected during playback, the DVD video recorder can inform the viewer that playback of the angle block is currently in progress by flickering the angle mark (not shown); or by changing the ON color or shape of the angle mark). With such information, the viewer can make sure that an image in another angle is available for the picture which is currently being played back.

If the interleave/non-interleave flag is 0b, it indicates that the cell of interest belongs to a continuous block (that continuously records a plurality of VOBUs); if the interleave/non-interleave flag is 1b, the cell of interest belongs to an interleaved block (that records ILVUs each containing one or more VOBUs upon interleaving).

If the seamless angle change flag is set (=1b), it represents that the cell of interest is to be seamlessly played back; if this flag is not set (=0b), the cell of interest is to be non-seamlessly played back.

That is, if the interleave/non-interleave flag=1b and seamless angle change flag=0b, the angle can be changed non-seamlessly; if the interleave/non-interleave flag=1b and seamless angle change flag=1b, the angle can be changed seamlessly.

If a media drive system with a very short access time (a system that can access the beginning of a desired angle block within one video frame period; not limited to an optical disc drive system) is used, the angle can be changed smoothly even when the interleave/non-interleave flag=0b, i.e., between VOBU sets (different angle cells) which are not recorded upon interleaving.

When optical disc 10 with relatively low access speed is used as a recording medium, one recording track of that disc is preferably assigned to recording of one interleaved block. In such format, since the trace destination of an optical head need only move in the radial direction of the disc by a very small distance corresponding to one track width, track jump suffering less time lag (suitable for seamless angle change) can be attained. In this case, if track jump for one video object unit (VOBU) is made, a time lag for a maximum of one revolution of the disc may be produced. Hence, the angle change that requires jumps in units of VOBUs is suitable for non-seamless angle change.

Note that the contents of the seamless angle change flag are normally determined in advance by the provider (the software producer who produces the program contents of titles recorded on optical disc 10). That is, by determining the contents of the seamless angle change flag in advance, the provider can uniquely determine whether the non-seamless angle change or seamless angle change is to be used.

However, it is technically possible to design a DVD video recorder which allows the viewer (the user of the DVD video recorder to be described later) to arbitrarily change the contents of the seamless angle change flag in read data after cell data of the title set of interest are read from an optical disc.

Since the seamless angle change flag represents whether the angle information described in navigation pack 86 indicates seamless or non-seamless angle information, if the user has changed this flag, he or she must also modify angle information (not shown) in navigation pack 86 (e.g., modification from seamless angle information to non-seamless angle information).

When the cell playback mode is 0b, it indicates continuous playback in the cell; if the mode is 1b, still playback in each VOBU present in the cell.

When the user makes video recording, playback, and the like, the access denial flag can be used upon prohibiting direct selection by user operation. For example, when the access denial flag of a cell that records answers for a collection of questions, the user is prohibited from reading the answers by stealth.

The cell type can indicate the following ones by its 5-bit contents, for example, when the cell of interest is formed for karaoke.

If the 5 bits are 00000b, no cell type is designated; if the 5 bits are 00001b, a title picture of the karaoke is designated; if the 5 bits are 00010b, an introduction part of the karaoke is designated; if the 5 bits are 00011b, a song part other than a climax (bridge) part is designated; if the 5 bits are 00100b, a song part of the first climax part is designated; if the 5 bits are 00101b, a song part of the second climax part is designated; if the 5 bits are 00110b, a song part for a male vocal is designated; if the 5 bits are 00111b, a song part for a female vocal is designated; if the 5 bits are 01000b, a song part for mixed voices is designated; if the 5 bits are 01001b, an interlude part (instrumental part) is designated; if the 5 bits are 01010b, fading-in of the interlude part is designated; if the 5 bits are 01011b, fading-out of the interlude part is designated; if the 5 bits are 01100b, the first ending part is designated; and if the 5 bits are 01101b, the second ending part is designated. The contents of the remaining 5-bit code can be used for other purposes.

Note that the angle change also applies to background video data of the karaoke. (For example, a full-figure shot, close-up shots of the face and mouth, and the like of a singer who is singing a guide vocal can undergo angle changes seamlessly along with the flow of a karaoke music or non-seamlessly by going back some bars, or during repeat playback between desired bars, as the viewer desired.)

On the other hand, if the 8-bit contents of the cell still time are 00000000b, zero still time is designated; if the contents are 11111111b, limitless still time is designated; if the contents fall within the range from 00000001b to 11111110b, a still display time having a duration defined by the decimal value (1 to 254) designated by the contents and expressed in seconds is designated.

The number of cell commands indicates the number of commands to be executed upon completion of playback of the cell of interest.

FIG. 25 shows the contents of program chain general information PGC_GI shown in FIG. 24. As shown in FIG. 25, program chain general information PGC_GI describes program chain contents (PGC_CNT), a program chain playback time (PGC_PB_TM), program chain user operation control information (PGC_UOP_CTL), a program chain audio stream control table (PGC_AST_CTLT), a program chain sub-picture stream control table (PGC_SPST_CTLT), program chain navigation control information (PGC_NV_CTL), a program chain sub-picture palette (PGC_SP_PLT), the start address (PGC_CMDT_SA) of a program chain command table, the start address (PGC_PGMAP_SA) of a program chain program map, the start address (C_PBIT_SA) of a playback information table of cells in the program chain, the start address (C_POSIT_SA) of a position information table of cells in the program chain, a program chain menu data flag, and a display position (X, Y).

Referring to FIG. 25, program chain contents PGC_CNT indicate the number of programs and number of cells (a maximum of 255) in that program chain. In a program chain having no video object VOB, the number of programs is "0".

Program chain playback time PGC_PB_TM represents the total playback time of programs in that program chain in hours, minutes, seconds, and the number of video frames. This PGC_PB_TM also describes a flag (tc_flag) indicating the type of video frame, and a frame rate (25 or 30 frames per sec) or the like is designated by the contents of this flag.

Program chain user operation control information PGC_UOP_CTL indicates user operations prohibited in the program chain which is being played back.

Program chain audio stream control table PGC_AST_CTLT can contain control information for each of eight audio streams. Each control information includes a flag (availability flag) indicating if the corresponding audio stream is available in that program chain, and conversion information from an audio stream number to an audio stream number to be decoded.

Program chain sub-picture stream control table PGC_SPST_CTLT includes a flag (availability flag) indicating if that sub-picture stream is available in the program chain of interest, and conversion information from a sub-picture stream number (32) into the sub-picture stream number to be decoded.

Program chain navigation control information PGC_NV_CTL includes Next_PGCN indicating the next program chain number to be played back after the program chain which is currently being played back, Previous_PGCN indicating a program chain number (PGCN) quoted by a navigation command "LinkPrevPGC" or "PrevPGC_Search( )", GoUp_PGCN indicating a program number to which that program chain is to return, a PG Playback mode indicating the playback mode (sequential playback, random playback, shuffle playback, and the like) of the program, and a Still time value indicating the still time after that program chain is played back.

Program chain sub-picture palette PGC_SP_PLT describes 16 sets of luminance signals and two color difference signals used in a sub-picture stream in that program chain.

Start address PGC_CMDT_SA of the program chain command table assures a description area for a pre-command executed before PGC playback, a post-command executed after PGC playback, and a cell command executed after cell playback.

Start address PGC_PGMAP_SA of the program chain program map describes the start address of program map PGC_PGMAP representing the program configuration in the program chain by a relative address from the first byte of program chain information PGCI.

Start address C_PBIT_SA of the cell playback information table in the program chain describes the start address of cell playback information table C_PBIT that determines the playback order of cells in that program chain by a relative address from the first byte of program chain information PGCI.

Start address C_POSIT_SA of the position information table of cells in the program chain describes the start address of cell position information table C_POSIT indicating VOB identification numbers and cell identification numbers used in that program chain by a relative address from the first byte of program chain information PGCI.

The PGC menu data flag describes whether or not a target program chain includes user menu data. If the target program chain includes user menu data, the PGC menu data flag is set at "01"; if no menu data is available, the PGC menu data flag is set at "00".

The display position (X, Y) is written with X-Y coordinates upon displaying PGC menu data.

Note that program chain general information PGC_GI shown in FIG. 22 described above can be used in a DVD video recorder that records/plays back video using the data structure shown in FIGS. 2 to 4 (the one using a DVD-RAM disc or DVD-RW disc).

On the other hand, program chain general information PGC_GI shown in FIG. 25 can be used in a DVD video recorder that records/plays back video using the data structure shown in FIG. 5 (the one using a DVD-R disc).

FIG. 26 illustrates an example of a playback process of cell data recorded on the disc shown in FIG. 1. As shown in FIG. 26, playback data is designated by the playback period from cell A to cell F. A playback combination of these cells in each program chain is defined by program chain information.

FIG. 27 exemplifies the relationship between the program chain information and the cells shown in FIG. 26. More specifically, PGC#1 comprised of three cells #1 to #3 designates cell playback in the order of cell A→cell B→cell C. PGC#2 comprised of three cells #1 to #3 designates cell playback in the order of cell D→cell E→cell F. Furthermore, PGC#3 comprised of five cells #1 to #5 designates cell playback in the order of cell E→cell A→cell D→cell B→cell E.

FIG. 28 is a view for explaining the first example of a method of determining a divide point of video contents recorded on the disc shown in FIG. 1. In this example, the divide points for individual PGCs exemplified in FIG. 27 are set based on a change in mode of the video-recording source. For example, assume that the video-recording source is television broadcast of a movie, which includes both stereo audio data for commercials and monaural audio (or bilingual audio) data. When such movie program of television broadcast is recorded, a point where the audio mode changes from stereo to monaural (or bilingual) or a point where the audio mode changes from monaural (or bilingual) to stereo can be automatically detected as the divide point of a PGC.

Figure 29:
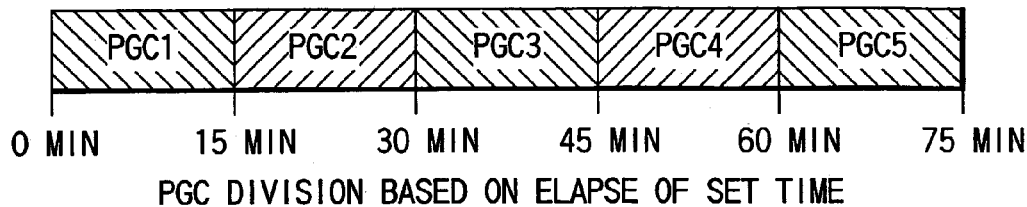
FIG. 29 is a view for explaining the second example of a method of determining a divide point of video contents recorded on the disc shown in FIG. 1.

FIG. 29 is a view for explaining the second example of a method of determining a divide point of video contents recorded on the disc shown in FIG. 1. In this example, the divide points for individual PGCs are set based on an elapse of a given video recording time. For example, every time a video recording time of 15 minutes has elapsed, the divide point of a PGC can be automatically detected independently of video-recorded contents.

Figure 30:
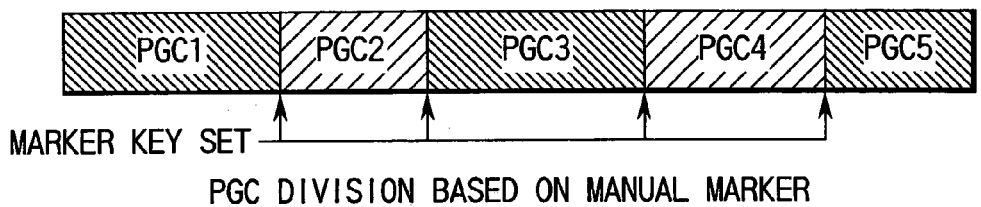
FIG. 30 is a view for explaining the third example of a method of determining a divide point of video contents recorded on the disc shown in FIG. 1.

FIG. 30 is a view for explaining the third example of a method of determining a divide point of video contents recorded on the disc shown in FIG. 1. In this example, the divide points for individual PGCs are set based on a marker key input by the user. For example, when the user makes a marker key input at the time when he or she recognizes a scene change while reviewing the video-recorded contents, the divide point of a PGC is set at that time.

Figure 31:
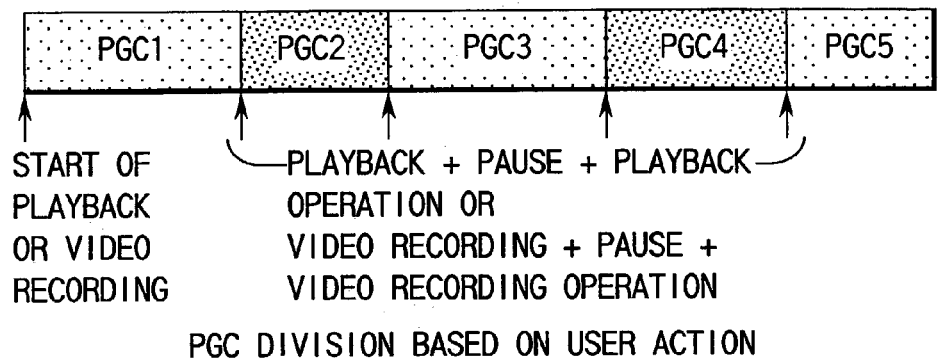
FIG. 31 is a view for explaining the fourth example of a method of determining a divide point of video contents recorded on the disc shown in FIG. 1.

FIG. 31 is a view for explaining the fourth example of a method of determining a divide point of video contents recorded on the disc shown in FIG. 1. For example, in video recording of a digital video movie camera using a DVD-RW disc, every time the user pauses recording during video recording, the pause timing can be automatically detected as a divide point of a PGC. Alternatively, even after video recording, every time the user pauses playback during playback of a recorded DVD-RW disc, the pause timing can be automatically detected as a divide point of a PGC.

Figure 32:
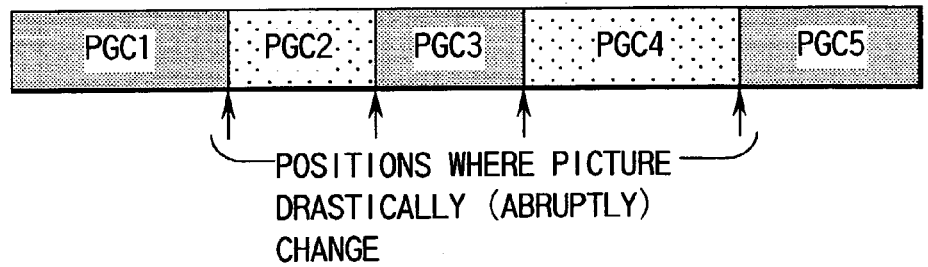
FIG. 32 is a view for explaining the fifth example of a method of determining a divide point of video contents recorded on the disc shown in FIG. 1.

FIG. 32 is a view for explaining the fifth example of a method of determining a divide point of video contents recorded on the disc shown in FIG. 1. For example, when the video-recorded contents have abruptly changed from a white frame (or field) to a black frame (or field) or vice versa, such abrupt change is detected. The detection point can be automatically detected as the divide point of a PGC.

A moving picture and still picture can be used as a thumbnail picture used in the user menu of video-recorded contents. In case of a moving picture, no problem is posed since the normal MPEG video format can be used. However, in case of a still picture, a sequence end code must be inserted after I-picture.

Figure 33:
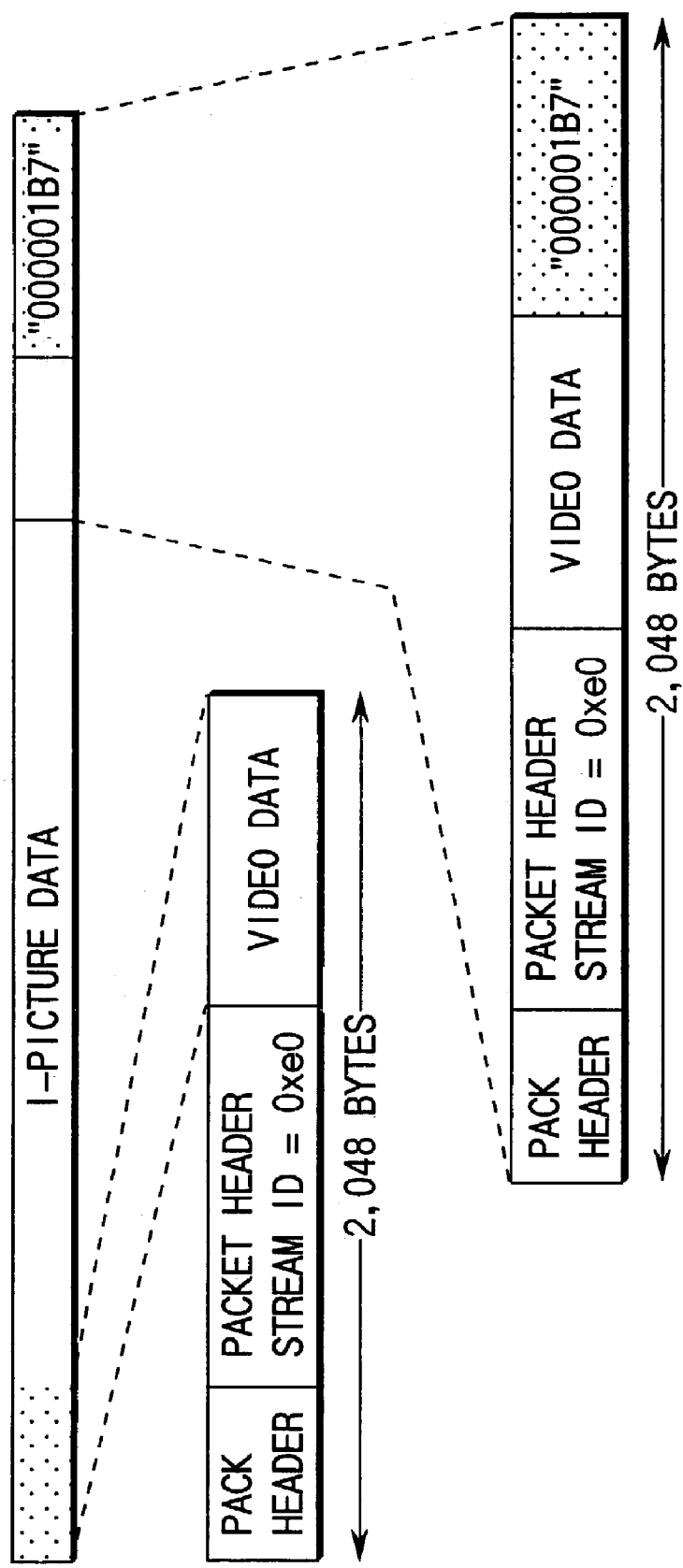
FIG. 33 is a view for explaining an example of the structure of a video pack of a portion to be played back as a still picture in the video contents recorded on the disc shown in FIG. 1 (when a sequence end code is appended to an elementary)
Figure 34:
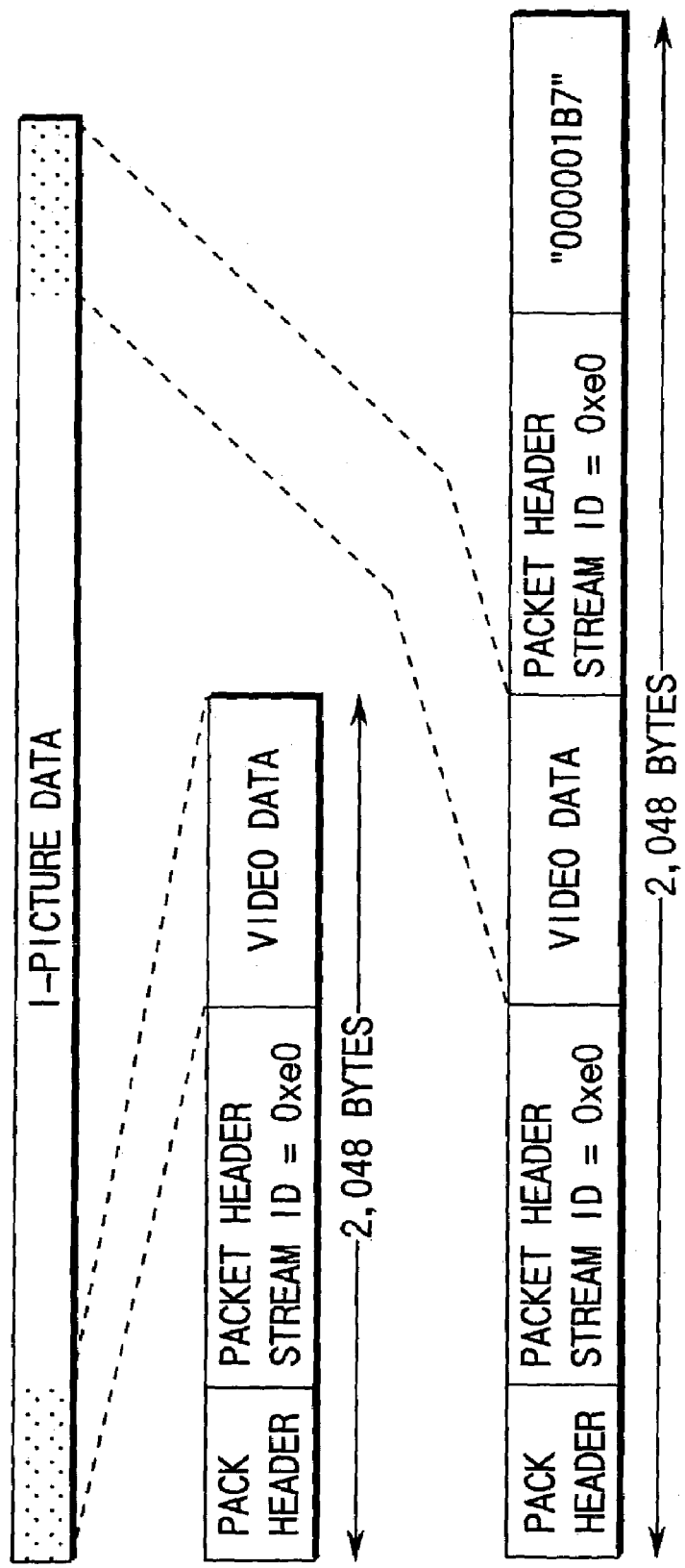
FIG. 34 is a view for explaining another example of a video pack of a portion to be played back as a still picture in the video contents recorded on the disc shown in FIG. 1 (when a sequence end code is appended as packet data)
Figure 35:
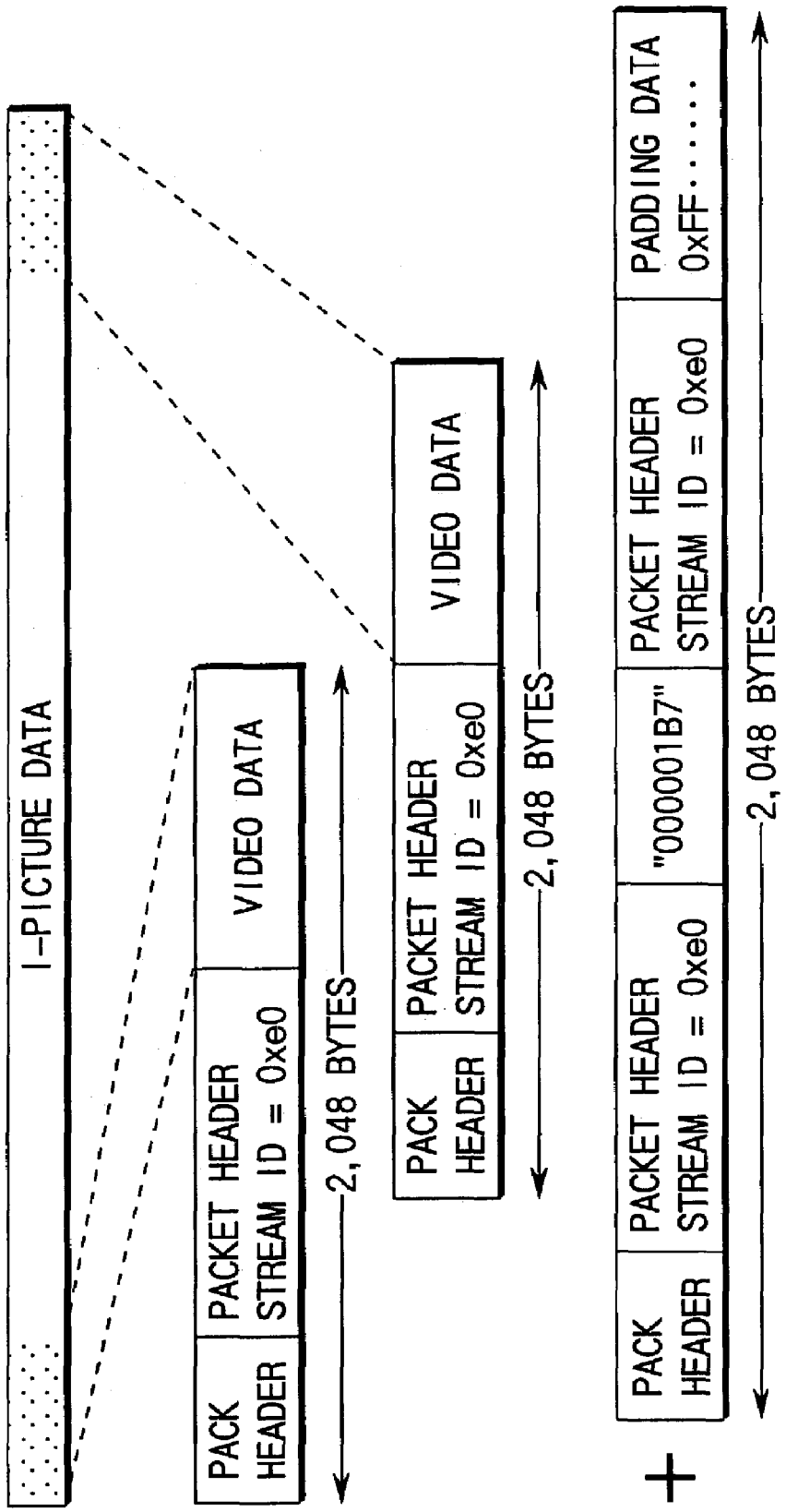
FIG. 35 is a view for explaining still another example of a video pack of a portion to be played back as a still picture in the video contents recorded on the disc shown in FIG. 1 (when a sequence end code is appended as packet data)

FIGS. 33 to 35 show some examples of the video pack structure of a portion to be played back as a still image in the video contents recorded on the disc shown in FIG. 1. FIGS. 33 to 35 also exemplify various insertion patterns of the sequence end code.

In the example shown in FIG. 33, sequence end code "000001B7" is appended at the end of I-picture to pack I-picture including a still picture for a user menu.

In the example shown in FIG. 34, after I-picture data including a still picture for a user menu is packetized, a packet including sequence end code "000001B7" alone is appended.

In the example shown in FIG. 35, after I-picture data including a still picture for a user menu is packetized, a packet including sequence end code "000001B7" alone is appended. In the method of appending a pack including only a sequence end code, a padding packet is appended to that pack as needed so that the length per pack always becomes 2,048 bytes.

Figure 36:
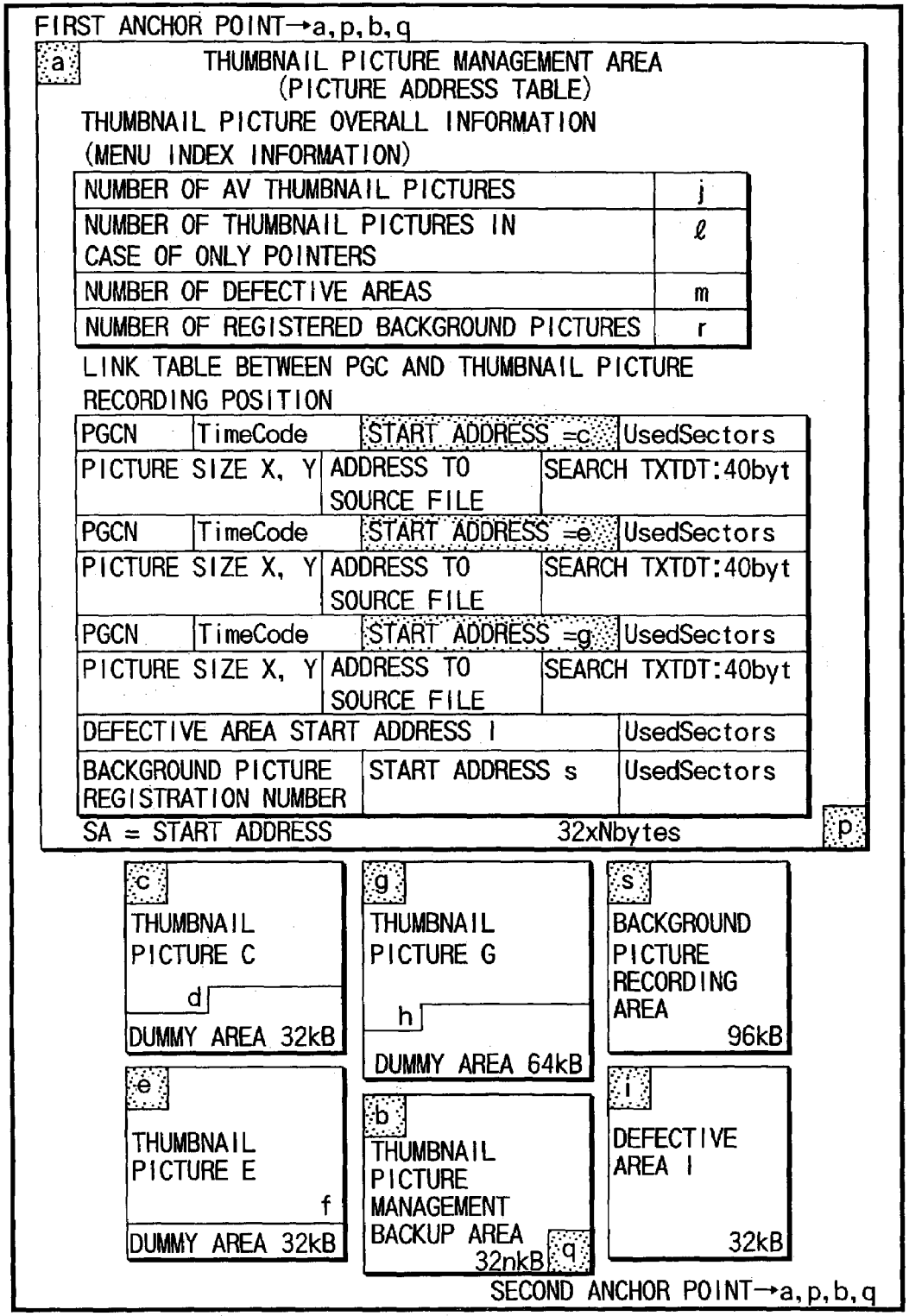
FIG. 36 is a view for explaining the concept of an example of the file structure of a menu created by the user of the video contents recorded on the disc shown in FIG. 1.

The format of a user menu file can have the configuration, as shown in FIG. 36 and, more specifically, that shown in FIGS. 37 and 38.

The user menu file describes data in the order of anchor points, a thumbnail picture management section, a backup (not shown) of the thumbnail picture management section, a group of thumbnail picture data, and anchor points, as exemplified from the top to the bottom in FIG. 36.

This user menu file stores, as first data, pointer addresses called anchor points (a, p, b, q in FIG. 36), which respectively describe the start address (a) and end address (p) of the thumbnail picture management section, and the start address (b) and end address (q) of backup data of the thumbnail picture management section.

After the anchor points, the thumbnail picture management section is recorded, and this data has undergone a "32-kbyte align" process (to be described later). This thumbnail picture management section records data that pertains to thumbnail pictures which form the user menu.

Actual data which pertain to each thumbnail picture that forms the user menu includes a PGC number, a time code (that can be used in, e.g., time search), the start address of that thumbnail picture, the number of used sectors (=data length), a thumbnail picture size, the address (pointer) to a source file (AV data) of the thumbnail picture, text data used in search, title, and the like, and so forth.

After those data, the start address and data length of a defective area are recorded if the file includes a-defective area. Then, the registration number, start address, and the like of background picture data of the user menu are recorded.

After these data, the backup of the thumbnail picture management section is recorded, although not shown. This backup is recorded as an insurance against damages to the thumbnail picture management section.

After the backup, a group of actual packed thumbnail picture data are recorded. Note that each of these thumbnail picture data has been 32-kbyte aligned.

After the picture data, the same anchor points (a, p, b, q) as those at the beginning of the user menu file are described. This is because the file normally suffers damages from the management area at its head position, which is accessed frequently. Since the anchor points are also set at the end of the file, higher safety is assured.

On the other hand, the reason why data have been 32-kbyte aligned at the divisions of this file is to allow access in units of 32-kbyte ECC groups upon changing, adding, or deleting data. In this manner, higher-speed access can be achieved, and the operation load on a data process shown in FIGS. 39 to 41 (to be described later) can be reduced.

Note that each address information in this user menu file is expressed by a relative address from the beginning of the file.

The user menu file shown in FIG. 36 has the following features:

(a) One or more menu selection picture data (i.e., thumbnail picture data) each of which represents a still picture of at least a part of video data are recorded in a single user menu file.

(b) The user menu file has a thumbnail picture management section, and systematically manages all thumbnail picture data (their saving locations and designation of corresponding video signals) recorded on a recording medium (DVD-RAM disc, DVD-RW disc, or DVD-R disc).

More specifically, the user menu file shown in FIG. 36 is written with the contents exemplified in FIGS. 37 and 38.

That is, as the first anchor pointer for a picture address table, the start and end positions of the picture address table, and those of a reserved picture address table are described; as the picture address table (corresponding to DA2142 in FIG. 2), menu index information (INFO1), index picture information (INFO2), defective area information (INFO5), wallpaper picture information (INFO6), and padding data are described; and as the second anchor pointer for the picture address table, the start and end positions of the picture address table, and those of a reserved picture address table are described.

Note that the picture address table shown in FIGS. 37 and 38 also describes slide & still picture information INFO3 and information picture information INFO4 in FIG. 2 as needed.

The menu index information in FIG. 37 includes the number of index pictures, the number of information pictures, the number of slide & still pictures, the number of defective areas, and the number of wallpaper pictures.

The index picture information in FIG. 37 includes a content characteristic, the ID of a program chain for an index picture, the time code of an index picture, the start position of an index picture, the number of used sectors upon recording an index picture, the picture size, the addresses of original audio/video data, and search text data.

Note that "1" is described in the content characteristic included in the index picture information if a still image used in the user menu has already been recorded; or "0" is described if only the recorded location (address) of that still image is recorded.

The index picture data used when a user menu picture is designated by only the address includes the content characteristic described with "0", the ID of a program chain for slide & still pictures, the addresses of original audio/video data, and the time codes of slide & still pictures, as shown in FIG. 38.

The wallpaper picture information in FIG. 38 includes the number of wallpaper pictures that can be used as background pictures of the user menu (numbers of registered background pictures), the start position of a wallpaper picture, and the number of used sectors of an area where the wallpaper picture is recorded.

The padding data in FIG. 38 includes the contents of index pictures, those of a defective area, those of a wallpaper picture, and the like.

The aforementioned "32-kbyte align" process will be explained below.

Data in the user menu file shown in FIGS. 36 to 38 are segmented in units of 32 kbytes as units (ECC groups) of an error correction code independently of the already recorded area or non-recorded area, and the positions of "ECC boundaries" as the boundaries of the segmented data are settled in advance.

Upon recording the thumbnail picture data, anchor points, thumbnail picture management section, and backup of the thumbnail picture management section, all data are recorded so that their recording start and end positions match the "ECC boundary" positions.

When each data size is slightly smaller than an integer value of 32 kbytes, a "dummy area" is appended, as shown in FIG. 36, to match the recording end position with the "ECC boundary" position. This "dummy area" means the "padding" area shown in FIG. 37.

Upon recording/erasing thumbnail picture data, information is recorded/erased in units of "ECC boundaries" described above. In this case, since information in a ECC group need not be partially changed, thumbnail data-can be directly overwritten in correspondence with the ECC boundary upon recording data.

When the aforementioned "32-kbyte align" process is done, since error correction information appended to record/erase thumbnail picture data in units of ECC groups need not be modified, high-speed recording/erase process in units of ECC groups can be achieved.

The user menu file shown in FIG. 36 is designed in consideration of portability to another recording medium using a personal computer or the like. For this purpose, all the save addresses of the user menu thumbnail pictures, background picture, and thumbnail picture management area are expressed by differential addresses (relative addresses) from the start position of the user menu file.

In a link table in the thumbnail picture management area in FIG. 36, two lines from the PGC number to the search text data size express one correspondence table.

In this case, the relationship between the recorded thumbnail picture data and video signal can be recognized based on the correspondence between the pair of time code of the video signal and the start address.

By searching the entire link table, an unrecorded area or the location of erased thumbnail picture in the user menu file can be detected, and new thumbnail picture data can be recorded on that area.

In the user menu file shown in FIG. 36, a defective area is managed in a link table between the locations on an AV file including audio/video data, and thumbnail picture recorded locations.

An example of a processing method executed when the thumbnail picture management section is damaged by dust or scratch attached to the surface of disc (recording medium) 10 will be explained below.

Damage to the thumbnail picture management section due to dust or scratch on the disc (recording medium) surface is detected. (Whether or not the disc is damaged can be determined by checking if error correction of ECC groups fails.)

If any damage is detected, anchor point information is read to check the backup data address of the thumbnail picture management section, and the backup data of the thumbnail picture management section is read.

Then, the thumbnail picture recorded location link table in FIG. 36 is searched for an unrecorded area in the user menu file. Thumbnail picture data is recorded on the unrecorded area in the user menu file, and the anchor point address information is updated.

Subsequently, the damaged location of the thumbnail picture management section due to dust or scratch on the disc (recording medium) surface is registered as a defective area in the thumbnail picture recorded location link table in FIG. 36.

When the user menu file format shown in FIGS. 36 to 38 is adopted, the following effects are expected:

(a) High-speed access such as addition/search of thumbnail picture data can be achieved by the aforementioned "32-kbyte align" process.

(b) When a plurality of thumbnail pictures are simultaneously displayed on a display unit of a monitor display (not shown), the corresponding thumbnail picture data location must be accessed for each thumbnail screen. When such thumbnail picture data are distributed (scattered) on the recording medium, a long access time is required, thus requiring a long time to display a plurality of thumbnail pictures. However, when a plurality of thumbnail picture data are allocated within a single user menu file, as shown in FIG. 36, a plurality of thumbnail pictures can be displayed at high speed by playing back only this user menu file.

(c) Since the thumbnail picture management section simultaneously manages all thumbnail picture data, deletion/addition of thumbnail picture data can be easily managed. That is, an unrecorded area (or thumbnail picture data deleted area) in the user menu file can be easily found by search, and new thumbnail picture data can be additionally registered at high speed.

(d) In a DVD video recorder to be described later, a data processor 36 records 16 packs (=32 kbytes) as one ECC group on disc (DVD-RAM, DVD-RW, or DVD-R) 10 by appending error correction information. Therefore, if some pieces of information in that ECC group have been changed, the appended error correction information must be modified, resulting in a complicated process and a very long time for the information change process. However, since the aforementioned "32-kbyte align" process is done, the appended error correction information need not be modified upon recording/erasing thumbnail picture data, and user menu data can be recorded/erased at high speed.

(e) With the following method, high reliability of the anchor points, thumbnail picture management section, and backup data of the thumbnail picture management section can be guaranteed:

\*Guarantee High Reliability of Thumbnail picture Management Area

. . . A backup area for the thumbnail picture management area is assured to prepare for thumbnail picture management area defects that may occur, and the recording location can be moved if any defects occur;

\*Guarantee High Reliability of Anchor Point Information Indicating Recording Location of Thumbnail picture Management Area . . . Anchor point information alone forms an ECC block to reduce the number of times of data change, and is recorded at two locations (first and second anchor points in FIG. 36); and \*Defect Management Process . . . When information playback from the thumbnail picture management section or anchor points is disabled due to dust or scratches on the disc (recording medium) surface, data can be read out again from the aforementioned backup section and re-recorded at another location. In this manner, a defective area is registered, and can be prevented from being used again.

Note that closed caption data, teletext data, or the like is often superposed on an original picture of thumbnail picture data used in the user menu. In such case, after characters are multiplexed, a thumbnail picture may be formed. Alternatively, a thumbnail picture may be formed based on character data alone.

Furthermore, a thumbnail picture for the user menu may be expressed by only a pointer to an original picture without storing any actual thumbnail picture data (this corresponds to the arrangement shown in FIG. 40 to be described later, in which a decoder generates and displays thumbnail pictures to prepare the user menu by hardware). With this method, since disc search is frequently done upon displaying the user menu, menu display requires a slightly long period of time. However, since no actual thumbnail pictures are stored, the disc size used can be reduced.

Figure 39:
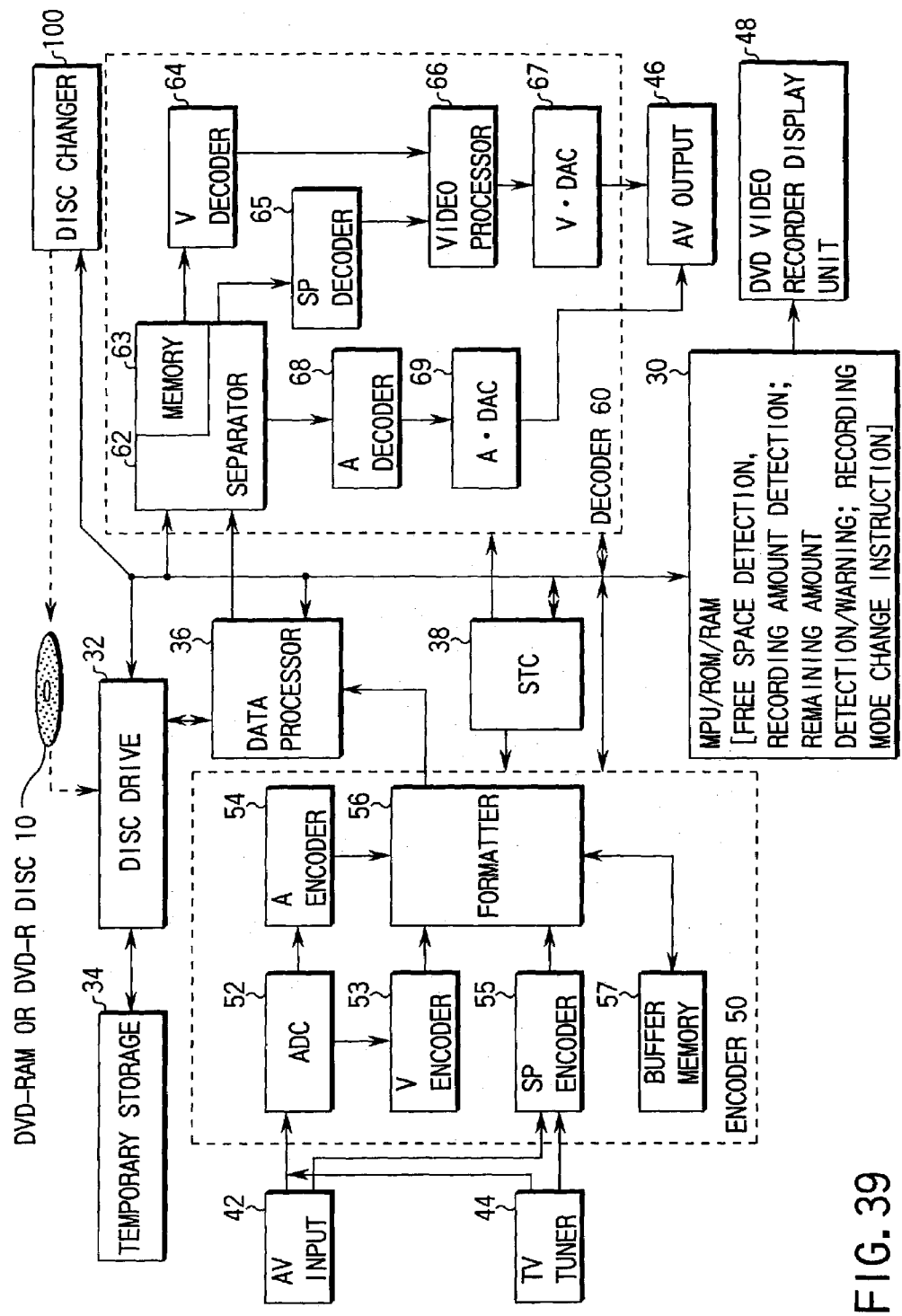
FIG. 39 is a block diagram for explaining the arrangement of an apparatus (DVD video recorder) for recording/playing back digital moving picture information on/from the disc shown in FIG. 1 at variable recording rates using information with the structure described with reference to FIG. 5.

FIG. 39 exemplifies the arrangement of an apparatus (DVD video recorder) which records/plays back digital moving picture information at a variable recording rate on the disc shown in FIG. 1 using information with the structure described above with reference to FIGS. 2 to 25.

The apparatus main body of the DVD video recorder shown in FIG. 39 is roughly constructed by a disc drive unit (32, 34, and the like) for rotating DVD-RAM (DVD-RW) disc 10, and reading/writing information to/from disc 10, encoder 50 on the video recording side, decoder 60 on the playback side, and microcomputer block 30 for controlling the operations of the apparatus main body.

Encoder 50 comprises ADC (analog-to-digital converter) 52, video encoder (V encoder) 53, audio encoder (A encoder) 54, sub-picture encoder (SP encoder) 55, formatter 56, and buffer memory 57.

ADC 52 receives an external analog video signal+external analog audio signal from AV input 42, or an analog TV signal+analog audio signal from TV tuner 44. ADC 52 converts the input analog video signal into a digital signal at a sampling frequency of, e.g., 13.5 MHz and 8 quantization bits (4:4:4 in MPEG). (In this case, luminance component Y, color difference component Cr (or Y-R), and color difference component Cb (or Y-B) are respectively quantized by 8 bits.)

Alternatively, ADC 52 converts luminance component Y of the input analog video signal into a digital signal at a sampling frequency of, e.g., 13.5 MHz and 8 quantization bits, and converts color difference component Cr (or Y-R) and color difference component Cb (or Y-B) into digital signals at a sampling frequency of 6.75 MHz and 8 quantization bits (4:2:2 in MPEG).

Similarly, ADC 52 converts the input analog audio signal into a digital signal at a sampling frequency of, e.g., 48 kHz and 16 quantization bits.

When an analog video signal and digital audio signal are input to ADC 52, the digital audio signal passes through ADC 52. (The digital audio signal may undergo processes for reducing jitter alone, changing the sampling rate or the number of quantization bits, and the like without changing its contents.)

On the other hand, when a digital video signal and digital audio signal are input to ADC 52, these signals pass through ADC 52 (these signals may also undergo a jitter reduction, sampling rate change process, and the like without changing their contents).

A digital video signal component output from ADC 52 is supplied to formatter 56 via video encoder (V encoder) 53. Also, a digital audio signal component output from ADC 52 is supplied to formatter 56 via audio encoder (A encoder) 54.

V encoder 53 has a function of converting the input digital video signal into a digital signal compressed at a variable bit rate by MPEG2 or MPEG1.

A encoder 54 has a function of converting the input digital audio signal into a digital signal compressed at a fixed bit rate (or linear PCM digital signal) by MPEG or AC-3.

When a DVD video signal with the data structure shown in FIGS. 11 to 13 or FIG. 72 (without navigation packs when the signal is recorded on a DVD-RAM/DVD-RW; with navigation packs when the signal is recorded on a DVD-R) is input from AV input 42 or when a DVD video signal with such data structure is broadcasted and received by TV tuner 44, a sub-picture signal component (sub-picture pack) in the DVD video signal can be extracted from a sub-picture encoder, e.g., a DVD video player with a sub-picture signal independent output terminal. Sub-picture data input to SP encoder 55 is arranged into a predetermined signal format, and is then supplied to formatter 56.

Formatter 56 performs predetermined signal processes for the input video signal, audio signal, sub-picture signal, and the like while using buffer memory 57 as a work area, and outputs recording data that matches the format (file structure) described above with reference to FIGS. 2 to 25 to data processor 36.

The contents of standard encoding for generating the recording data will be briefly explained. That is, when encoder 50 shown in FIG. 39 starts encoding, parameters (see step ST20 in FIG. 49; to be described later) required for encoding video (main picture) data and audio data are set. The main picture data is pre-encoded using the set parameters to compute an optimal code amount distribution to a predetermined average transfer rate (recording rate). Based on the code amount distribution obtained by pre-encoding, the main picture data is encoded. At this time, the audio data is encoded at the same time.

As a result of pre-encoding, when data compression is insufficient (when a desired video program cannot be stored in a DVD-RAM or DVD-R disc used to record data), if pre-encoding can be done again (for example, if the recording source is the one capable of read many such as a video tape, video disc, or the like), the main picture data is partially re-encoded, and the re-encoded main picture data portion replaces the previously pre-encoded main picture data portion. With a series of such processes, the main picture data and audio data are encoded, and the average bit rate value required for recording is reduced largely.

Likewise, parameters required for encoding the sub-picture data are set, and encoded sub-picture data is generated.

The encoded main picture data, audio data, and sub-picture data are combined and converted into a data structure for video recording.

That is, cells as minimum units of the main picture data (video data) are set, and cell playback information (CELL_PLY_INF) shown in FIG. 23 or cell playback information (C_PBI) shown in FIG. 24 is generated. Then, the structure of cells that construct a program chain shown in FIG. 4 or 5, attributes of main picture, sub-picture, and audio data, and the like are set (some pieces of such attribute information use information obtained upon encoding the individual data), and information management table information (VMGI_MAT in FIG. 15, VTSI_MAT in FIG. 17, or PLY_MAT in FIG. 18) containing various kinds of information is created.

The encoded main picture data, audio data, and sub-picture data are segmented into packs each having a predetermined size (2,048 bytes or 2 kbytes). Dummy packs (FIG. 14) are inserted into these packs as needed. Packs other than the dummy packs describe time stamps such as a PTS (presentation time stamp), DTS (decoding time stamp), and the like as needed. As for the PTS of sub-picture data, a time arbitrarily delayed from that of main picture data or audio data in the same playback time zone can be described.

Figure 72:
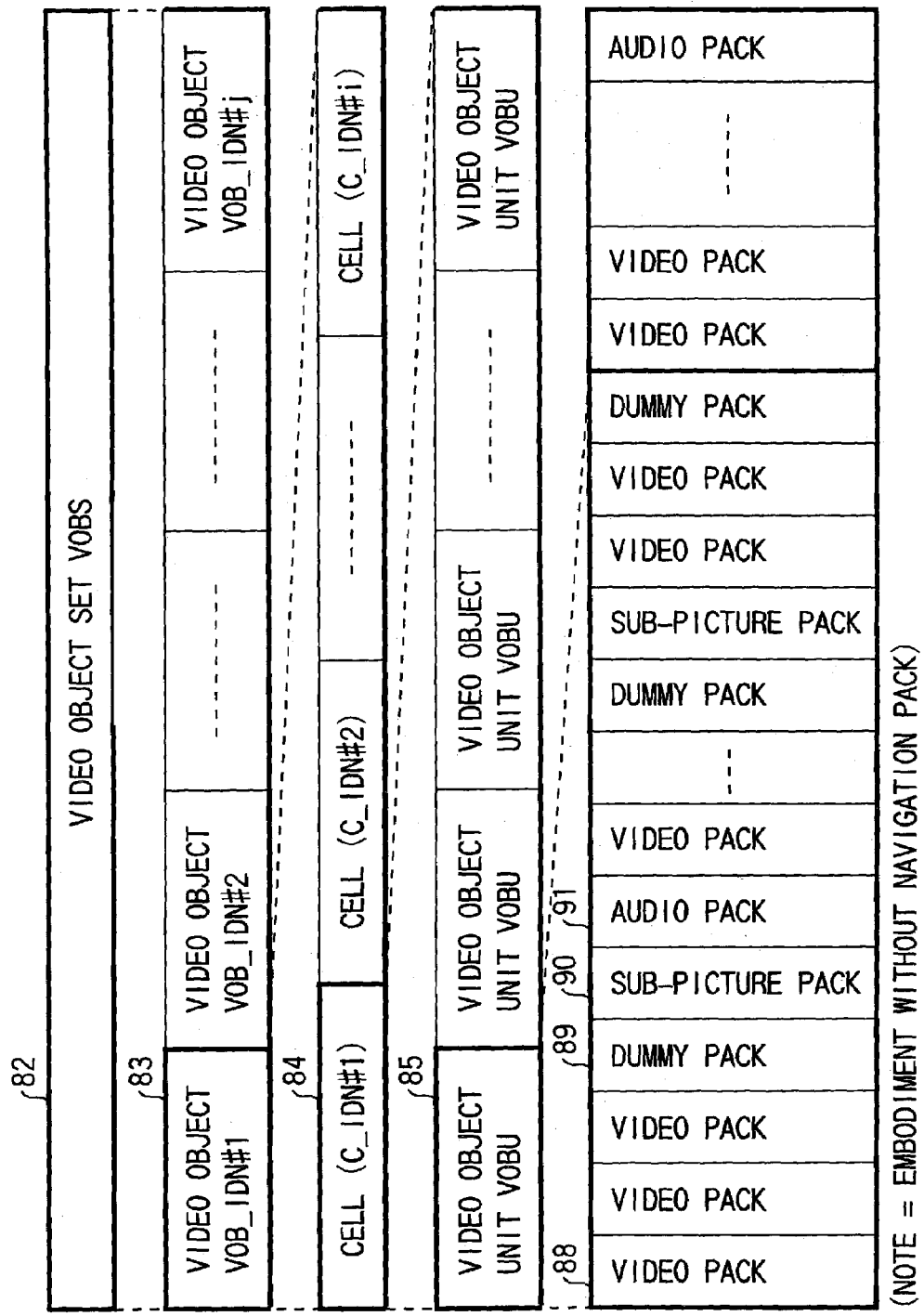
FIG. 72 is a view showing an example (without navigation packs) of the hierarchical structure of information included in video object set VOBS shown in FIG. 4.

The data cells are arranged in units of VOBUs 85 so as to play back data in the order of their time codes, thus forming VOB 83 constructed by a plurality of cells, as shown in FIG. 72. VOBS 82 (without navigation packs) which combines one or more VOBs 83 is formatted to the structure shown in FIGS. 2 to 4. Alternatively, VOBS 82 (with navigation packs, as shown in FIG. 11) which combines one or more VOBs 83 is formatted to the structure shown in FIG. 5.

When a DVD playback signal is digitally copied from a DVD video player, since the contents of cells, program chain, management tables, time stamps, and the like are predetermined, they need not be generated again. (When a DVD video recorder is designed to digitally copy a DVD playback signal, copyright protection means such as digital watermarking, serial copy management system SCMS, charges for copyrights on raw discs, and the like must be taken.)

The disc drive unit that writes/reads (records and/or plays back) information to/from DVD disc 10 comprises disc changer 100, disc drive 32, temporal storage 34, data processor 36, and system time counter (or system time clock; STC) 38.

Temporal storage 34 is used to buffer a predetermined amount of data of those to be written in disc 10 via disc drive 32 (i.e., data output from encoder 50), and to buffer a predetermined amount of data of those played back from disc 10 via disc drive 32 (i.e., data input to decoder 60).

For example, when temporal storage 34 is comprised of a semiconductor memory (DRAM) of 4 to 8 Mbytes, it can buffer recording or playback data for approximately 8 to 16 sec at an average recording rate of 4 Mbps. On the other hand, when temporal storage 34 is comprised of a 16-Mbyte EEPROM (flash memory), it can buffer recording or playback data for approximately 32 sec at an average recording rate of 4 Mbps. Furthermore, when temporal storage 34 is comprised of a 100-Mbyte very compact HDD (hard disc), it can buffer recording or playback data for 3 min or more at an average recording rate of 4 Mbps.

Temporal storage 34 can also be used to temporarily store recording information until disc 10 is exchanged by a new one, when disc 10 has been fully recorded during video recording.

Furthermore, when disc drive 32 uses a high-speed drive (double-speed or higher), temporal storage 34 can be used to temporarily store data that excesses data to be read out from a normal drive within a predetermined period of time. When read data upon playback is buffered on temporal storage 34, even when an optical pickup (not shown) produces read errors due to a vibration shock or the like, playback data buffered on temporal storage 34 can be used alternatively, thus preventing the played back picture from being interrupted.

When the DVD video recorder has an external card slot (not shown in FIG. 39), the EEPROM may be sold as an optional IC card. On the other hand, when the DVD video recorder has an external drive slot or SCSI interface, the HDD can be sold as an optional expansion drive.

In an embodiment (a DVD video recorder is implemented by software using a personal computer) shown in FIG. 48 (to be described later), the free space of a hard disc drive or a main memory of the personal computer can be partially used as temporal storage 34 in FIG. 39.

Data processor 36 in FIG. 39 supplies DVD recording data output from encoder 50 to disc drive 32, receives a DVD playback signal played back from disc 10 via drive 32, rewrites management information (the directory record in FIG. 10, VMGI_MAT in FIG. 15, VTSI_MAT in FIG. 17, PLY_MAT in FIG. 18, and the like) recorded on disc 10, and erases data recorded on disc 10 under the control of microcomputer block 30.

Microcomputer block 30 includes an MPU (or CPU), a ROM written with control programs and the like, and a RAM that provides a work area required for executing programs.

The MPU in microcomputer block 30 executes free space detection (ST12 in FIG. 49 and the like), recording amount (the number of recorded packs) detection (see FIGS. 44 to 47), remaining amount detection (ST420A in FIG. 51 and the like), warning (see FIG. 57), recording mode change instruction, and other processes (FIGS. 40 to 56 or FIGS. 58 to 67) using the RAM as a work area in accordance with the control programs stored in the ROM.

Of the execution results of MPU 30, the contents (FIG. 57, FIGS. 68 to 71, or the like) that the DVD video recorder user is informed of are displayed on display 48 of the DVD video recorder, or are displayed on a monitor display (FIG. 57) in an on-screen display (OSD) mode.

The control timings that MPU 30 controls disc changer 100, disc drive 32, data processor 36, and encoder 50 and/or decoder 60 can be determined based on time data output from STC 38 (video recording/playback operations are normally done in synchronism with time clocks from STC 38, but other processes may be executed at timings independently of STC 38).

Decoder 60 comprises separator 62 for separating and extracting packs from DVD playback data with the pack structure shown in FIGS. 11 to 13 or FIG. 72, memory 63 used upon signal processes such as pack separation and the like, video decoder (V decoder) 64 for decoding main picture data (the contents of video pack 88, 88A, or 88B) separated by separator 62, sub-picture decoder (SP decoder) 65 for decoding sub-picture data (the contents of sub-picture pack 90) separated by separator 62, audio decoder (A decoder) 68 for decoding audio data (the contents of audio pack 91) separated by separator 62, video processor 66 for synthesizing sub-picture data output from SP decoder 65 with video data output from V decoder 64, as needed, and outputting main picture data with superimposed sub-picture data such as menus, highlight buttons, superimposed dialog, and the like, video digital-to-analog converter (V·DAC) 67 for converting a digital video output from video processor 66 into an analog video signal, and audio digital-to-analog converter (A·DAC) 69 for converting a digital audio output from A decoder 68 into an analog audio signal.

The analog video signal output from V·DAC 67 and analog audio signal from A·DAC 67 are supplied to external components (not shown; a multichannel stereophonic apparatus having two to six channels+monitor TV or projector) via AV output 46.

Figure 57:
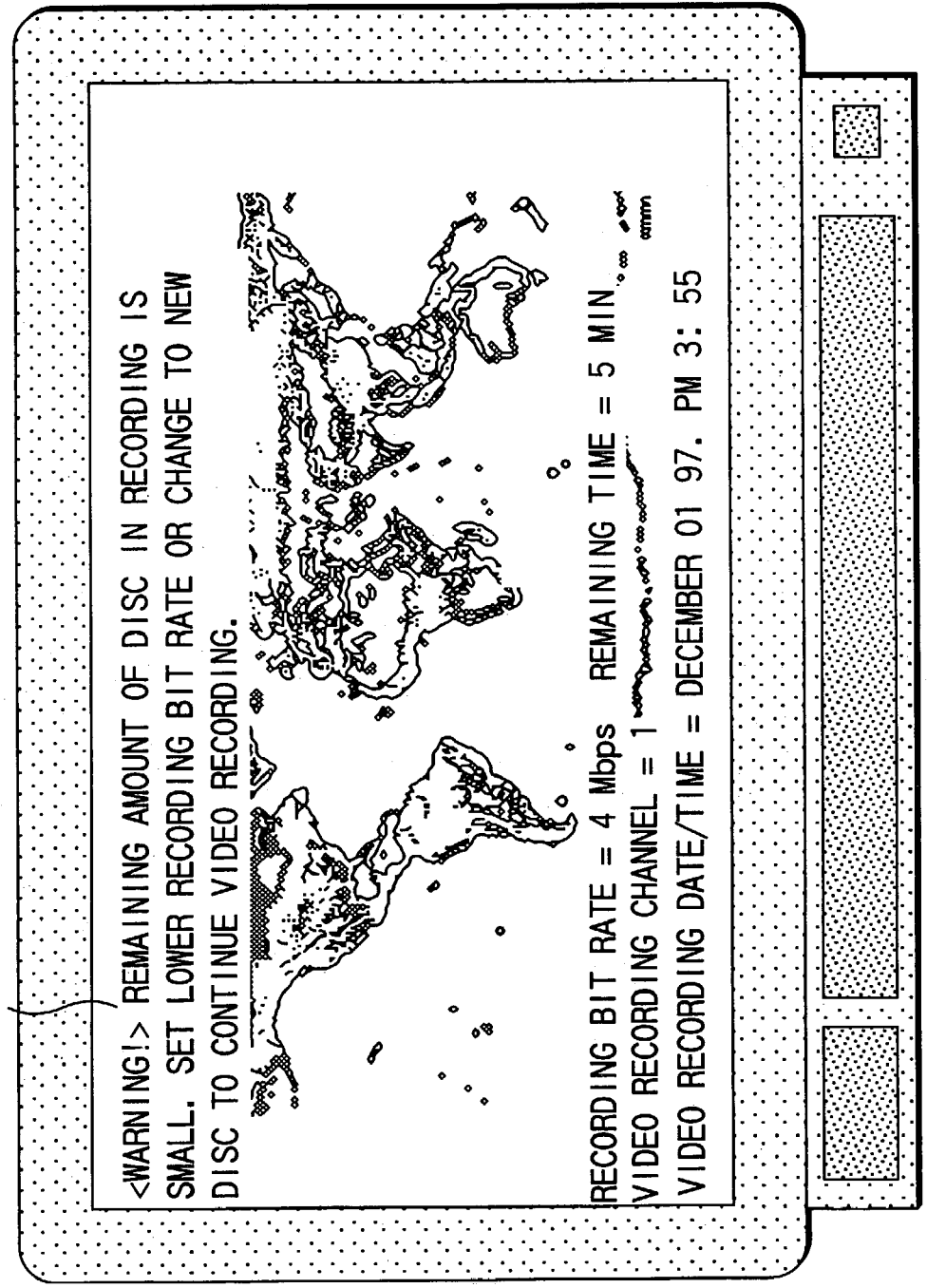
FIG. 57 is a view showing a display example of a warning message, an average recording rate, the remaining recordable time at that rate, and the like displayed when the remaining size of the disc in recording becomes small.

OSD data output from MPU 30 is input to separator 62 of decoder 60, and is then input to video processor 66 through V decoder 64 (without being decoded). The OSD data is superimposed on main picture data, and these data are supplied to an external monitor TV connected to AV output 46. Then, a warning message shown in, e.g., FIG. 57 is displayed together with a main picture.

Figure 40:
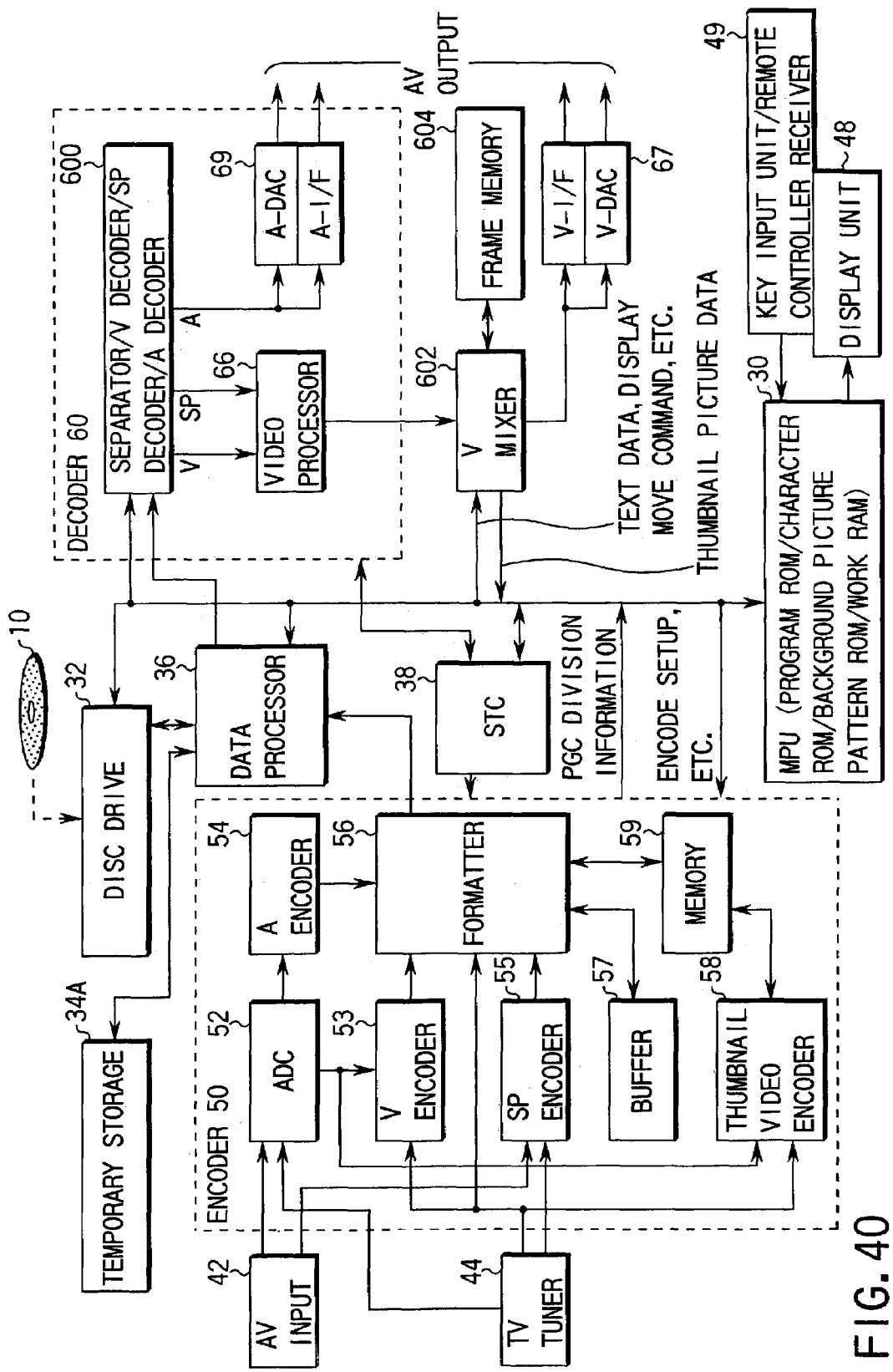
FIG. 40 is a block diagram for explaining an example of an apparatus (DVD video recorder) which records/plays back digital moving picture information on the disc shown in FIG. 1 using information with the structure described with reference to FIGS. 2 to 4, and has a function of creating a user menu.

FIG. 40 is a block diagram for explaining an example of an apparatus (DVD video recorder) which records/plays back information with the structure described above with reference to FIGS. 2 to 4 on the disc shown in FIG. 1 at a variable recording rate, and has a function of creating a user menu.

In the following description, common reference numerals denote common parts to those in FIG. 39, a repetitive description thereof will be omitted, and the arrangement unique to FIG. 40 will be mainly explained.

Data processor 36 can directly access large-capacity temporary storage 34A.

Encoder 50 includes thumbnail video encoder for generating a thumbnail picture used in a user menu upon encoding, and memory (RAM) 59 which is used as a work area upon encoding a thumbnail picture. This memory 59 is used to save thumbnail pictures for the user menu.

Decoder 60 includes circuit block 600 that integrates the functions of separator 62, V decoder 64, SP decoder 65, and A decoder 68 in FIG. 39, video processor 66 for processing video and sub-picture data decoded by circuit block 600, and audio DAC & digital audio output interface 69 for converting audio data (digital) decoded by circuit block 600 into an analog signal, and outputting the analog audio signal.

The apparatus shown in FIG. 40 further comprises, on the decode side, video mixer (V mixer) 602, frame memory 604, and video DAC & digital video output interface 67 for converting video data (digital) mixed with user menu data as needed by V mixer 602 into an analog signal, and outputting the analog video signal.

As will be described in detail later, MPU 30 supplies encode setting data to encoder 50, and receives PGC division information (see descriptions of FIGS. 28 to 32) from encoder 50. MPU 30 receives thumbnail picture data used in the user menu from V mixer 602, and supplies text data to be displayed on the user menu, a menu display move command, and background picture data of the user menu if required to V mixer 602. Text data supplied from MPU 30 to V mixer 602 can be input from key input unit 49. This text data can be used as a query keyword.

The data processes in the apparatus in FIG. 40 can be classified into two processes, i.e., a video recording process and playback process.

In the video recording process, upon receiving a video recording command (e.g., an ON event of a video recording button of a remote controller or the like) from the user, MPU 30 loads management data from disc drive 32, and determines a write area on disc 10 set in the drive. MPU 30 then sets a management area to write the determined area, and sets the write start address of video data in disc drive 32, thus preparing for data recording.

MPU 30 then resets a timer of STC 38. Note that STC 38 is a system timer, and video recording/playback is done with reference to this timer value. Upon resetting the timer, PGC division setups are also made.

For example, when PGCs are divided at given time intervals. MPU 30 sets the divide time interval to be 15 min, as shown in FIG. 29. On the other hand, when PGCs are divided based on a stereo/monaural switching signal (or stereo/bilingual switching signal) of an audio signal, MPU 30 executes that setup for encoder 50. Furthermore, MPU 30 makes various other required setups.

In the arrangement shown in FIG. 40, the flow of a video signal upon video recording is as follows.

An external AV signal input from TV tuner 44 or AV input 42 is A/D-converted into digital signals. A digital video signal is input to V encoder 53 and thumbnail video encoder 58. A digital audio signal is input to A encoder 54. Also, TV tuner 44 inputs a text signal such as a closed caption signal, teletext signal, or the like to SP encoder 55.

Furthermore, a mode change signal of source data for PGC division (stereo/monaural signal, picture aspect change signal, or the like) is input from TV tuner 44 to encoder 50.

The respective encoders (53 to 55) compress and packetize the input signals (video, audio, and sub-picture). (Note that packets are segmented and packetized to have a size of 2,048 bytes per pack.) These compressed signals are input to formatter 56. Formatter 56 determines and records presentation time stamp PTS and decoding time stamp DTS of each packet in accordance with the timer value from STC 38 as needed.

In this case, packets of thumbnail pictures used in the user menu are transferred to and temporarily saved in memory 59 for storing thumbnail pictures. The size of each thumbnail picture on the user menu is selected to be, e.g., approximately 144 pixels×96 pixels.

In the arrangement shown in FIG. 40, MPEG2 compression, which is the same as the compression format of main picture data, can be used as that of thumbnail pictures, but other compression schemes may be used. For example, other compression schemes such as JPEG compression, runlength compression (pallet 2.56 colors: requires a reduction to 256 colors), TIFF format, PICT format, and the like can be used.

Formatter 56 temporarily saves packet data in buffer memory 57, then packs the input packet data to mix them in units of GOPs of MPEG (no navigation pack is appended in the data structure shown in FIGS. 2 to 4), and transfers the packs to data processor 36.

At this time, formatter 56 sends the PGC divide addresses to MPU 30 as PGC division information.

Data processor 36 forms ECC groups by combining packs sent from formatter 56 in units of 16 packs, appends error correction information to each ECC group, and sends these ECC groups to disc drive 32. In this case, when disc drive 32 is not ready to record on disc 10, ECC group data appended with error correction information are transferred to temporary storage 34A, and are temporarily stored therein until drive 32 is ready to record. When disc drive 32 is ready to record, recording of data stored in temporary storage 34A on disc 10 starts.

Note that a large-capacity memory, high-speed HDD, or the like is assumed as temporary storage 34A, since it must hold recording data for several min or more by high-speed access.

Upon completion of video recording based on the data structure shown in FIGS. 2 to 4, MPU 30 generates and records PGC information table PGCIT (see FIGS. 20 and 21) in playback control information DA211 (see FIG. 3) in accordance with the PGC divide address information previously received from encoder 50.

Note that MPU 30 can access data processor 36 via an MPU bus to read/write contents of a file management area and the like. With this access, MPU 30 can make a read/write from/to a track buffer in data processor 36.

On the other hand, thumbnail picture data for the user menu may be inserted into recording data as independent video pack data in place of an independent file. That is, as shown in FIG. 13, the DVD video format specifies "0" (stream ID: 0E0h) as a stream number for main picture data, and can also specify "1" (stream ID: 0E1h) as that for thumbnail picture data and multiplex such stream. The multiplexed thumbnail pictures with the stream number="1" serve as source data used in a menu edit process.

When an independent file for thumbnail pictures is created, this file serves as an independent file used upon creating a user menu file (to be described later). This independent file can also be a source file used in the user menu edit process.

Furthermore, when a user menu file is automatically created, first frame data of PGC is encoded by thumbnail video encoder 58 as source data of a thumbnail picture, and the encoded data is stored in memory 59. Upon completion of recording, after a header of the user menu file is created, a packet data group stored in memory 59 is recorded on disc 10.

In the arrangement shown in FIG. 40, the data processes upon playback are done as follows.

Upon receiving a playback start command by user's operation, MPU 30 loads the management area of disc 10 from disc drive 32 via data processor 36, and determines the playback address.

MPU 30 then sends the previously determined address of playback data and a read command to disc drive 32.

Disc drive 32 reads out sector data from disc 10 in accordance with the received command, and data processor 36 makes error correction of the readout data and sends them to decoder 60 in the form of pack data.

In decoder 60, the separator in circuit block 600 receives the readout pack data and packetizes them. Then, video packet data (MPEG video data) is transferred to the video decoder, audio packet data to the audio decoder, and sub-picture packet data to the SP decoder in correspondence with the data purposes.

At the beginning of transfer of these packet data, presentation time stamp PTS of each packet is loaded to STC 38. After that, the respective decoders in circuit block 600 execute playback processes in synchronism with the PTS value in packet data (while comparing PTS and STC values), thus displaying a moving picture with audio and superimposed dialog on a TV monitor (not shown).

When thumbnail pictures for the user menu are displayed, the thumbnail picture file previously saved as an independent file is flowed as stream packs, and is displayed by designating display positions (X- and Y-coordinate values) in frame memory 604. At this time, if text data or the like is included, text is displayed below each thumbnail picture using a character ROM (or kanji ROM).

Figure 41:
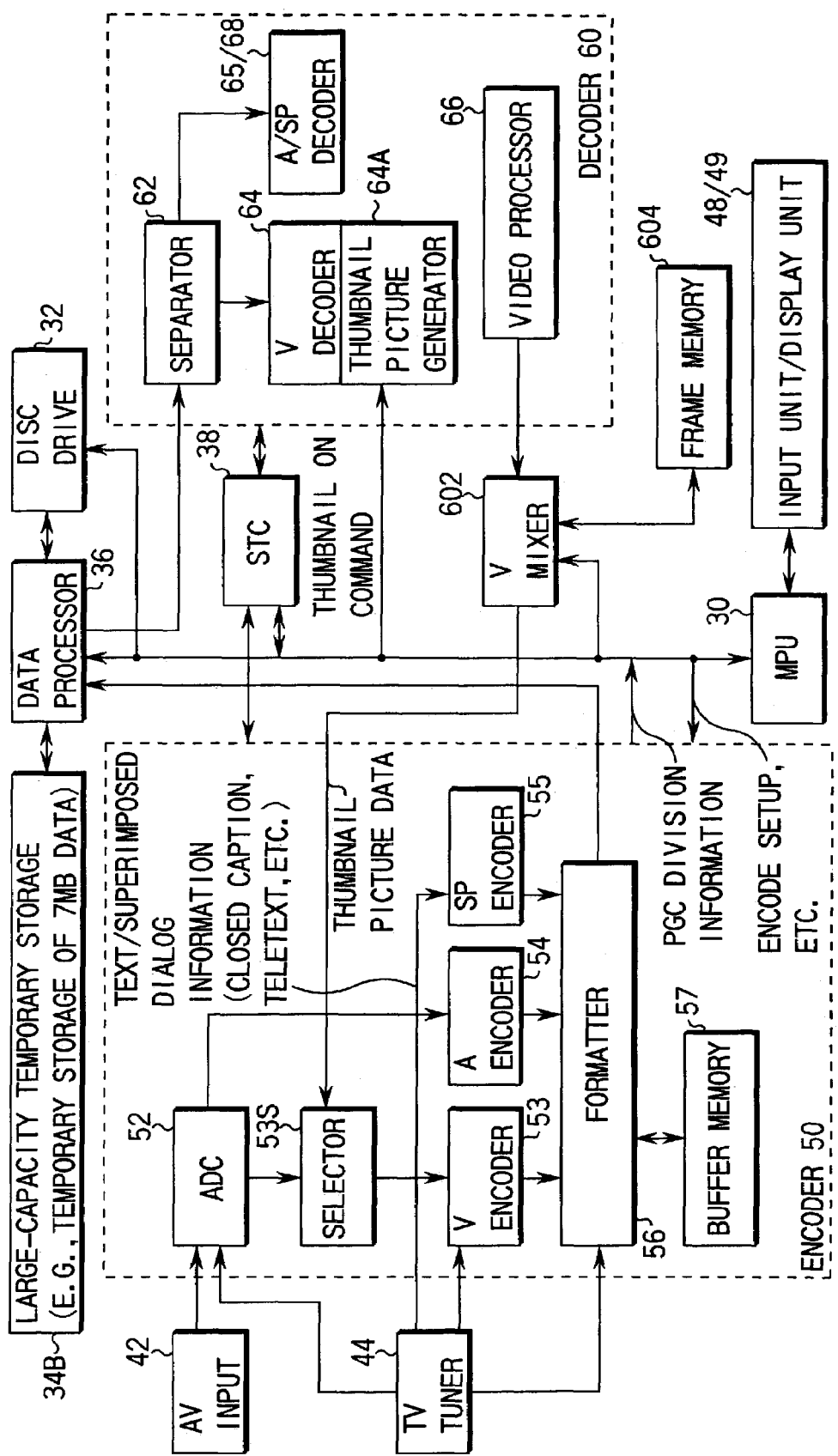
FIG. 41 is a block diagram for explaining another example of an apparatus (DVD video recorder) which records/plays back digital moving picture information on the disc shown in FIG. 1 using information with the structure described with reference to FIGS. 2 to 4, and has a function of creating a user menu.

FIG. 41 is a block diagram for explaining another example of an apparatus (DVD video recorder) which records/plays back information with the structure described above with reference to FIGS. 2 to 4 on the disc shown in FIG. 1 at a variable recording rate, and has a function of creating a user menu.

In the following description, common reference numerals denote common parts to those in FIG. 39 or 40, a repetitive description thereof will be omitted, and the arrangement unique to FIG. 41 will be mainly explained.

The arrangement shown in FIG. 41 includes large-capacity temporary storage 34B, video mixer 602, frame memory (for two frames of text and video signals) 604, and the like. Video DAC/interface 67 and audio DAC/interface 69 shown in FIG. 40 are not shown in FIG. 41, but are also used in the arrangement in FIG. 41.

Encoder 50 shown in FIG. 41 includes ADC 52 for converting analog video and audio signals from external AV input 42 or TV tuner 44 into digital signals, selector 53S for selecting one of a digital video signal from ADC 52 and thumbnail picture data from video mixer 602 and sending selected data to video encoder 53, video encoder 53 which uses buffer memory 57 as a work area, and formatter 56 for packing various data from audio data 54 and sub-picture encoder 55.

Decoder 60 shown in FIG. 41 includes separator 62 for separating a playback pack transferred from data processor 36 into main picture, sub-picture, and audio data, audio/sub-picture decoder 65/68 for expanding (decoding) audio and sub-picture data separated by separator 62 by a predetermined method, video decoder 64 for expanding (decoding) main picture data separated by separator 62 by a predetermined method, and thumbnail picture generator 64A for executing a process for displaying the decoded video stream as a thumbnail picture.

In the arrangement shown in FIG. 41, the processes upon video recording are done as follows.

Upon receiving a video recording command, MPU 30 loads management data from disc drive 32, and determines a write area in disc 10 (not shown). MPU 30 then sets a management area to write the determined area, and sets the write start address of video data in disc drive 32, thus preparing for recording data.

MPU 30 resets the time of STC 30. Note that STC 38 is a system timer, and video recording/playback is done with reference to this timer value. At this time, PGC division setups are also made.

As division conditions, division at given time intervals (FIG. 29), division based on a stereo/monaural switching signal of an audio signal (FIG. 28), division based on a switching signal for aspect ratios 16:9 and 4:3 of an image mode, division based on a scene with an abrupt change in picture data which is determined upon encoding (FIG. 32), and the like may be used.

MPU 30 sets the type of PGC division condition setup, and required parameters (e.g., the time interval upon division at given time intervals, or the like) in encoder 50. Furthermore, MPU 30 makes various other setups.

In the arrangement shown in FIG. 41, the flow of a video signal is as follows.

In order to encode main picture data, selector 53S in encoder 50 is switched to the main picture selection side.

A digital video signal obtained by A/D-converting by ADC 52 an external AV signal input from TV tuner 44 or AV input 42 is transferred to V encoder 53 via selector 53S. A digital audio signal A/D-converted by ADC 52 is transferred to A encoder 54. If broadcast from TV tuner 44 includes character/superimposed dialog information (characters such as closed caption, teletext, and the like), that text signal is transferred to SP encoder 55.

Furthermore, a stereo/monaural signal (or stereo/bilingual signal) used in PGC division is input from TV tuner 44 to encoder 50.

The respective encoders (53 to 55) compress and packetize the input signals. (Note that packets are segmented and packetized to have a size of 2,048 bytes per pack.) These packetized signals are input to formatter 56. Formatter 56 determines and records presentation time stamp PTS and decoding time stamp DTS of each packet in accordance with the timer count value from STC 38 as needed.

Formatter 56 temporarily saves packet data in buffer memory 57, and then packs the input packet data to mix them in units of GOPs of MPEG. Formatter 56 transfers a data stream appended with navigation packs at the head of each GOP as needed to data processor 36. At this time, the PGC divide address is sent to MPU 30 and is used as PGC division information.

Data processor 36 in FIG. 41 forms ECC groups by combining packs in units of 16 packs (=32 kbytes), appends error correction information to each ECC group, and sends these ECC groups to disc drive 32. In this case, when disc drive 32 is not ready to record on disc 10, ECC group data appended with error correction information are transferred to temporary storage 34A, and wait until drive 32 is ready to record. When disc drive 32 is ready to record, recording of data stored in temporary storage 34A on disc 10 starts.

Note that a large-capacity memory, high-speed HDD, or the like is assumed as temporary storage 34A, since it must hold recording data for several min or more by high-speed access.

Upon completion of video recording based on the data structure shown in FIGS. 2 to 4, MPU 30 generates and records PGC information table PGCIT (see FIGS. 20 and 21) in playback control information DA211 (see FIG. 3) in accordance with the previously received PGC divide address information.

Note that MPU 30 can access data processor 36 via an MPU bus to read/write contents of a file management area and the like.

In the arrangement shown in FIG. 41, the data processes upon playback are done as follows.

Upon receiving a playback start command input by the user, MPU 30 loads the management area from disc drive 32 via data processor 36, and determines the playback address. MPU 30 then sends the determined address of playback data and a read command to disc drive 32.

Disc drive 32 reads out sector data from disc 10 in accordance with the received command, and data processor 36 makes error correction of the readout data and sends them to decoder 60 in the form of pack data.

In decoder 60, separator 62 receives the readout pack data and packetizes them. Then, video packet data (MPEG video data) is transferred to V decoder 64, and audio/sub-picture packet data to A/SP decoder 65/68 in correspondence with the data purposes.

At the beginning of transfer of these packet data, presentation time stamp PTS of each packet is loaded to STC 38. After that, the respective decoders (64, 65/68) execute playback processes in synchronism with the PTS value in packet data (while comparing PTS and STC values), thus displaying a moving picture with audio and superimposed dialog on a TV monitor (not shown).

Upon generating thumbnail pictures for a user menu, MPU 30 issues a thumbnail display command (thumbnail ON command) to V decoder 64, and designates the display positions to video mixer 62. In this manner, thumbnail pictures for a user menu can be displayed on a TV monitor (not shown). When the user selects data to be saved, thumbnail picture data are transferred from V mixer 602 to V encoder 53 via selector 53S. The transferred thumbnail picture data are packetized by V encoder 53 and are packed by formatter 56, and pack data are recorded on disc 10 via data processor 36.

Upon displaying thumbnail pictures for a user menu on a TV monitor (not shown) or the like, a thumbnail picture file saved as an independent file is flowed as stream packs, and is displayed by designating display positions in frame memory 604. At this time, if text data or the like is included, text is displayed below each thumbnail picture using a kanji ROM or the like.

Figure 42:
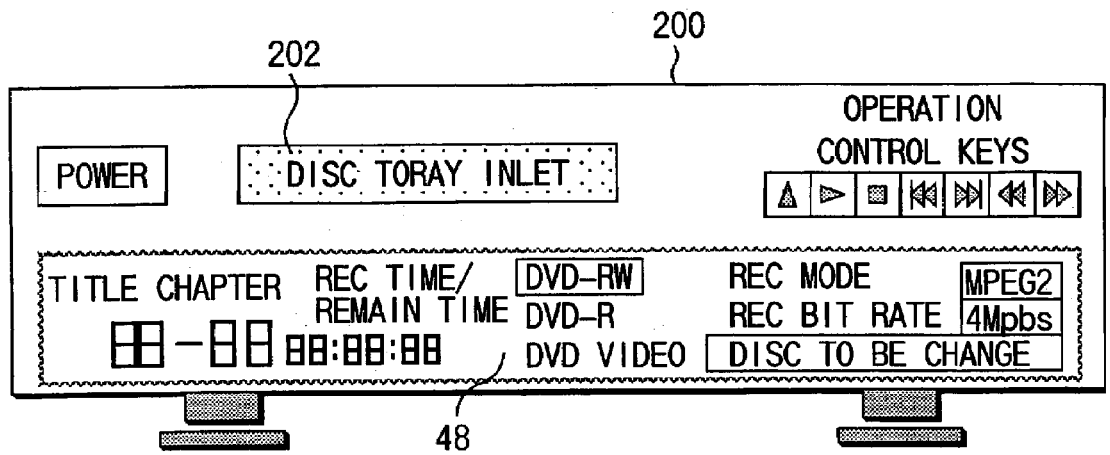
FIG. 42 is a view showing an example of a front panel of the apparatus main body of the DVD video recorder shown in FIGS. 39 to 41.

FIG. 42 shows the outer appearance of apparatus main body 200 of DVD video recorder shown in FIGS. 39 to 41, and an example of its front panel.

When the user has pressed open/close button 5g of remote controller 5 (to be described later with reference to FIG. 43), disc tray inlet 202 shown in FIG. 42 opens forward.

DVD-RAM or DVD-RW disc (a cartridge containing a disc) 10 or DVD-R disc (bare disc) 10 used in video recording is set on this disc tray.

Subsequently, when the user has pressed open/close button 5g on remote controller 5, disc tray inlet 202 closes, and disc (e.g., DVD-RW) 10 set on the tray is loaded into disc drive 32 in apparatus main body 200. Then, disc drive 32 is automatically started, and MPU 30 reads physical format information (including disc structure data, free space data of a blank disc, and the like) shown in FIG. 8.

MPU 30 then reads control information DA21 (including playback control information DA211, thumbnail control information DA214, and the like) shown in FIGS. 2 to 4. When set disc 10 is a new DVD-RW disc (or DVD-RAM disc), an item "DVD-RW" on display unit (liquid crystal or fluorescent display panel) 48 of the DVD video recorder shown in FIG. 42 is displayed in an easy-to-see manner. Also, a recording time "00 (hour):00 (min):00 (sec)" is displayed, and a recording title/chapter "00-00" is displayed (once video recording has been done, the recording title/chapter display changes like "01-01").

If the apparatus default or user setup indicates a recording mode=MPEG2 and a recording average bit rate=4 Mbps, items "MPEG2" and "4 Mbps" are displayed on display unit 48 to stand out.

Furthermore, when video recording on set disc 10 has progressed, and the recordable time on that disc 10 becomes small (e.g., 5 min), MPU 30 detects it (e.g., YES in ST422A in FIG. 51), and an item "DISC TO BE CHANGED" that prompts the user to exchange the disc is displayed on display unit 48 in an easy-to-see manner.

The front panel of DVD video recorder main body 200 also has basic operation keys such as a power switch button, open/close key, playback key, stop key, chapter/program skip key, rewind key, fastforward key, recording start button (not shown), and the like.

Note that FIG. 42 assumes a case wherein the DVD video recorder does not incorporate any disc changer 100 in FIG. 39 (i.e., disc changer 100 is connected to apparatus main body 200 in FIG. 42 as an optional external device via a SCSI cable or the like). In such case, the above-mentioned item "DISC TO BE CHANGED" begins to be lit up or flicker slightly before disc 10 set in the apparatus main body is used up during video recording. After that when the remaining amount of disc 10 becomes zero, video recording automatically proceeds to one or-more DVD-RW discs 10 set in external disc changer 100.

Alternatively, two or more DVD video recorders may be prepared, and their MPUs 30 may be connected by daisy chain via a communication cable to attain relay recording using two or more DVD video recorders. In such case, "the first recorder may record using MPEG2/average bit rate=4 Mbps for 1 hour, and the second recorder may record using MPEG2/average bit rate=2 Mbps for 2 hours".

In case of relay video recording using a plurality of DVD video recorders, a message reading, e.g., "recorder A records using MPEG2/average bit rate=4 Mbps for 1 hour, and recorder B records using MPEG2/average bit rate=2 Mbps for 2 hours" may be displayed on the monitor screen.

Note that the DVD video recorder shown in FIGS. 39 to 41 does not record any warning or messages to the user on disc 10. However, video recording information (video recording average bit rate, video recording channel number, video recording date/time, and the like) exemplified on the lower portion of the monitor screen shown in FIG. 57 may be recorded on disc 10 for several seconds immediately after the beginning of video recording.

Figure 43:
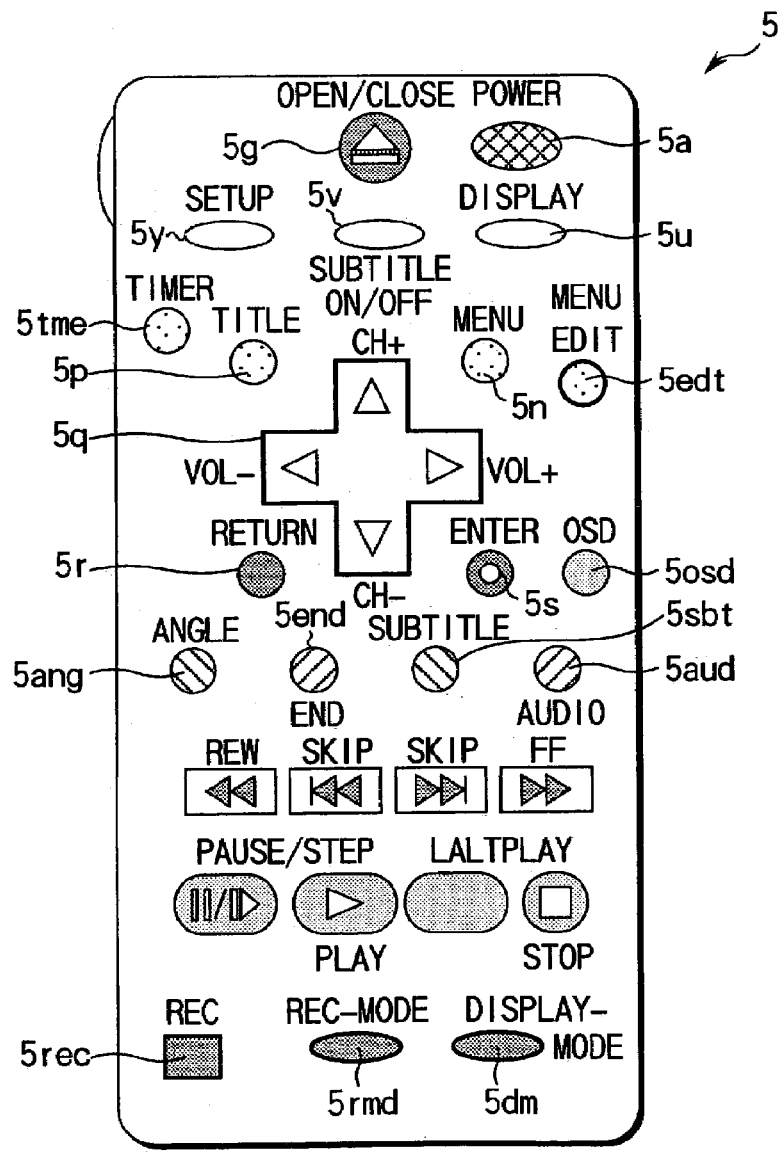
FIG. 43 is a view showing an example of a remote controller used to operate the DVD video recorder shown in FIGS. 39 to 41.

FIG. 43 shows an example of remote controller 5 used to operate the DVD video recorder shown in FIGS. 39 to 41. Fundamental operations may be made by operation keys provided to the front panel of DVD video recorder main body 200 shown in FIG. 42, but various kinds of operations that utilize the features of DVD are done by remote controller 5.

The functions (or the ways of use) of only keys that pertain to operations as the characteristic features of the DVD video player of those on remote controller 5 shown in FIG. 43 will be explained below.

[Function of Power Key (POWER) 5a]

*The power key turns on/off the secondary side of an AC power supply circuit of the apparatus main body.

*When the power key is pressed while a disc is set inside the apparatus, the type of disc (DVD-RW, DVD-R, or DVD video) is determined and displayed. If that disc cannot be played back, a message indicating this is displayed.

[Function of Open/close Key (OPEN/CLOSE) 5g]

*The open/close key opens/closes the disc tray. When the open/close key is pressed during disc playback, the apparatus operation made so far ends, and the disc tray opens. The operation of key 5g is invalid during video recording.

*When the open/close key is pressed while the disc tray is open, the disc tray is retracted into the apparatus main body. At this time, if a disc is set on the tray, its management information is read, and the type of set disc (DVD-RW, DVD-R, or DVD video) is displayed. If that disc cannot be played back, a message indicating this is displayed.

[Function of Menu key (MENU) 5n]

*When a disc is set on the tray, the root menu in the currently selected video title set recorded on the disc is played back and displayed. When no disc is set, an error (or warning) display is made (OSD).

*When no root menu is included in the currently selected video title set, an error (or warning) display is made (OSD).

*After a menu is played back by pressing this menu key during normal playback, when the control exits the menu display by pressing the menu key, playback restarts from the position played back before menu playback or a position designated by the menu.

*When the menu key is pressed while the root menu is displayed, the display state returns to that before the root menu was displayed.

In case of DVDRAM video (DVD-RW video), the user menu is used. That is, when no root menu is available on the disc but the user menu is available, the user menu is used upon operation of the menu key.

[Function of Title Key (TITLE) 5p]

*When a disc is set on the tray, and it records a title menu, the title menu is displayed. When no disc is set, an error (or warning) display is made (OSD).

*When no title menu is recorded on the disc set on the tray, the following operations can be made while the disc is being played back (or in the halt state).

More specifically, when the title key is pressed, the title number and chapter number are displayed on a given portion (e.g., the upper left corner) of the screen. When the title key is pressed once again, or when a predetermined period of time (e.g., 3 sec) elapses without any key operations after that, the title number and chapter number are cleared from the screen.

When the title number (e.g., "1") and chapter number (e.g., "1") are displayed on the screen, and the user inputs a desired title number (e.g., "2"), the screen display changes to "title number: 2" and "chapter number: 1". When the playback key is pressed in this state, or when the apparatus is unoperated for a predetermined period of time (e.g., 2 sec), playback starts from chapter 1 of title 2.

In this case, during the search for the title and chapter, the title number and chapter number to be searched out on display unit 48 are flickered to inform the user that a search is in progress.

[Function of Select Key/Cursor Key (Upward·Downward Triangular Mark Pair) 5q]

*The select key/cursor key is used for item selection in a disc menu (a menu called by the title key or menu key) and item selection in the setup menu. For example, when a certain item is selected by pressing the upward or downward triangular mark on the select key/cursor key, if that item includes some choices, the leftward or rightward triangular mark of this select key/cursor key can be used to select one of these choices.

*When the select key/cursor key is pressed during display of the setup value of one of an audio stream, sub-picture stream, and angle, if the upward triangular mark of this select key is pressed, the next stream or angle is selected; if the downward triangular mark is pressed, the immediately preceding stream or angle is selected.

*When the select key/cursor key is pressed during display of the title number by a character generator, if the upward triangular mark of this select key is pressed, the next title is selected; if the downward triangular mark is pressed, the immediately preceding title is selected.

[Function of End Key (END) 5end]

*This key is used when the user informs the apparatus of the end of selection/setup processes (to exit the processing loop).

[Function of Confirmation Key (ENTER) 5s]

*This key is used to confirm an item selected in the disc menu or setup menu.

*This key can also be used to confirm the title number and chapter number on the memory screen.

[Function of Return Key (RETURN) 5r]

*The return key is used to make a search for the address on the disc, which is set in advance by the title producer. More specifically, this key is pressed to issue an exit instruction from the menu or a return instruction to the playback start (restart) point. Also, this key can be used to issue a return instruction to a selection branch point of multistories that can be selected by the user, while one of the multistories is played back.

[Function of Audio Key (AUDIO) 5aud]

*When the audio key is pressed during playback, the language name (when the type of audio stream is not music or the like but is a language) of the audio stream which is currently being played back is displayed (OSD) on the playback screen for a predetermined period of time (e.g., 3 sec) using a character generator (after the audio stream information recorded on the disc is checked). When the audio key is pressed once again during this display, audio data of the next audio stream number is played back. When this audio key operation is repeated, audio data (various languages) of audio streams recorded in that title are cyclically played back.

*When select key/cursor key 5q is pressed while the audio stream setup value is displayed on the screen, an audio stream next to or immediately preceding the currently set audio stream can be selected. Then, the contents of the selected audio stream are played back.

*When the audio key is pressed during the halt state, the language name (when the type of audio stream is a language) of an audio stream set in the currently selected title is displayed on the blue-back screen for a predetermined period of time (e.g., 3 sec) using the character generator (after the audio stream information recorded on the disc is checked). When the audio key is pressed once again during this display, the next audio stream number is set. By repeating this audio key operation, the numbers of audio streams recorded in that title are cyclically set and displayed.

*When select key/cursor key 5q is pressed while the audio stream setup value is displayed on the blue-back screen, an audio stream next to or immediately preceding the currently set audio stream is selected.

[Function of Subtitle Key (SUBTITLE) 5sbt]

*When the subtitle key is pressed during playback, the language name of a sub-picture stream which is currently being played back (when the type of sub-picture stream is a language) is displayed (OSD) on the playback screen for a predetermined period of time (e.g., 3 sec) using the character generator (after the sub-picture stream information recorded on the disc is checked). When the subtitle key is pressed once again during this display, sub-picture data of the next stream number is played back. By repeating this subtitle key operation, sub-picture streams recorded in that title are cyclically played back.

*When select key/cursor key 5q is pressed while the sub-picture stream setup value is displayed on the screen, a sub-picture stream next to or immediately preceding the currently set sub-picture stream can be selected. Then, the contents of the selected sub-picture stream are played back.

*When the subtitle key is pressed in the halt state, the language name of the sub-picture stream set in the currently selected title (when the type of sub-picture stream is a language) is displayed on the blue-back screen for a predetermined period of time (e.g., 3 sec) using the character generator (after the sub-picture stream information recorded on the disc is checked). When the subtitle key is pressed once again during this display, the next sub-picture stream number is set. By repeating this subtitle key operation, the numbers of sub-picture streams recorded in that title are cyclically set and displayed.

*When select key/cursor key 5q is pressed while the sub-picture stream setup value is displayed on the blue-back screen, a sub-picture stream next to or immediately preceding the currently set sub-picture stream is selected.

[Function of Subtitle ON/OFF Key (SUBTITLE ON/OFF) 5v]

*This key is used to turn on/off sub-picture (subtitle) display.

*When the subtitle ON/OFF key is pressed while video playback is in progress and sub-picture display is made (sub-picture display ON setup state), the sub-picture stream number setup value is turned off, and after the setup value is displayed (OSD) for a predetermined period of time (e.g., 3 sec) by the character generator, sub-picture data is cleared from the screen.

*When the subtitle ON/OFF key is pressed while video playback is in progress but no sub-picture display is made (sub-picture display OFF setup state), the sub-picture stream number setup value is turned on, and after the setup value is displayed for a predetermined period of time (e.g., 3 sec) by the character generator, sub-picture data of the language corresponding to the ON stream number is played back (when sub-picture data is recorded on the disc which is being played back).

*When the subtitle ON/OFF key is pressed while video playback halts, the sub-picture display alone can be turned on/off.

[Function of Angle Key (ANGLE) 5ang]

*When the title having the angle block formed by multi-angle information is selected, and the angle key is pressed while this angle block (angle period) is being played back, the currently played-back angle number is displayed (OSD) for a predetermined period of time (e.g., 5 sec) by the character generator. When the angle key is pressed once again during this angle number display period, the same time point of a cell with the next angle number is obtained by a search, and playback starts from there.

When the angle key is further pressed during the angle number display period, the recorded angle numbers are cyclically selected, and playback of the selected angle restarts.

*When the angle number is displayed on the screen by the character generator, a desired angle number can be directly selected by operating a ten-key pad (not shown) (if an angle number which does not exist in the angle block, playback of which is in progress, is input using the ten-key pad, that key input is invalid). Alternatively, the angle number can be increased/decreased using select key/cursor key 5q.

*When angle switching is done during playback of a still picture in a cell of the multiangle block, a similar playback time search is made and a still picture in another angle found by the search is played back.

When the angle key is further pressed during the angle number display period, the recorded angle numbers are cyclically switched, and a still picture in the selected angle is played back.

[Function of Display Key (DISPLAY) 5u]

*When this key is pressed in the halt or playback state, a display corresponding to various key operation contents at that time is made (on display unit 48 of the apparatus main body and/or on the screen of monitor 6).

[Function of Setup Key (SETUP) 5y]

*This key is used to call the setup menu for attaining various setups (e.g., to set the screen size/aspect ratio, angle mark, parental lock, desired spoken language type, desired superimposed dialogue language type, desired menu language type, auto-angle mode, and the like), and is effective only in the playback halt state.

*When this setup key is pressed while the setup menu is displayed, the setup menu display is cleared, and the playback halt state (blue-back screen) is set.

The functions of the aforementioned keys are common to those of a DVD video player (read-only machine), but remote controller 5 of the DVD video recorder further has keys with the following functions.

[Function of Video Recording Mode Key 5rmd]

*Every time this key is pressed in the video recording halt or pause state, the video recording mode is cyclically switched like MPEG2/8 Mbps→MPEG2/6 Mbps→MPEG2/4 Mbps→MPEG2/2 Mbps→MPEG1/2 Mbps→MPEG1/1 Mbps→automatic picture quality mode→MPEG2/8 Mbps→, . . .

When the user requires quality as high as an NTSC broadcast studio, he or she selects MPEG2/8 Mbps although the video recording time becomes short. When the user wants to obtain picture quality equal to or higher than the S-VHS video standard mode by slightly prolonging the video recording time, he or she selects MPEG2/6 Mbps or MPEG2/4 Mbps. When the user wants to obtain picture quality as high as the S-VHS video ×3 mode by further prolonging the video recording time, he or she selects MPEG2/2 Mbps. When the user need only obtain picture quality as high as normal VHS (or video CD), the video recording time can be further prolonged by selecting MPEG1/2 Mbps or MPEG1/1 Mbps.

[Function of Video Recording Key 5rec]

When this switch is pressed when DVD-RW (or DVD-R) disc 10 set in the main body shown in FIG. 42 has a free space and initial setups for video recording (selection of MPEG2/MPEG1, setups of recording average bit rate, and the like) have already been done, recording starts.

When the user presses this recording key without such initial setups, default setup values are automatically selected as the initial setup values, and recording starts.

[Function of Display Mode Key 5dm]

*Every time this key is pressed while recordable DVD-RAM/DVD-RW (or DVD-R) disc 10 is set in main body 200 shown in FIG. 42, OSD display (or display unit 48 of the apparatus main body) is switched to have the following contents:

(1) Video recording source (TV channel number or AV input number)+current date;

(2) Current title set number, recorded time, remaining recordable time+average recording rate at that time;

(3) Display OFF

Note that contents (1) and (2) may be simultaneously displayed, as will be exemplified in FIG. 57.

[Function of OSD Key 5osd]

*When this key is pressed while MPU 30 shown in FIGS. 39 to 41 outputs character (or picture) data for OSD display, OSD display contents that the user does not desire (for example, a warning message on the upper portion of the screen in FIG. 57) are cleared from the monitor screen. When this key is pressed once again, OSD data output from MPU 30 is displayed on the monitor screen.

[Function of Timer Key 5tme]

*When this key is pressed, MPU 30 shown in FIGS. 39 to 41 outputs (OSD) a timer reservation menu (including a table for designating a desired video recording channel, reserved video recording date, video recording mode, average recording rate, and the like for each reserved program) onto the screen of a monitor (not shown). On this menu, a program can be reserved by using cursor key 5q, enter key 5s, and the like.

*After timer reservation operation, when this timer key 5tme and video recording key 5rec are simultaneously pressed while recordable DVD-RW (or DVD-R) disc 10 is set in main body 200 shown in FIG. 42, the DVD video recorder shown in FIGS. 39 to 41 enters a reserved video recording mode (timer video recording standby state).

[Function of Menu Edit key 5edt]

*When this key is pressed, MPU 30 shown in FIGS. 39 to 41 enters a user menu edit mode (the user menu edit process will be described later with reference to FIGS. 60 and 61 and FIGS. 68 to 71).

Figure 44:
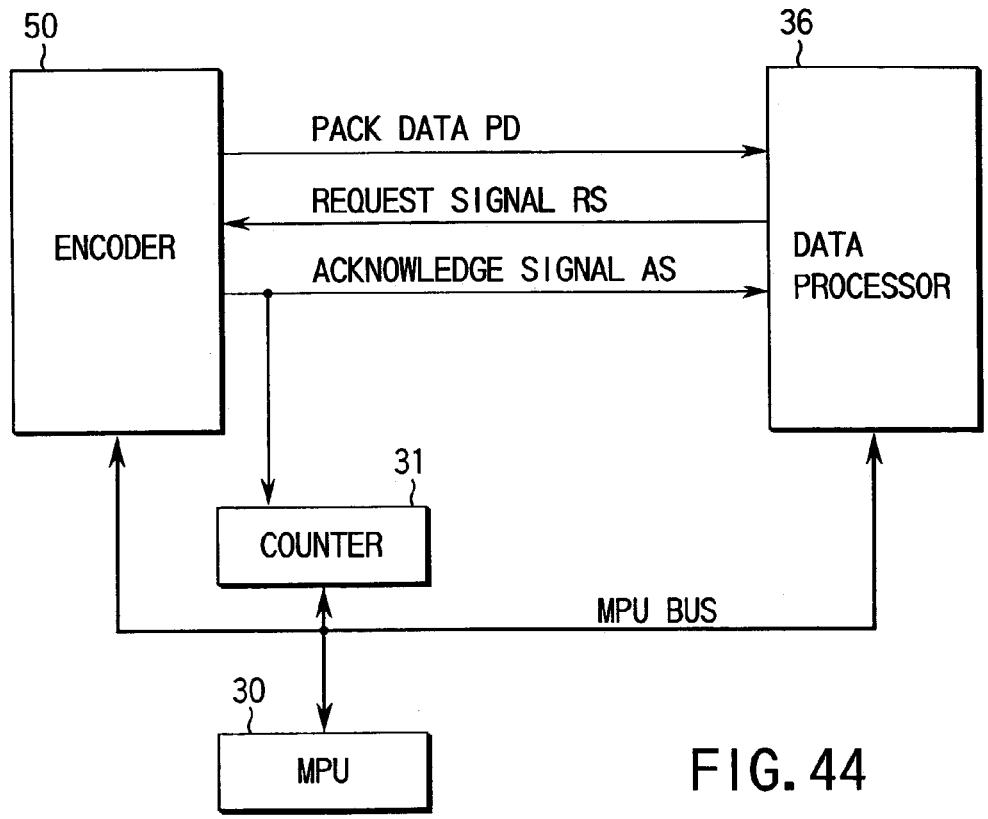
FIG. 44 is a block diagram for explaining a circuit (without transfer clocks) for detecting the number of recorded bytes recorded on the disc shown in FIG. 1 by counting the number of recorded bytes in the DVD video recorder shown in FIGS. 39 to 41.
Figure 45:
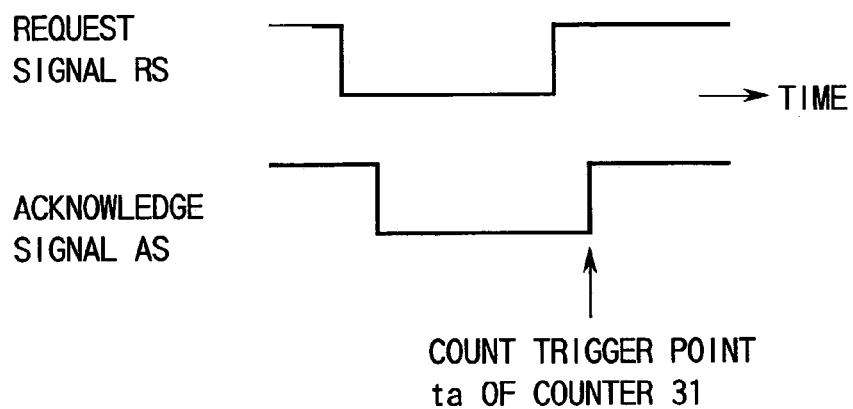
FIG. 45 is a timing chart for explaining the count timing of the recorded byte by a counter shown in FIG. 44.

FIG. 44 is a block diagram showing an example of a recording amount detection circuit (without transfer clocks) for detecting the number of recorded bytes of information recorded on disc 10 by counting the number of recorded bytes in the DVD video recorder shown in FIGS. 39 to 41. FIG. 45 is a timing chart for explaining the count timings of recorded bytes by counter 31 in FIG. 44.

DVD recording data formatted by formatter 56 in encoder 50 in FIGS. 39 to 41 is formed by a sequence of a plurality of data packs (2,048 bytes per pack) 86 to 91, as shown in FIG. 11.

When MPU 30 in FIG. 44 instructs recording of the DVD recording data via an MPU bus, data processor 36 sends request signal RS (upper signal in FIG. 45) for requesting transfer of data PD of the data packs to encoder 50. Upon reception of request signal RS, encoder 50 (formatter 56) outputs acknowledge signal AS that confirms reception of this request to data processor 36 (lower signal in FIG. 45). Simultaneously with the output of acknowledge signal AS, encoder 50 (formatter 56) transfers data PD for one byte to data processor 36. That is, encoder 50 (formatter 56) outputs one-pulse acknowledge signal AS every time it transfers 1 byte to data processor 36.

Acknowledge signal AS is input to counter 31. Counter 31 counts up its contents by 1 in response to the leading edge (trigger point ta in FIG. 45) of signal AS, and holds the contents after the counting-up. The contents of counter 31 are sent back to MPU 30 via the MPU bus.

MPU 30 detects the number of bytes (i.e., the number of bytes recorded on disc 10) transferred from encoder 50 (formatter 56) to data processor 36 on the basis of the contents (count value) of counter 31. The number of data (the number of bytes) transferred to data processor 36 represents the data amount recorded on disc 10.

By subtracting the recorded data amount (count value bytes) from the free space (the value written in FREE_SPACE in VMGI_MAT in FIG. 15 or FREE_SPACE in REC_MAT in FIG. 19) of disc 10, the remaining amount (the number of bytes that can be recorded) of disc 10 can be determined. Furthermore, when this remaining amount is divided by the average recording rate, the remaining time (indicating a predicted value of how much longer data can be recorded) of disc 10 can be determined.

Figure 46:
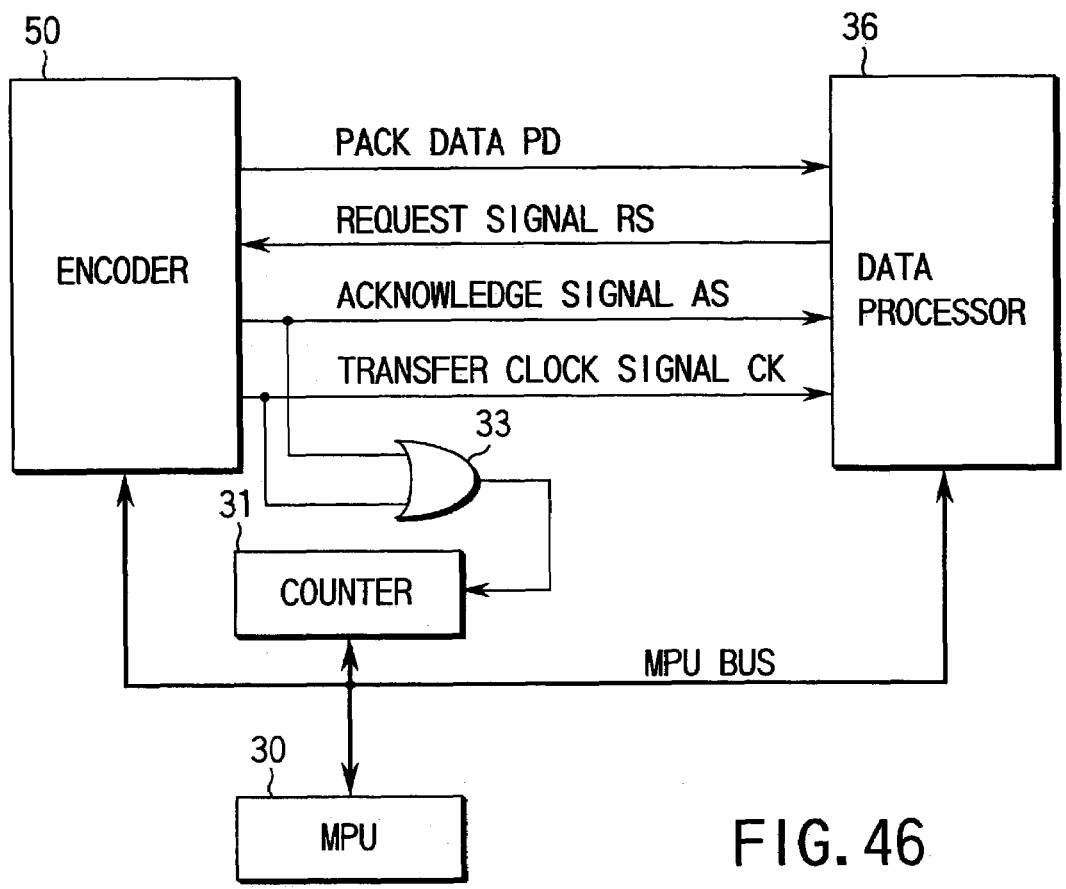
FIG. 46 is a block diagram for explaining another circuit (with transfer clocks) for detecting the number of recorded bytes recorded on the disc shown in FIG. 1 by counting the number of recorded bytes in the DVD video recorder shown in FIGS. 39 to 41.
Figure 47:
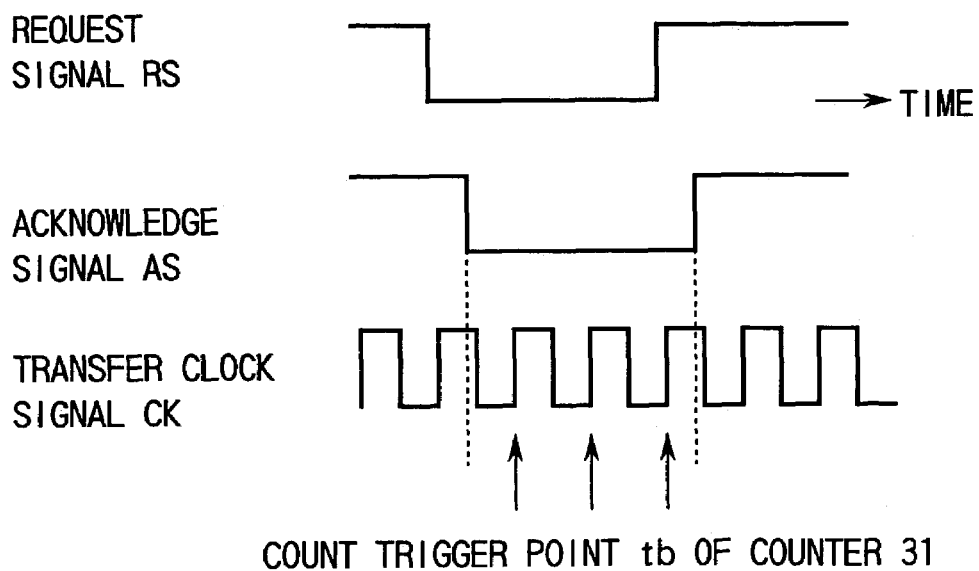
FIG. 47 is a timing chart for explaining the count timing of the recorded byte by a counter shown in FIG. 46.

FIG. 46 is a block diagram showing another example of the recording amount detection circuit (with transfer clocks) for detecting the number of recorded bytes of information recorded on the disc in FIG. 1 by counting the number of recorded bytes in the DVD video recorder shown in FIGS. 39 to 41. FIG. 47 is a timing chart for explaining the count timings of recorded bytes by a counter in FIG. 46.

In the example shown in FIG. 46, transfer clock signal CK is output to encoder 50 every time pack data PD is transferred from encoder 50 to data processor 36.

That is, when data processor 36 sends a request signal (upper signal in FIG. 47) to encoder 50 in accordance with an instruction from MPU 30, encoder 50 sends back acknowledge signal AS (middle signal in FIG. 47) to data processor 36. Acknowledge signal AS is not generated every time 1 byte is transferred, but is a gate signal which is active during the transfer period for the number of bytes to be transferred. Transfer clock signal CK (lower signal in FIG. 47) output from encoder 50 is sent to data processor 36 as a synchronization signal for byte transfer.

Acknowledge signal AS is supplied to the first input of OR gate 33 as the gate signal. The second input of OR gate 33 receives transfer clock signal CK. Then, OR gate 33 counts up its contents by 1 in response to each leading edge (each of a plurality of trigger points tb in FIG. 47) of transfer signal CK during the active (logical "0") period of acknowledge signal AS, and holds the contents after the counting-up. The contents of counter 31 are sent back to MPU 30 via the MPU bus.

MPU 30 detects the number of bytes (the number of recorded bytes) transferred from encoder 50 to data processor 36 on the basis of the contents (count value) of counter 31. The contents of counter 31 represent the data amount recorded on disc 10. By subtracting (count value bytes) from the free space of disc 10, the remaining amount of disc 10 can be determined. Furthermore, when this remaining amount is divided by the average recording rate, the remaining time of disc 10 can be determined.

Figure 48:
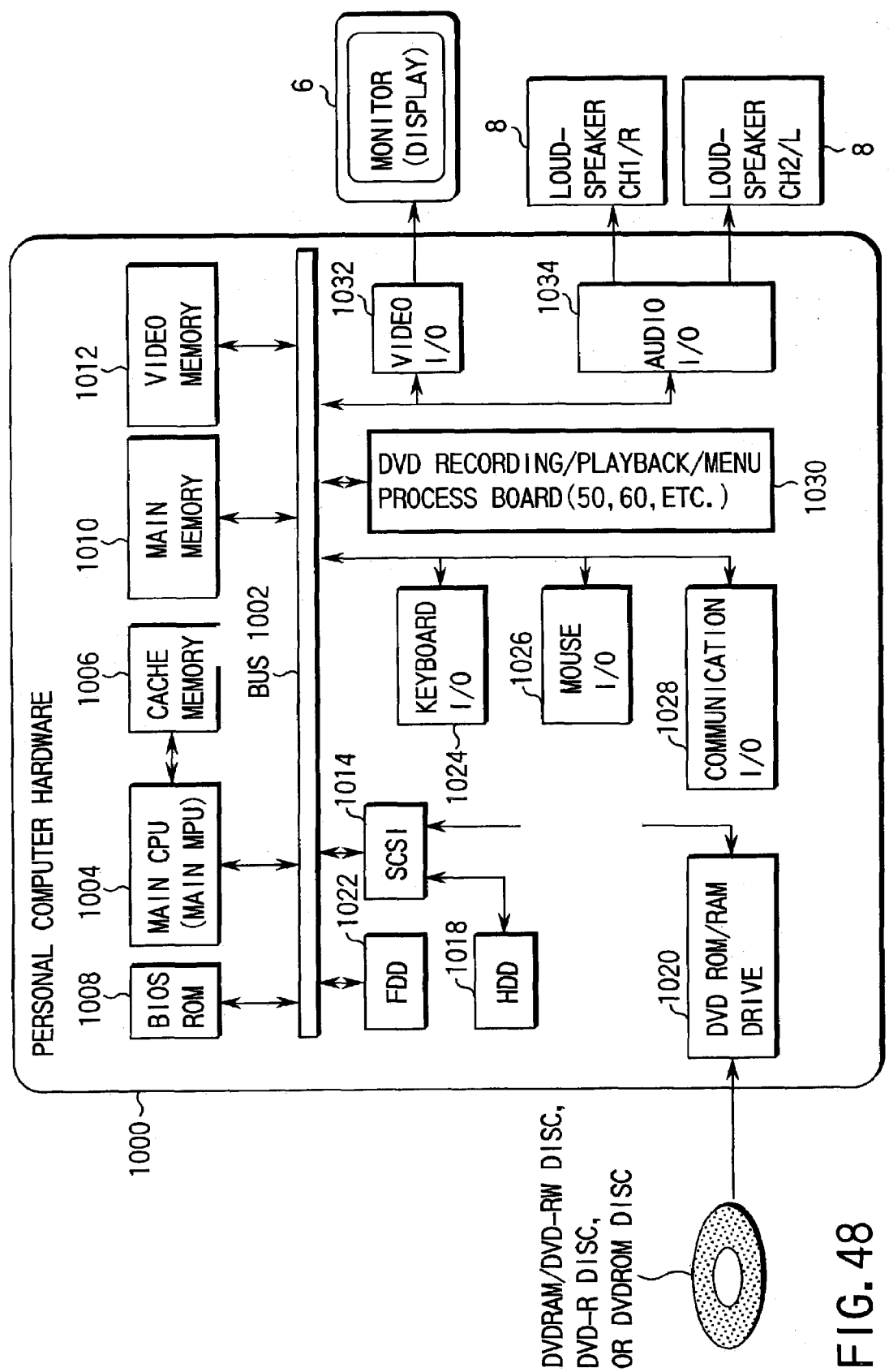
FIG. 48 is a block diagram for explaining a case wherein the recording/playback function of the DVD video recorder shown in FIGS. 39 to 41 is implemented using a versatile personal computer.

FIG. 48 is a block diagram for explaining the recording/playback function of the DVD video recorder shown in FIGS. 39 to 41 implemented using a versatile personal computer. Personal computer 1000 shown in FIG. 48 may use dedicated hardware, or a versatile personal computer with a general arrangement.

More specifically, internal bus 1002 of personal computer 1000 is connected with main CPU 1004, basic I/O system ROM (BIOS·ROM) 1008, main memory 1010, video memory 1012, floppy disc drive (FDD) 1022, keyboard I/O device 1024, mouse I/O device 1026, communication I/O device 1028, and the like. Main CPU 1004 is directly connected to cache memory 1006 via a dedicated high-speed bus.

Internal bus 1002 of personal computer 1000 has a plurality of versatile bus slots (not shown). These slots receive SCSI interface (SCSI board) 1014, DVD processor board 1030, video I/O device (video card) 1032, audio I/O device (audio card) 1034, and the like.

SCSI board 1014 is connected with SCSI hard disc drive (HDD) 1018, and SCSI DVD-ROM/DVD-RAM compatible drive 1020 (drive 1020 may also be compatible with a CD).

Video card 1032 is connected with high-resolution bitmap display (analog RGB type) 6, and audio card 1034 is connected with a pair of 2-channel stereophonic loudspeakers 8 (if card 1034 has no power amplifier, the power amplifier may be incorporated in loudspeakers 8 or a stereophonic amplifier (not shown) may be inserted between card 1034 and loudspeakers 8).

DVD processor board 1030 in FIG. 48 has hardware corresponding to devices 38, 50, 60, and the like shown in FIGS. 39 to 41. Disc drive 32 shown in FIGS. 39 to 41 corresponds to DVD-ROM/RAM drive 1020 in FIG. 48.

The storage area of memory 1010 or video memory 1012 in FIG. 48 may be partially used as temporal storage 34 (or 34A/34B), buffer memory 57, or memory 63 of the separator in FIGS. 39 to 41, as needed.

Furthermore, hard disc 1018 in FIG. 48 can also be partially used as temporal storage 34 (or 34A/34B) in FIGS. 39 to 41. If hard disc 1018 is a disc having a storage size as large as several Gbytes (e.g., 3 to 5 GB), a predetermined area (for 2.6 GB) in this disc may be partitioned and may be used as virtual DVD-RAM (or DVD-RW or DVD-R) disc 10.

The functions of the operation keys of DVD video recorder main body 200 in FIG. 42 can be assigned to a keyboard (not shown) connected to keyboard I/O device 1024 in FIG. 48. Also, the functions of various keys (buttons and cursors) of remote controller 5 in FIG. 43 can be assigned to a keyboard (not shown) connected to keyboard I/O device 1024 in FIG. 48, a mouse (not shown) connected to mouse I/O device 1026, or an external controller (not shown) connected to communication I/O device 1028.

Typical data processing in the DVD video recorder shown in FIGS. 39 to 41 includes video recording (including variable bit rate recording of a moving picture and fixed bit rate recording of audio or sub-picture data), playback (reading), and special processes.

The recording process includes normal recording (FIG. 49) and timer reservation video recording.

The playback process is substantially the same as that of a DVD video player (the processing corresponding to the key operations of remote controller 5 shown in FIG. 43), but includes some processes unique to the present invention, since the present invention relates to a DVD video recorder: setup processing of a played back flag (read flag) for a recorded program (video title set VTS) that has been played back once, and setup processing of an archive flag for a recorded program (VTS) which is protected from being erased (to be permanently saved) (FIGS. 54 to 56, FIGS. 58 and 59).

Furthermore, the special process includes processing (FIG. 51) for monitoring the remaining amount of a video recording disc, display processing (FIGS. 52 and 53) in case of a small remaining amount, disc arranging processing for increasing the free space of a disc by selectively erasing specific programs in the recorded disc, disc exchange processing for exchanging a recording disc when the disc is used up during video recording, processing for setting the average recording rate for video recording, MPEG switching processing for selecting a moving picture recording mode (MPEG2 or MPEG1), dummy insertion cancel processing for increasing the remaining amount when the remaining amount of the disc becomes small during recording, processing for initializing the played back flag and archive flag upon completion of normal video recording, user menu edit processing (FIGS. 60 and 61), user menu file automatic creation processing (FIG. 62), search processing (FIGS. 63 and 64) using the user menu, and processing (FIGS. 65 to 67) upon playing back the user menu.

The recording, playback, and special processes will be described hereinafter with reference to the flow charts in FIGS. 49 to 56 and FIGS. 58 to 67, monitor display example in FIG. 57, and user menu explanatory views in FIGS. 68 to 71.

Figure 49:
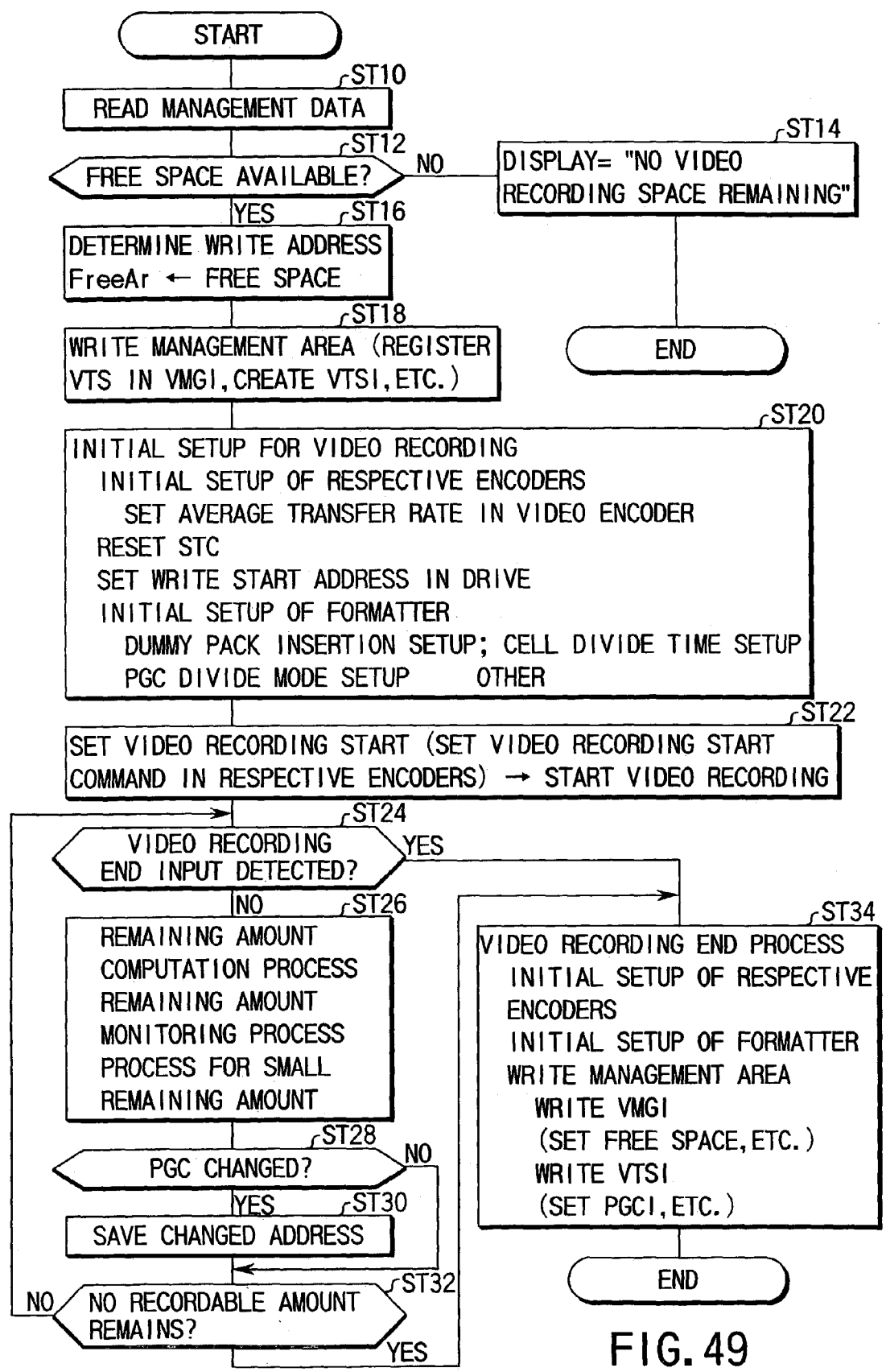
FIG. 49 is a flow chart for explaining an example of the video recording operation of the DVD video recorder shown in FIGS. 39 to 41.

FIG. 49 is a flow chart for explaining an example of video recording of the DVD video recorder shown in FIGS. 39 to 41.

Upon reception of a video recording command from remote controller 5 or a timer reservation program, MPU 30 in FIGS. 39 to 41 reads management data (control information DA21 in FIGS. 2 to 4, VMGI in FIG. 5, or the like) of DVD-RAM (or DVD-R) disc 10 set in disc drive 36 from disc drive 32 (step ST10).

It is checked based on free space information (FREE_SPACE in REC_MAT in FIG. 19 or FREE_SPACE in VMGI_MAT in FIG. 15) in the read management data if set disc 10 has a free space (step ST12).

If the contents of the free space information (FREE_SPACE) indicate zero or substantially zero (the disc will become full of data several seconds after the beginning of recording) (NO in step ST12), an OSD display with the contents "no recording space remaining" is output onto a monitor TV screen (not shown) (step ST14). At this time, a message "NO REC SPACE" (not shown) having the same meaning as "no recording space remaining" may be displayed on a given portion of display unit 48 of apparatus main body 200 shown in FIG. 42.

If some free space remains, e.g., if FREE_SPACE indicates 150 Mbytes or more corresponding to an MPEG2 video recording time of approximately 5 min at an average rate of 4 Mbps, the control advances to the next process. In this case (YES in step ST12), a write address (the head position of the free space) on set disc 10 is determined, and a free space value corresponding to the free space information (FREE_SPACE) read from the management data on disc 10 is written in register "FreeAr" allocated on the internal RAM of MPU 30 (step ST16).

Note that the "free space value" written in register "FreeAr" is expressed using 2,048 bytes, which correspond to the size of one logical sector in FIG. 1 or one pack in FIGS. 11 to 13, as one unit of video recording.

When disc 10 is designed to record data in a normal file format, uses a file allocation table (FAT) to manage the recording contents, and has no free space information mentioned above, the number of free clusters (the number of free blocks) may be read out from the FAT, and may be multiplied by the number of bytes per cluster (block) to compute the free space of that disc.

Data is written in the management area of set disc 10 (step ST18). For example, video title set VTS corresponding to a program to be recorded is registered in video manager information VMGI and files that relate to this VTS are created.

More specifically, if this video recording is the first one for that disc 10, VTS#1 in FIG. 5 is registered, and its related files (see the respective files in the VTS directory in FIG. 9) are created in step ST18. If VTS#1 has already been registered in disc 10 and some free space remains on that disc 10, registration of VTS#2 and creation of its related files are done in step ST18.

Then, initial setups for video recording are done (step ST20). In this initial setups, the encoders (53 to 55) in FIGS. 39 to 41 are initialized (to set the average transfer rate, i.e., average recording rate of V encoder 53 and the like), system time counter STC is reset, the write start address is set in disc drive 32, formatter 56 is initialized (to set dummy pack insertion, PGC divide mode PGC divide time, cell divide time, and the like), and so forth (e.g., resetting of the counter in FIG. 44 or 46, and the like).

There are various PGC divide modes (source mode, time divide mode, marker key mode, user action mode, picture abrupt change point mode, and the like), as has been explained with reference to FIGS. 28 to 32. Of these modes, if the time divide mode (FIG. 29) is selected, the divide time interval is also set in the initial setups in step ST20.

Upon completion of initial setting for video recording (ST20), a video recording start setup is made (step ST22). With this setup, MPU 30 sends video recording start commands to the respective encoders (53 to 55) in encoder 50 to start video recording on the free space of disc 10 set in disc drive 32.

After that, upon reception of a video recording end input (i.e., if the user instructs the end of video recording or the timer reservation program issues a video recording end command) (YES in step ST24), a video recording completion process (step ST34) is executed, thus ending video recording shown in FIG. 49.

The recording completion process in step ST34 includes initialization of the respective encoders (53 to 55) in FIGS. 39 to 41 (to reset their recording rates to default setup values, and the like), initialization of formatter 56 (to reset various setup values to default values, and the like), a write pertaining to video manager information (to update the contents of FREE_SPACE in FIG. 15 or 19 and the like), and a write pertaining to video title set information (to update the contents of PGCI in FIG. 3 or 24 and the like).

If no video recording end input is detected (NO in step ST24), and video recording continues, a process for computing the remaining amount of disc 10 in which data is being recorded (see FIG. 51) is executed parallel to video recording (step ST26). If it is determined in this process that the remaining amount of disc 10 is smaller than a predetermined value (the remaining amount monitoring process; "1" is set in a minimum space flag in FIG. 51), the control enters a process for a small remaining amount (see FIG. 52).

Upon completion of the process (the remaining amount computation process, remaining amount monitoring process, and process for a small remaining amount) in step ST26, if a program chain which is undergoing video recording has changed (YES in step ST28), that change point (PGC divide address) is saved in the internal work memory of MPU 30 as PGC division information described previously with reference to FIG. 40 or 41 (step ST30). The saved contents (PGC Information) of this work memory are used to create program chain information PGCI in the video recording end process (step S34).

After this process, if it is determined that disc 10 in which data is being recorded has no more recordable amount (YES in step ST32; zero remaining time in step ST422B in FIG. 52), the recording completion process in step ST34 above is executed.

As a result of the process in step ST26, if it is determined that some recordable amount still remains on disc 10 in which data is being recorded (NO in step ST32), the loop of steps ST24 to ST32 repeats itself until the video recording end input is detected (YES in step ST24) or no more recordable amount remains (YES in step ST32).

Figure 50:
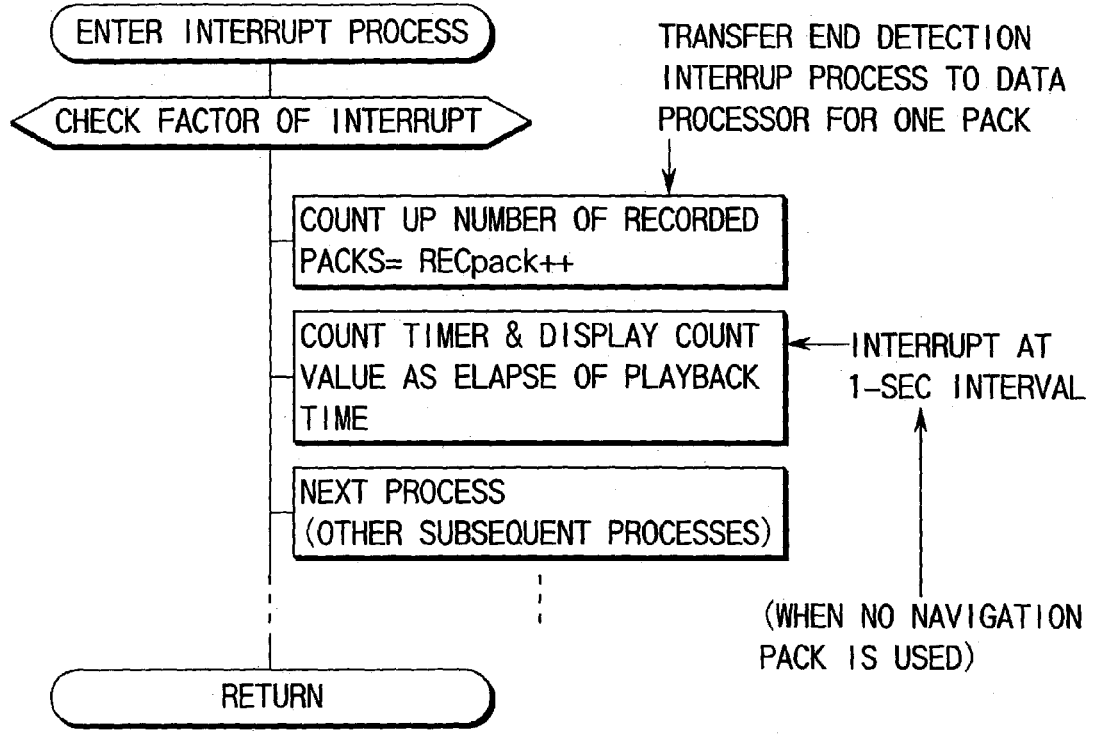
FIG. 50 is a flow chart for explaining a processing sequence of various interrupt processes executed during the video recording operation shown in FIG. 49.

FIG. 50 is a flow chart for explaining the processing sequence of various processes executed during video recording shown in FIG. 49.

The first interrupt is produced in response to an interrupt to data processor 36, which indicates completion of transfer of one pack.

In this interrupt, factors of interrupt are checked. If the factor of interrupt is counting-up of the number of recorded packs (an increment of recorded packs; RECpack++), the contents of counter 31 in FIG. 44 or 46 are counted up.

On the other hand, when the data structure shown in FIGS. 2 to 4 without navigation packs (see FIG. 72) is adopted, an interrupt of a process for counting the timer value of STC 38 and displaying that count value (displaying an elapse of playback time) is executed at given time intervals (e.g., every 1 sec).

Figure 51:
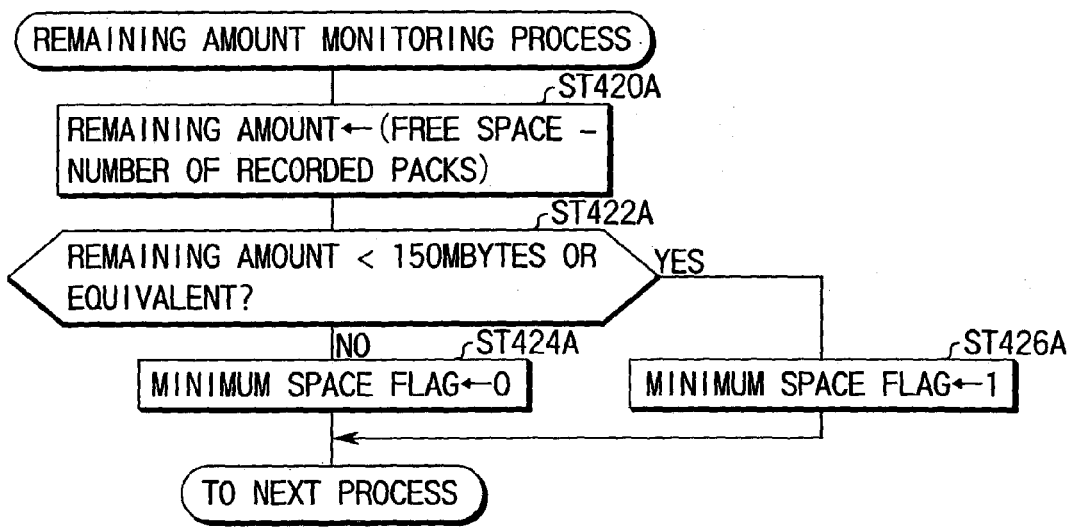
FIG. 51 is a flow chart for explaining a process for monitoring the remaining recordable size on the disc which is to undergo recording.

FIG. 51 is a flow chart for explaining the process for monitoring the recordable remaining amount on the disc which is to undergo recording. This process corresponds to step ST26 in FIG. 49.

Initially, the contents of register FreeAr set in step ST16 in FIG. 49 are updated.

More specifically, before the beginning of the current video recording, the number of recorded packs is subtracted from the free space set in register FreeAr. This "free space—the number of recorded packs" indicates the free space that remains on disc 10 in which data is being recorded at that time. The updated free space is re-set in register FreeAr as the remaining amount. Then, the contents of register FreeAr have information indicating the remaining amount which decreases monotonously as recording progresses.

Note that the number of recorded packs is obtained by dividing the accumulated number of recorded bytes counted by counter 31 in FIG. 44 or 46 by 2,048 bytes as one pack size, in case of hardware processes. That is, "the number of recorded packs=the accumulated number of recorded bytes÷2,048 bytes".

In case of software processes, RECpack obtained by the interrupt process in units of packs indicates the number of recorded packs, as shown in FIG. 50.

If the contents (remaining amount) of register FreeAr are equal to or larger than a predetermined value (NO in step ST422A in FIG. 51), a minimum space flag is set at "0" (step ST424A); if the remaining amount is smaller than the predetermined value (YES in step ST422A), the minimum space flag is set at "1" (step ST426A).

The "predetermined value" in step ST422A need not always be fixed at a given value. In the example shown in FIG. 51, 150 Mbytes corresponding to approximately 5 min of MPEG2 video recording at an average bit rate of 4 Mbps are used as the predetermined value.

That is, when MPEG2 video recording continues at an average bit rate of 4 Mbps, if the minimum space flag is "0", it is expected that video recording for 5 min or more can be made; if the minimum space flag is "1", it is expected that disc 10 in which data is being recorded is used up within 5 min. (Since MPEG2 video recording is variable bit rate recording, the remaining recordable time computed based on the average bit rate includes errors. That is, even when the remaining amount obtained in step ST420A in FIG. 51 is accurate, the remaining recordable time varies depending on the subsequent recording contents. Hence, the estimated recordable time of 5 min is not so accurate. This value "5 min" is merely a yardstick.)

Figure 52:
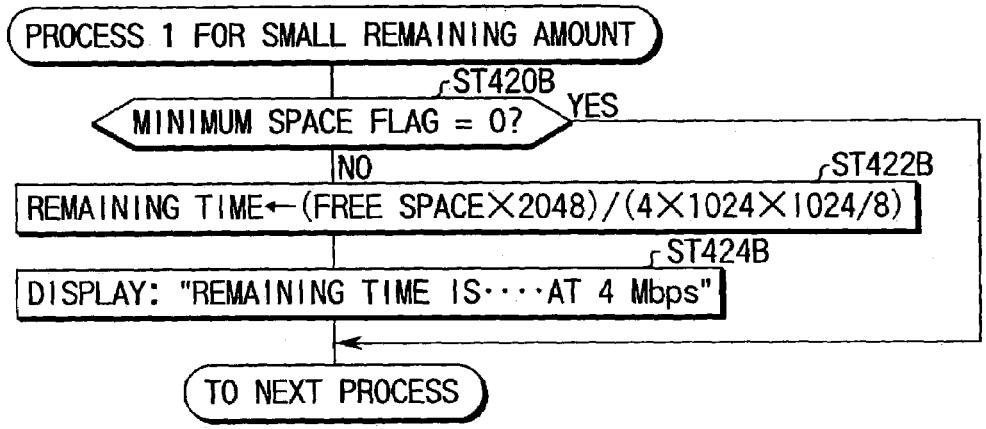
FIG. 52 is a flow chart for explaining an example of a small remaining size process executed in accordance with the result (contents of a minimum size flag) of the remaining size monitoring process shown in FIG. 51.

FIG. 52 is a flow chart for explaining an example of the process for a small remaining amount executed in correspondence with the result (the contents of the minimum space flag) of the process for monitoring the remaining amount in FIG. 51. FIG. 57 shows a display example of a warning display, average recording rate, and the remaining recordable time at that rate, and the like when the remaining amount of the-disc in which data is being recorded is small, on the monitor TV screen.

If the minimum space flag in FIG. 51 is "0" (YES in step ST420B), since disc 10 in which data is being recorded still has a remaining amount, the process in FIG. 52 ends, and the control advances to the next process.

On the other hand, if the minimum space flag is "1" (NO in step ST420B), it is determined that disc 10 in which data is being recorded will become full of data soon. In this case, a value obtained by dividing [the free space (using 2,048 bytes as one unit for recording) written in register FreeAr×2,048 bytes] by the average bit rate at that time (512 kbytes/sec obtained by converting 4 Mbps into bytes) is the estimated "remaining time" (step ST422B).

MPU 30 in FIGS. 39 to 41 OSD-displays on the monitor TV a message "remaining time is approximately 5 min at 4 Mbps" using the "remaining time" computed in step ST422B and the average transfer rate (recording bit rate) set in step ST20 in FIG. 49, or "remaining time is approximately 5 min in standard picture quality model assuming that 4 Mbps correspond to standard picture quality. In this case, the TV channel number in video recording, video recording date/time, and the like may be simultaneously OSD-displayed. Furthermore, simultaneously with OSD display in step ST424B, a warning message for guiding the user as to how to proceed with video recording (see the upper portion of the monitor screen in FIG. 57) may be OSD-displayed.

The OSD display contents such as the warning message and the like may be written in advance in the ROM in MPU 30 in FIGS. 39 to 41.

Let A be the number of recorded packs written at given time intervals, and B be the previous number of recorded packs written before A packs are written. Then, in MPEG recording at a variable bit rate, the instantaneous value of the recording rate that changes constantly can be obtained from the absolute value of [A−B] (unit=pack; 2,048 bytes per pack=16,384 bits). More specifically, if T (sec) represents the predetermined time, the instantaneous recording rate (bps) can be computed by the absolute value of [A−B]×16,384÷T (sec). The "remaining time" may be computed using the instantaneous recording rate in place of the average recording rate. In such case, the remaining time does not always monotonously decrease as recording progresses. However, even when this instantaneous recording rate is used, the remaining time can be computed and the user or the like can be informed thereof.

Figure 53:
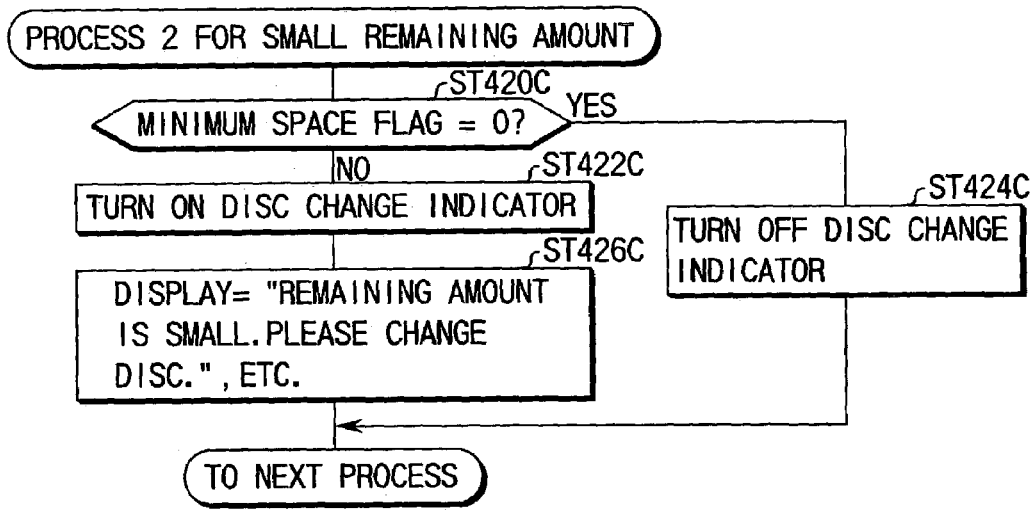
FIG. 53 is a flow chart for explaining another example of a small remaining size process executed in accordance with the result (contents of a minimum size flag) of the remaining size monitoring process shown in FIG. 51.

FIG. 53 is a flow chart for explaining another example of the process for a small remaining amount executed in correspondence with the result (the contents of the minimum space flag) of the process for monitoring the remaining amount in FIG. 51.

If the minimum space flag in FIG. 51 is "1" (NO in step ST420C), it is determined that disc 10 in which data is being recorded will become full of data soon. In this case, MPU 30 in FIGS. 39 to 41 turns on a disc change indicator "DISC TO BE CHANGED" on display unit 48 of apparatus main body 200 in FIG. 42 (by continuously lighting the indicator illuminated with backlight or flickering it) (step ST422C). At the same time, MPU 30 OSD-displays a warning message (see the upper portion of the monitor screen in FIG. 57) that prompts the user to change a disc (step ST426C).

If the minimum space flag is "0" (YES in step ST420C), it is determined that disc 10 in which data is being recorded is still recordable. In this case, MPU 30 in FIGS. 39 to 41 turns off the disc change indicator "DISC TO BE CHANGED" on display unit 48 of apparatus main body 200 in FIG. 42 (step ST424C).

After execution of the process in step ST426C or ST422C, the process in FIG. 53 ends, and the control advances to the next process.

Figure 54:
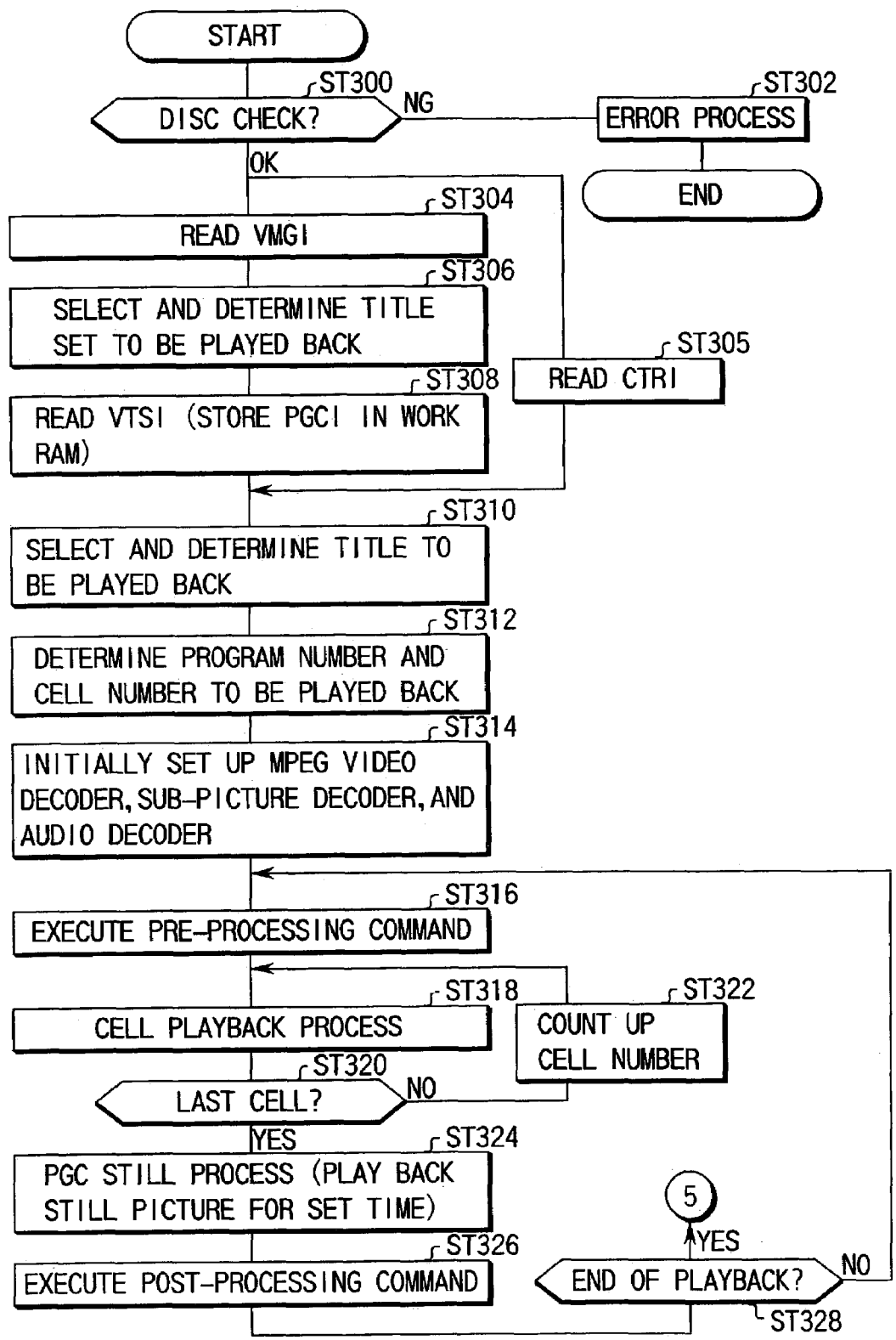
FIG. 54 is a flow chart for explaining an example of the playback operation of the DVD video recorder shown in FIGS. 39 to 41.

FIG. 54 is a flow chart for explaining an example of playback operation of the DVD video recorder.

The flow of a video signal upon playback in the DVD video recorder shown in FIGS. 39 to 41 will be briefly described first.

Upon reception of a playback command by, e.g., remote controller operation by the user, MPU 30 in FIGS. 39 to 41 reads the management area of disc 10 from disc drive 32 via data processor 36, thus determining the address to be played back.

MPU 30 then sends the determined address of data to be played back and a read command to disc drive 32.

Disc drive 32 reads out sector data from disc 10 in accordance with the received command. Readout data are error-corrected by data processor 36, and are sent to decoder 60 in the form of pack data.

In decoder 60, the readout pack data are received by separator 62. Separator 62 packetizes the received pack data. Then, separator 62 transfers video packet data (MPEG video data) to video decoder 64, audio packet data to audio decoder 68, and sub-picture packet data to SP decoder 65 in correspondence with their purposes. Also, a navigation pack is saved in the internal memory (RAM) of MPU 30. In this fashion, MPU 30 can access the contents of the navigation pack in its internal memory as needed.

At the beginning of transfer of each packet data output from separator 62, presentation time stamp PTS is loaded into system time counter STC 38. More specifically, MPU 30 sets PTS included in the navigation pack in STC 38, or video decoder 64 automatically sets PTS of video data in STC 38.

After that, the respective decoders (64, 65, 68) play back in synchronism with the PTS values in packet data (while comparing PTS and STC values), and supply, e.g., moving picture data with audio and superimposed dialog data to an external monitor TV via AV output 46.

When DVD-RAM/DVD-RW disc (or DVD-R disc) 10 is set in the DVD video recorder that plays back in such way, recorded data is read from the lead-in area of that disc 10. If the read lead-in data contains data that cannot be recognized by the DVD video recorder in FIGS. 39 to 41 or if error correction of the read data fails (NG in step ST300), the DVD video recorder executes an error process (step ST302) to stop playback. In this error process, for example, a display output "this disc cannot be played back" is made.

If the read data is free from any errors or if error correction is successful even when errors have been produced and the read lead-in data can be recognized by the DVD video recorder shown in FIGS. 39 to 41 (OK in step ST300), the DVD video recorder reads management data (VMGI) of that disc (step ST304). Or the recorder reads another management data (control information CTRI, i.e., DA21 in FIG. 2) (step ST305).

Then, one or more title sets recorded on set disc 10 are displayed on a TV monitor (not shown) in the form of a menu. The user who watched the menu selects a desired title set using cursor key 5q on remote controller 5 in FIG. 43, and then presses enter key 5s to determine that title set (step ST306).

After the title set to be played back is determined in such way, MPU 30 in FIGS. 39 to 41 reads information VTSI (FIG. 24) of the selected video title set VTS from set disc 10. MPU 30 then stores program chain information PGCI (FIG. 24) in the work area of its internal RAM (step ST308).

After that (after the process in step ST305 or ST305), if the determined title set contains a plurality of titles (or a plurality of chapters), the user selects and determines the title (chapter) to be played back from the menu by operating the remote controller (step ST310).

In this way, the program number and cell number (e.g., PGC#1 and C_IDN#1 in FIG. 4) of the title to be played back are determined (step ST312).

Subsequently, MPU 30 in FIGS. 39 to 41 refers to program chain information PGCI (FIG. 3 or 24) stored in its RAM. MPU 30 initially sets MPEG video decoder 64, sub-picture decoder 65, and audio decoder 68 in correspondence with the initial setups upon video recording (step S314).

After the initial setups, a pre-processing command is executed (step ST316), and the control then enters a cell playback process (step ST318). With this cell playback process, for example, cells that form program chain PGC#1 in FIG. 4 are played back in turn.

If the last cell has not been reached yet in cell playback (NO in step ST320), cell playback progresses (a loop of ST318 to ST322) while counting up a cell number counter (not shown) every time one cell has been played back (step ST322).

If the last cell has been reached in cell playback (YES in step ST320), MPU 30 executes a still process of PGC#1 played back so far (to present one frame of the last cell of that PGC as a still picture for a predetermined period of time).

If the still time has elapsed, MPU 30 executes a predetermined post-processing command (step ST326). If it is determined that playback is not to end (NO in step ST328), the flow returns to step ST316.

Figure 55:
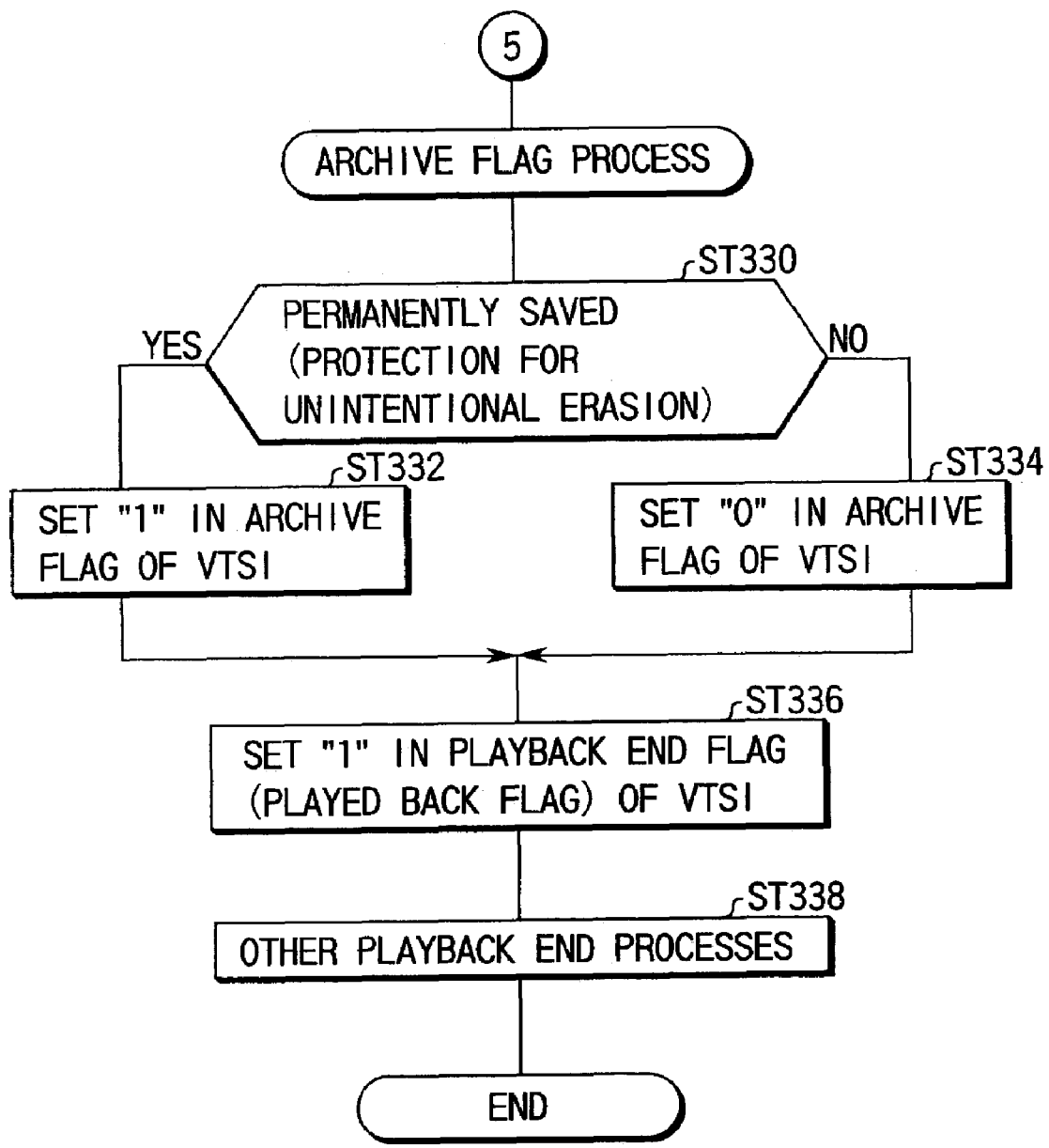
FIG. 55 is a flow chart for explaining update setups of an archive flag and played-back flag after playback is complete in the sequence shown in FIG. 54.

After the still time has elapsed and the post-processing command is executed (step ST326), if it is determined that playback is to end (e.g., if the user has pressed a stop key on remote controller 5) (YES in step ST328), MPU 30 enters the process shown in FIG. 55.

FIG. 55 is a flow chart for explaining updating of the archive flag and played back flag upon completion of playback in the sequence shown in FIG. 54.

A menu (not shown) or the like that inquires of the user as to whether the title set played back so far is to be permanently saved (or to be prevented from being erroneously erased) is OSD-displayed on the monitor TV. If the user selects to save that title set (YES in step ST330), MPU 30 sets "1" in the archive flag in the video title set information (FIG. 17) or in the recording management table (FIG. 19) (step ST332). On the other hand, if the user selects not to save that title set permanently (NO in step ST330), "0" is set in this archive flag (step ST334).

After the archive flag is set, the played back flag (FIG. 17 or 18) of the title set or video object that has been finished to play back is set at "1" (step ST336), and other processes upon completion of playback (a stop command is output to disc drive 32, an indication "STOP" is made on display unit 48, and so forth) are executed (step ST338), thus ending the playback process in FIGS. 54 and 55.

With this playback process, if the user determines that a given program which has already been played back is erasable, such program is automatically set to be erasable (erasable by overwrite) using the played back flag ("1"). Also, a program which has already been played back but is to be saved can be prevented from being inadvertently erased by, e.g., overwrite by setting the archive flag (setting it at "1").

Figure 56:
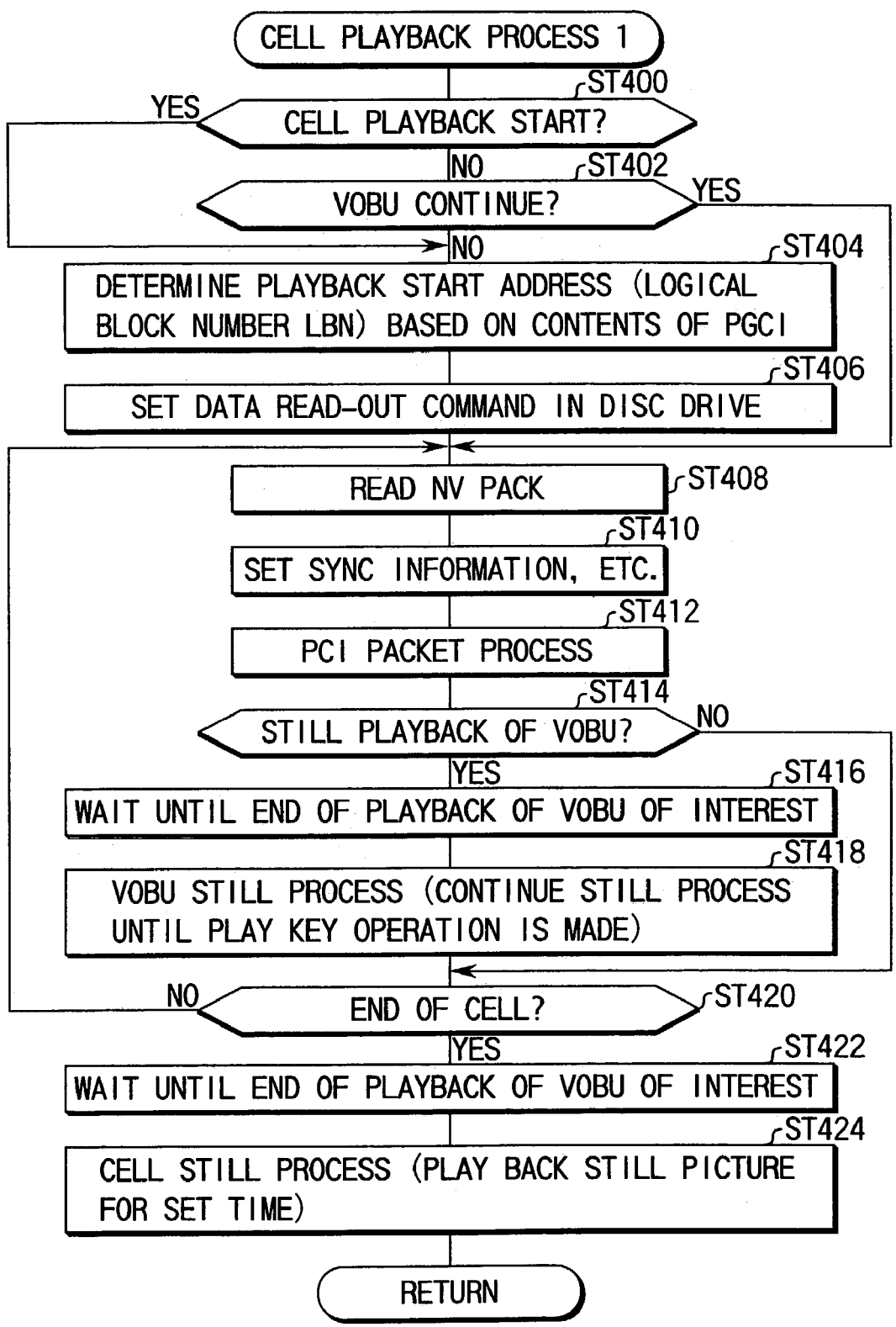
FIG. 56 is a flow chart for explaining the contents of the process ST318 upon cell playback shown in FIG. 54.

FIG. 56 is a flow chart for explaining the contents of step ST318 upon cell playback in FIG. 54.

If cell playback starts (YES in step ST400), MPU 30 in FIGS. 39 to 41 determines the playback start address on the basis of the contents (FIGS. 21 to 23 or FIGS. 24 and 25) of program chain information PGCI (step ST404). MPU 30 then sets a data read-out command in disc drive 32 (step ST406).

If cell playback is not started (NO in step ST400) and VOBUs do not continue (NO in step ST402), processes in steps ST404 to ST406 are executed. On the other hand, if cell playback is not started (NO in step ST400) and VOBUs continue (YES in step ST402), processes in steps ST404 to ST406 are skipped.

After the above-mentioned process, MPU 30 reads a navigation pack 86 (if any) at the beginning of each VOBU (step ST408), and sets sync information and the like (step ST410).

Furthermore, MPU 30 processes PCI packet 116 in the navigation pack (if any) (step ST412). PCI packet 116 (FIG. 12) contains presentation control information PCI, and this PCI contains PCI general information PCI_GI. MPU 30 can execute a highlight process using highlight information HLI in PCI, and execute operation for prohibiting specific user's operations using user control information VOBU_UOP_CTL in PCI_GI, in step S412.

Note that the highlight process includes a process for highlighting a sub-picture frame that bounds selectable items in, e.g., green, and changing that color to red when the user selects an item.

Also, the user's operation prohibition operation includes a process for prohibiting angle switching when the user presses angle key 5ang on remote controller 5 in FIG. 43, and displaying on the TV monitor a mark indicating that the key operation is prohibited.

Upon completion of the process in step ST412, MPU 30 checks if a VOBU still process is to be done (step ST414).

If the VOBU still process is to be done (e.g., the cell playback mode of cell playback information C_PBI in program chain information PGCI is "1") (YES in step ST414), MPU 30 waits until playback of that VOBU ends (step ST416). Since the playback time of one VOBU is around 0.4 to 1.2 sec, this wait time is not so long.

Upon completion of playback of that VOBU, the VOBU still process starts at the end of the playback (step ST418). For example, a frame which appears at the end of the VOBU is played back as a still picture. This still picture is kept played back until the user presses the playback key on the remote controller (FIG. 43) or DVD video recorder main body (FIG. 42).

If the user does not press pause key 5d in step ST414 (NO in step ST414), or if the user presses the playback key during the VOBU still process, MPU 30 checks if the cell is a last one which includes the VOBU (step ST420).

If the cell is not the last one (NO in step ST420), the flow returns to step ST408 to read navigation pack 86 of the next VOBU, thus repeating the processes in steps ST408 to ST420. If the cell is the last one (YES in step ST420), the control waits until playback of the VOBU at that time ends (step ST422).

After that, the control enters a cell still process, and a frame that appears at the end of the cell is played back as a still picture until the time set as a cell still time in program chain information PGCI elapses (step ST424). Upon completion of cell still playback, the control returns to the process shown in FIG. 54.

Figure 58:
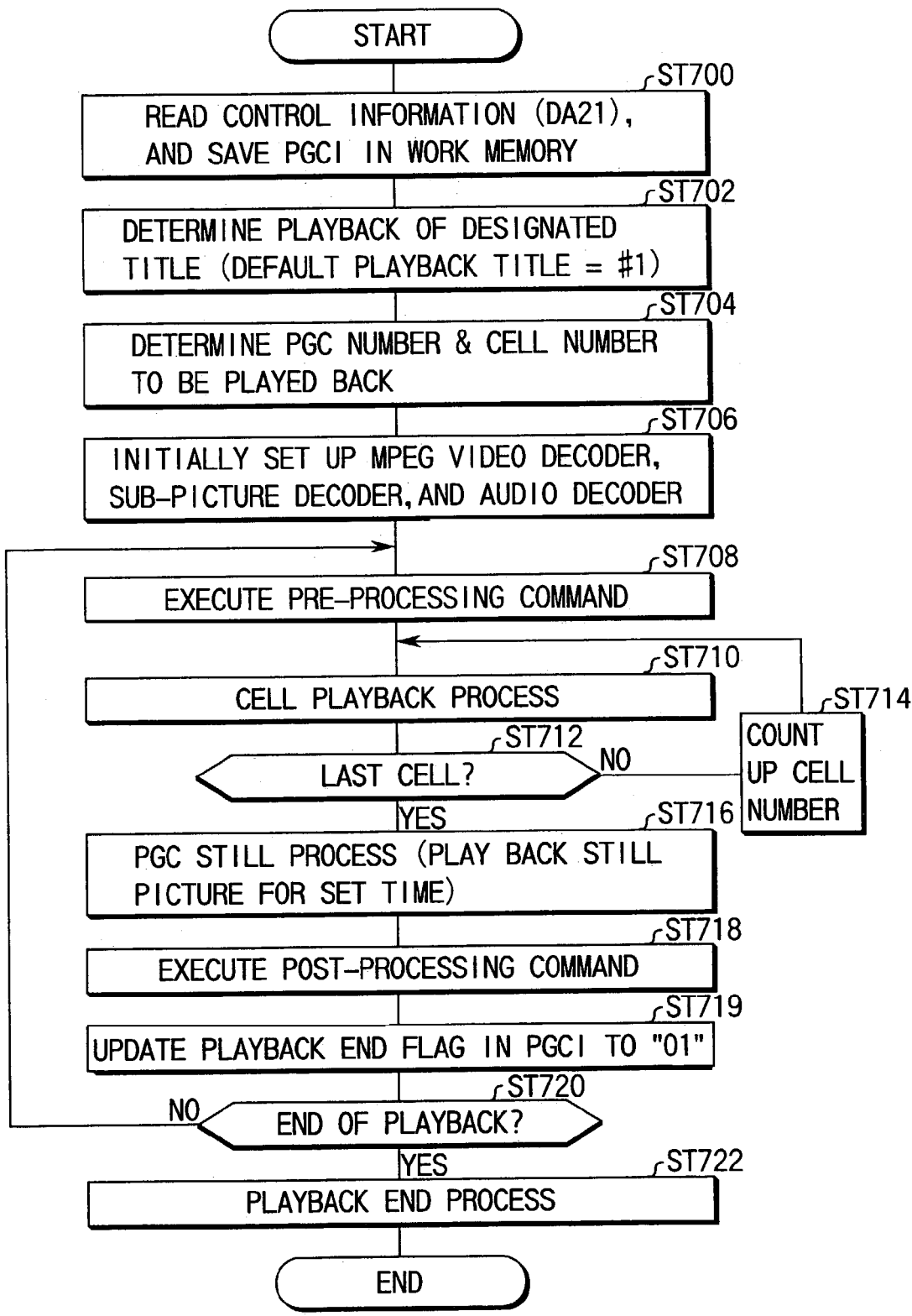
FIG. 58 is a flow chart for explaining another example of the playback operation of the DVD video recorder shown in FIGS. 39 to 41.

FIG. 58 is a flow chart for explaining an example of playback operation of the DVD video recorder shown in FIG. 40 or 41.

Assume that audio/video data are recorded on DVD-RAM disc (or DVD-RW disc) 10 to have the data structure shown in FIGS. 2 to 4. Also, such disc 10 is loaded into disc drive 32 of the DVD video recorder shown in, e.g., FIG. 40, and the playback start key is pressed.

Then, MPU 30 in FIG. 40 reads control information DA21 recorded on disc 10. This control information DA21 records playback control information DA211, as shown in FIG. 3, which stores program chain information table PGCIT. This PGCIT includes one or more pieces of program chain information PGCI (see FIG. 21). MPU 30 saves this program chain information PGCI in its own work memory (step ST700).

MPU 30 then determines playback of a playback title that the user designates using remote controller 5 (step ST702). If the user does not designate any playback title or if only one title is recorded on the audio/video zone, title #1 is determined to be a playback title as a default.

The user may consider this "title" to be the same as video title set VTS shown in FIG. 5. However, MPU 30 recognizes VTS in FIG. 5 and a title (recorded program) recorded on audio/video data area DA2 in FIG. 4 as different ones. More specifically, in a video object set of VTS shown in FIG. 5, each cell is formed by a set of VOBUs including a navigation pack, as shown in FIG. 11. However, in a video object set shown in FIG. 4, each cell is formed by a set of VOBUs without any navigation pack, as shown in FIG. 72.

If playback of the designated title is determined, the program chain number and cell number of the playback title are determined (step ST704). Taking FIG. 27 as an example, PGC# and cell #1 (=cell A in FIG. 26) are determined. The recorded location of cell #1 of PGC#1 on disc 10 can be detected by reading out cell playback information CELL_PLY_INF#1 from PGC information in FIG. 21, and reading out the cell start and end addresses (FIG. 23) contained in that readout information.

After the program chain number and cell number to be played back are determined, MPU 30 in FIG. 40 initially sets up the MPEG video decoder, sub-picture decoder, and audio decoder included in circuit block 600 on the decoder 60 side (step ST706). Upon completion of the initial setups, MPU 30 executes a pre-processing command (step ST708), and starts a process upon cell playback (step ST710). The process upon cell playback is a playback process executed when a video object set does not include any navigation pack, and details of this process will be described later with reference to FIG. 59.

Upon completion of playback of the cell which is being played back by executing the cell playback process in step ST710, it is checked if the playback end cell is the last one in PGC of the title to be played back (step ST712). In the example shown in FIG. 27, since cell #1 is not the last one (NO in step ST712), the cell number is counted up (step ST714), and the playback process of the next cell starts (step ST710). In this case, cell #2 (=cell B in FIG. 26) of PGC#1 is played back. Likewise, the process loop of steps ST710 to ST714 repeats itself until playback of last cell #3 (=cell C in FIG. 26) ends.

Upon completion of playback of the last cell (YES in step ST712), a still process of PGC#1 which was played back so far is executed (step ST716). This PGC still process is a process for playing back one scene of last cell #3 of PGC#1 as a still picture for a predetermined period of time (this time can be arbitrarily determined, but should fall within several min at most).

Upon completion of the PGC still process, MPU 30 executes a post-processing command (step ST718), and then updates the playback end flag (see FIG. 23) in the program chain information that was saved in the work memory in step ST700 to "01" that indicates an end of playback (step ST719).

After that, if the user requests to play back the next program chain (e.g., PGC#2 in FIG. 27) (NO in step ST720), the process loop of steps ST708 to ST720 repeats itself. Upon completion of playback of all cells of PGC#2, the playback end flag (see FIG. 23) of PGC#2 is updated to "01" that indicates an end of playback (step ST719). The same applies to PGC#3 in FIG. 27. (Note that cells C and D partially overlap each other in FIG. 26, and this means that the latter half VOBUs of cell C and the former half VOBUs of cell D are commonly used between cells C and D.)

If the user wants to end playback and turns on the stop key of remote controller 5 in FIG. 43, playback ends (YES in step ST720), and a process upon completion of playback (e.g., letters "STOP" are displayed on display panel 48 of the apparatus main body in FIG. 42, and so forth) is executed (step ST722), thus ending the playback process in FIG. 58.

Figure 59:
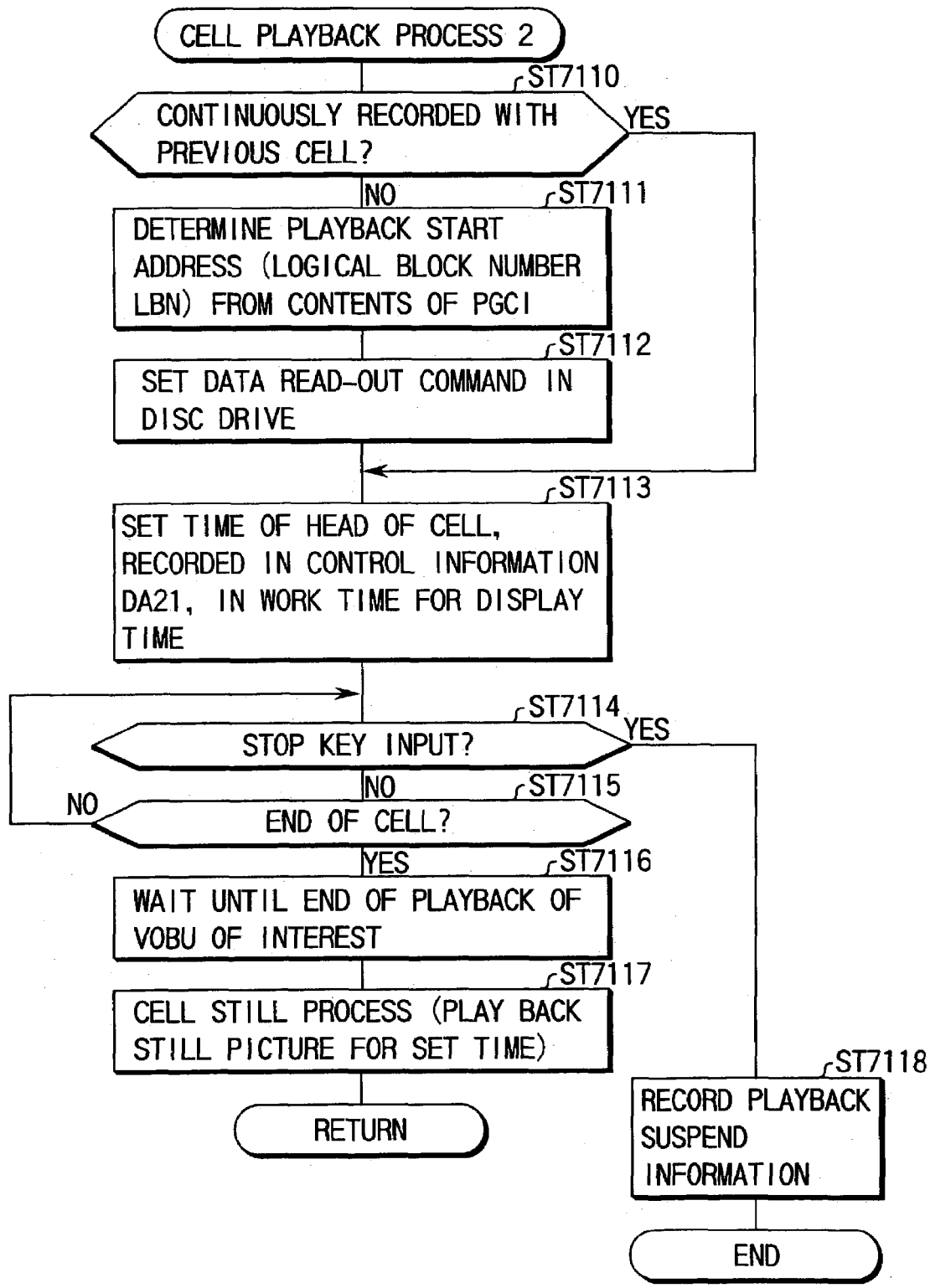
FIG. 59 is a flow chart for explaining the contents of the process ST710 upon cell playback shown in FIG. 58.

FIG. 59 is a flow chart for explaining the contents of process ST710 upon cell playback shown in FIG. 58.

Continuity with a previous cell is checked (step ST7110). When first cell #1 of PGC#1 is played back, since there is no previous cell, no cell continuity is found (NO in step ST7110). In this case, MPU 30 reads out playback information CELL_PLY_INF#1 (FIG. 23) of cell #1 from PGC information (FIG. 21) saved in its own work memory, and determines the start address (more specifically, logical block number LBN) of cell #1 (step ST7111). After the cell playback position is determined in such manner, MPU 30 sets a data read-out command in disc drive 32 (step ST7112). In this manner, cell #1 of PGC#1 begins to be played back from disc 10.

Upon starting cell playback, MPU 30 sets a time (see C_PBTM in FIG. 23) of a cell recorded in control information DA21 in an area named "work TIME" allocated in its own work RAM (step ST7113). ?At the beginning of playback of first cell #1, the contents of this work TIME are set to be, e.g., zero. On the other hand, at the beginning of playback of next cell #2, the contents of work TIME are set to be a value that corresponds to, e.g., the playback time of cell #1.

After that, playback continues to the end of the cell unless the user turns on the stop key of remote controller 5 or apparatus main body 200 (NO in step ST7114).

If the cell which is being played back has reached its end (YES in step ST7115), MPU 30 waits until playback of the last VOBU of that cell ends (step ST7116). Upon completion of playback of this VOBU, a frame that appears at the end of the cell is played back as a still picture (step ST7117). After this still playback is executed for a predetermined period of time, the control returns to the process shown in FIG. 58.

If the user turns on the stop key during cell playback (YES in step ST7114), playback ends at that time, and playback suspend information (information indicating how far the cell played back, or the like) is recorded in the work RAM of MPU 30 (step ST7118), thus ending the playback process.

If the playback process (step ST710) of the next cell is executed after playback of cell #1 has ended (NO in step ST712, step ST714), previous cell #1 and cell #2 to be played back are continuously recorded (YES in step ST7110). In this case, the processes in steps ST7111 and ST7112 are skipped.

Figure 60:
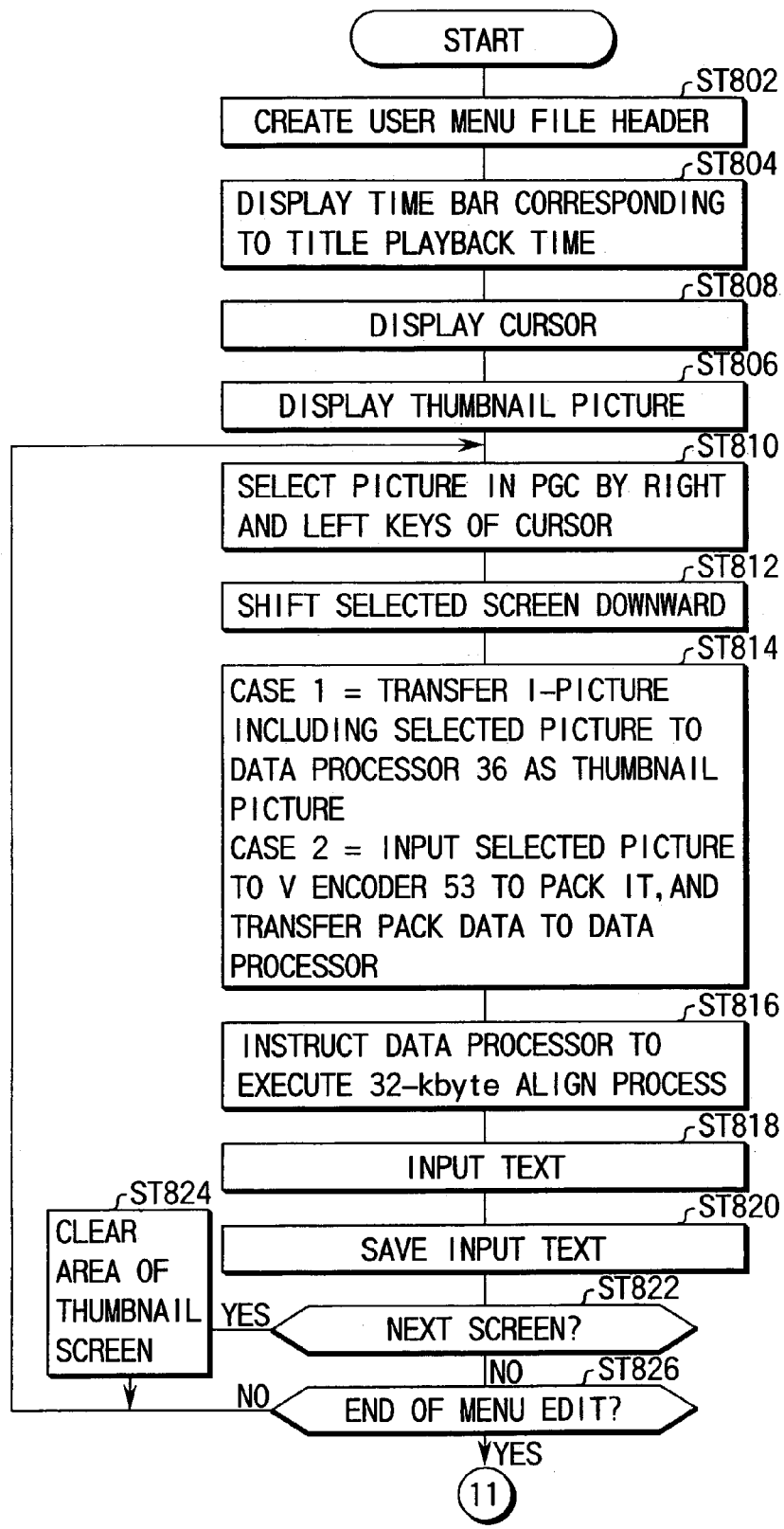
FIG. 60 is a flow chart (part 1) for explaining an example of a process for editing a user menu in the apparatus shown in FIG. 40 or 41.
Figure 61:
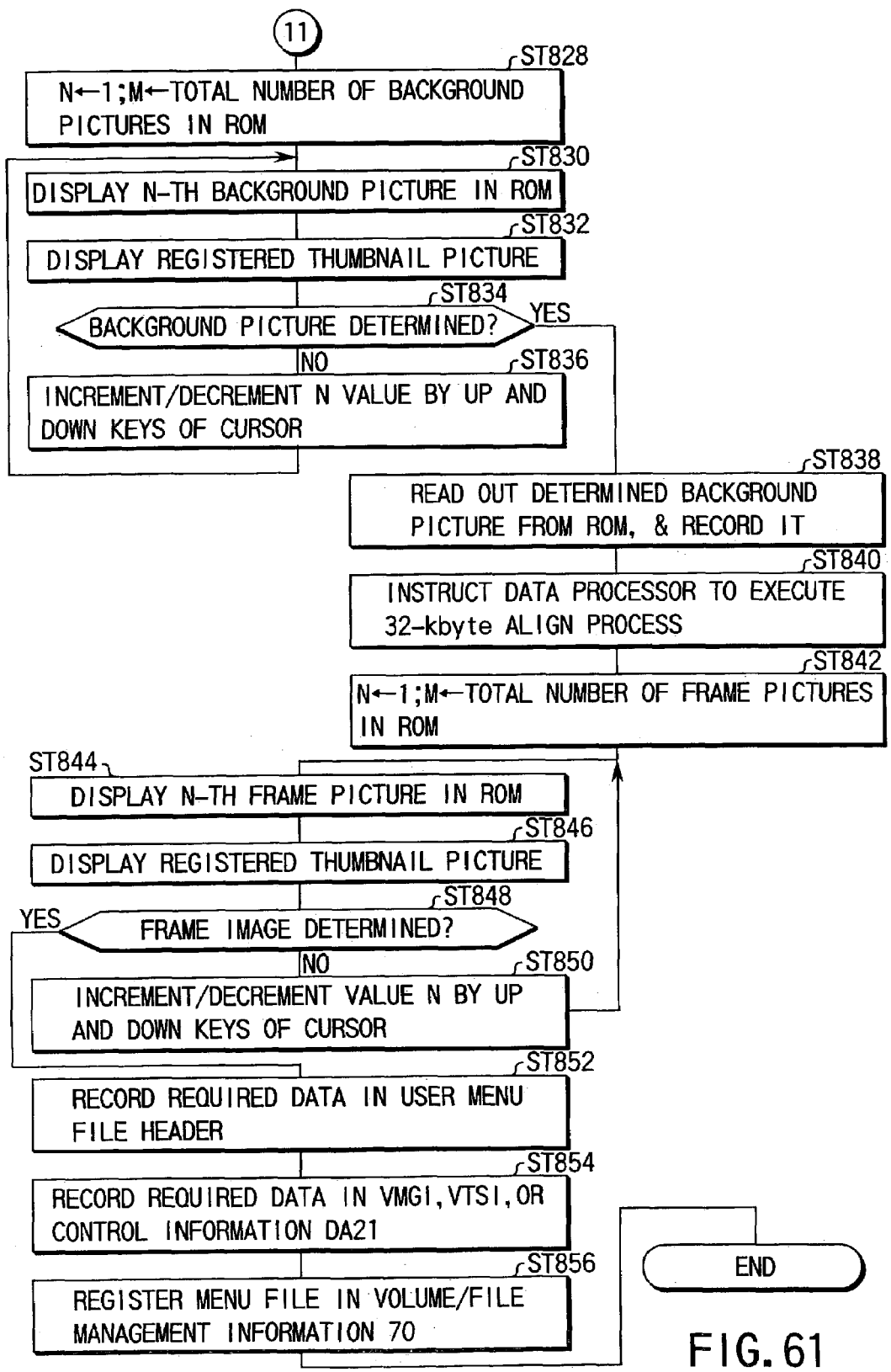
FIG. 61 is a flow chart (part 2) for explaining an example of a process for editing a user menu in the apparatus shown in FIG. 40 or 41.
Figure 71:
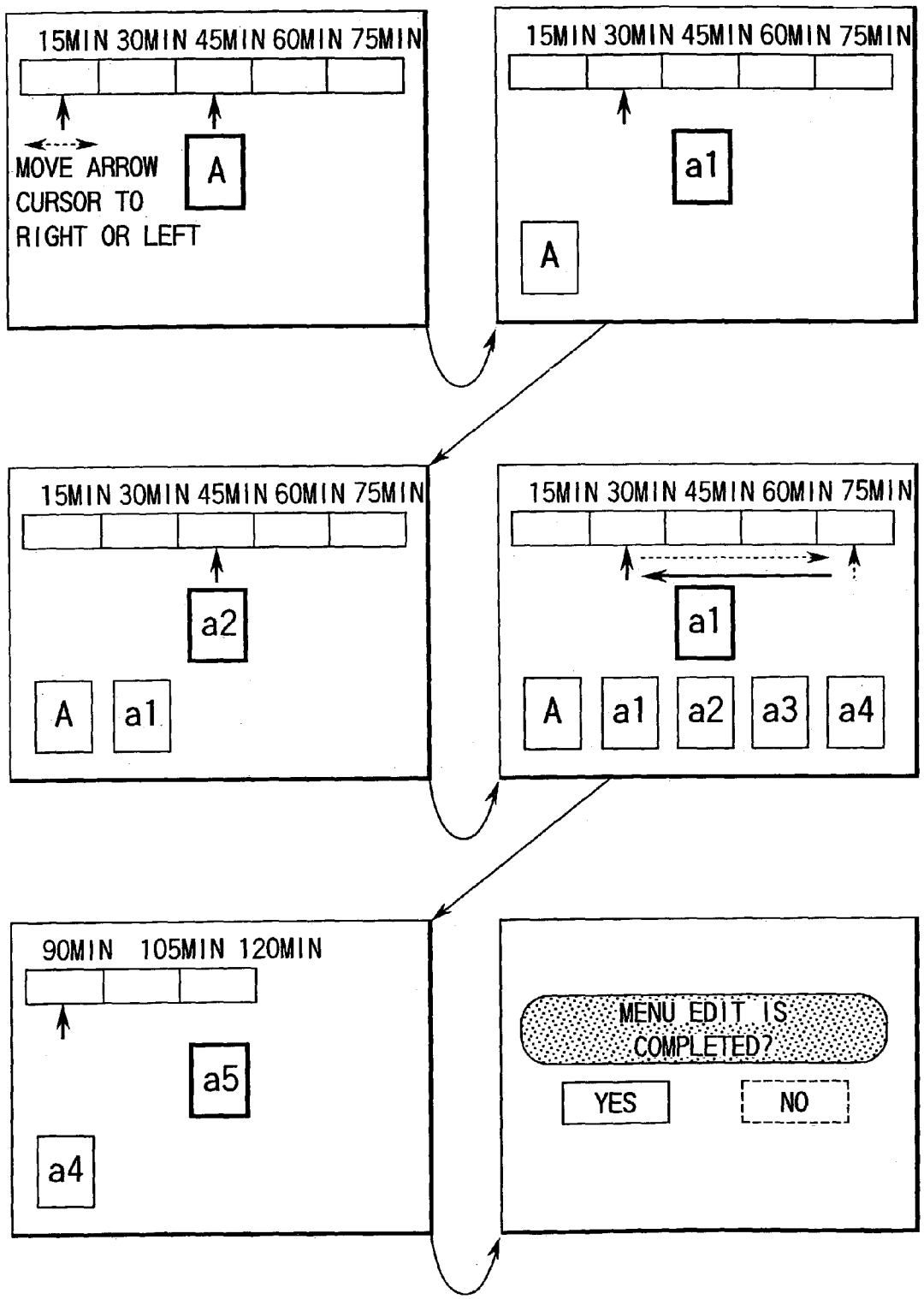
FIG. 71 is a view for explaining an example of edit operation of a user menu (chapter menu)

FIGS. 60 and 61 are flow charts for explaining an example of a process for editing the user menu in the apparatus shown in FIG. 40 or 41. FIG. 71 shows an example of edit operations of the user menu (chapter menu).

When the user presses, e.g., menu edit key 5edt of remote controller 5 in FIG. 43, MPU 30 in FIG. 40 or 41 starts the user menu edit process shown in FIGS. 60 and 61.

When this process starts, MPU 30 creates a header of a user menu file (see FIG. 36) (step ST802). In this header, only data that can be recorded there are created and recorded. (Every time a thumbnail picture for a user menu is registered in a thumbnail picture file, the header data is updated.) Also, a time bar (a character string like 15 min, 30 min . . . . , 75 min exemplified in the uppermost column in FIG. 71, and a sequence of boxes below the character string) corresponding to the playback time of a title, which is to undergo the user menu edit process, is displayed on the monitor screen shown in FIG. 57 (step ST804). In addition, a cursor (upward arrow ↑=time cursor in FIG. 71) for selecting the time position of a screen to be used in the user menu is displayed below the time bar (step ST808). This time cursor can move to the right and left by operating cursor key 5*q* of remote controller 5 shown in FIG. 43.

The user can find a desired picture by moving the time cursor upon operating the cursor key of remote controller 5.

Of the title to be edited, a picture (A in this case) extracted from the time zone pointed by the time cursor is displayed as a thumbnail picture on the monitor screen in FIG. 57 (step ST806).

Figure 69:
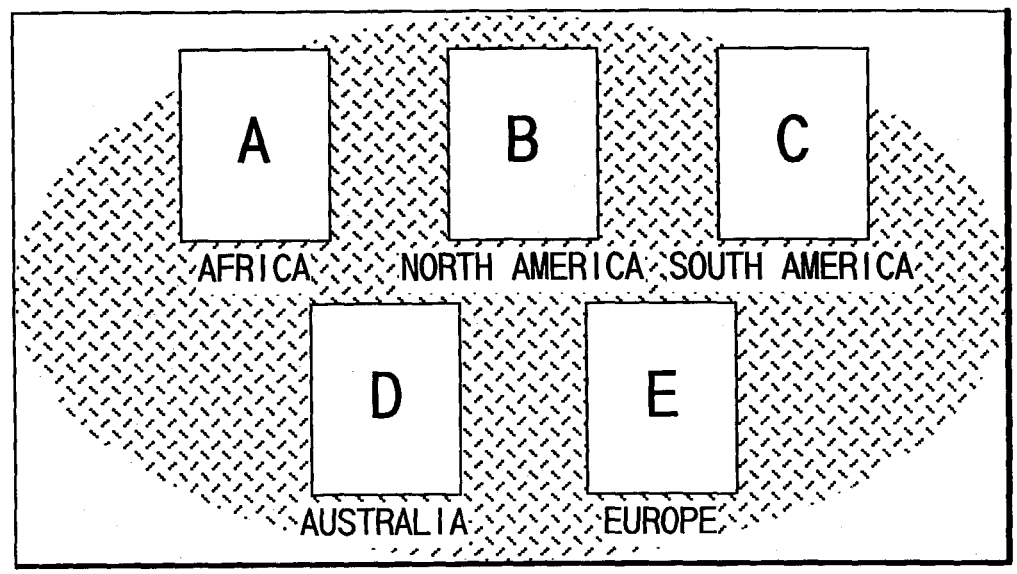
FIG. 69 is a view for explaining an example of a user menu formed by thumbnail pictures (A to E) corresponding to recorded contents.
Figure 70:
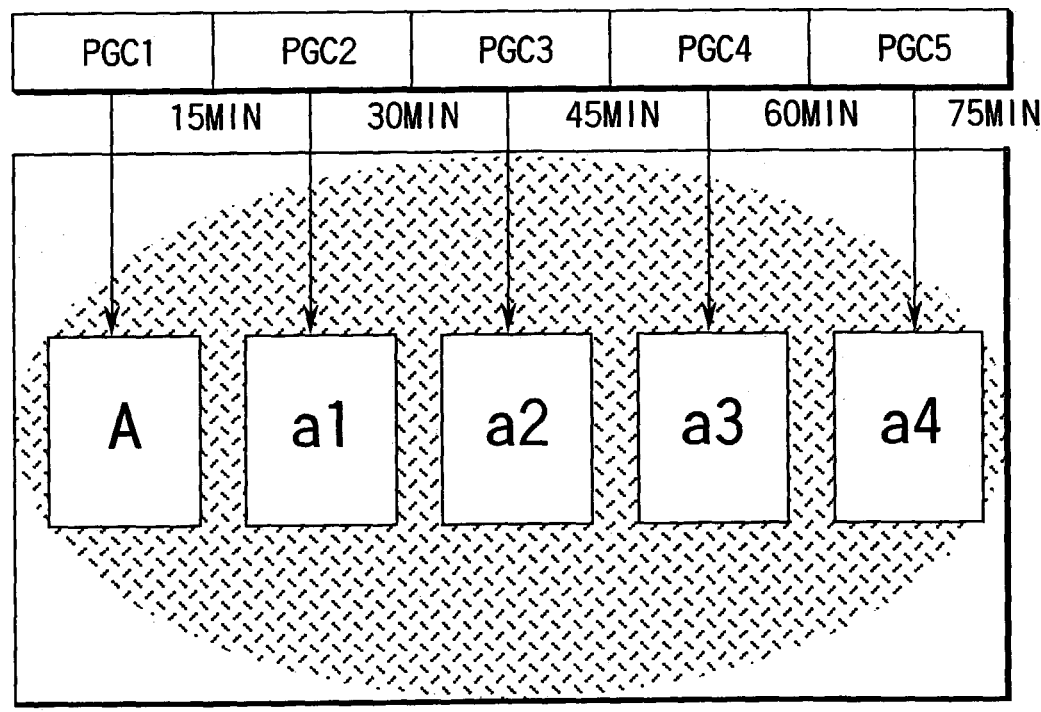
FIG. 70 is a view for explaining the relationship between chapters (corresponding to PGC1 to PGC5) in a specific video-recorded title (A) in FIG. 69, and chapter menus (A, a1 to a4) formed by their thumbnail pictures.

For example, assume that disc 10 to be edited has recorded five titles (five independent programs) A to E, as shown in FIG. 69. Note that title A is a video of natural landscapes in Some African countries, B a video of landscapes in major cities of the North America, C a video of wild animals living on the South American Continent, D a video of various natural landscapes on the Australian Continent, and E a video of landscapes at resort places in European countries.

Assume that title A is selected as a title to be edited. As exemplified in FIG. 70, title A consists of five program chains PGC1 to PGC5. Also, assume that PGC1 contains video scene A that introduces the African Continent including the topography of the overall African Continent, PGC2 video scene a1 that introduces nature in Ethiopia, PGC3 video scene a2 that introduces nature in Etruria, PGC4 video scene a3 that introduces nature in Kenya, and PGC5 video scene a4 that introduces nature in Zaire.

Note that video scene "African Continent" is PGC1, playback of which takes 10 min 15 sec, video scene "Ethiopian nature" a1 is PGC2, playback of which takes 17 min 8 sec, video-scene "Etruscan nature" a2 is PGC3, playback of which takes 38 min 8 sec, video scene "Kenyan nature" a3 is PGC4, playback of which takes 50 min 15 sec, and video scene "Zairian nature" a4 is PGC5, playback of which takes 63 min 32 sec.

When the time cursor displayed in step ST808 in FIG. 60 points to a specific playback time zone of PGC1, picture A extracted from PGC1 in video scene "African Continent" A is displayed as a thumbnail picture at the center of the monitor screen (step ST810) (see the uppermost left screen in FIG. 71).

When the user shifts the time cursor in FIG. 71 to the right by operating the cursor key of remote controller 5 and points to a certain playback time zone of PGC2 (step ST810), picture a1 extracted from video scene "Ethiopian nature" a1 is displayed as a thumbnail picture at the center of the monitor screen (step ST810), and previously displayed picture A of "African Continent" is moved to the lower left position on the screen (step ST812) (see the uppermost right screen in FIG. 71).

In the arrangement shown in FIG. 40, I-picture which includes picture A (selected picture) which has been moved to the lower left position on the screen is transferred to data processor 36, and is saved in temporary storage 34A as a thumbnail picture (step ST814).

On the other hand, in the arrangement shown in FIG. 41, picture A (selected picture) which has been moved to the lower left position on the screen is transferred to and packed by video encoder 53, and the pack data is transferred to data processor 36 and is saved in large-capacity temporary storage 34B (step ST814).

Note that thumbnail pictures A, a1, and the like are generated by thumbnail video encoder 58 upon encoding in the arrangement shown in FIG. 40, or are generated by thumbnail picture generator 64A upon decoding in the arrangement shown in FIG. 41.

Also, information that pertains to the selected picture is saved in the internal work RAM of MPU 30 so as to be recorded in the user menu file header later. At this time, when the display position of the thumbnail picture is also determined, a positioning cursor (not shown) may be displayed to make the user designate the position of the thumbnail picture.

Subsequently, MPU 30 instructs the internal microcomputer (not shown) of data processor 36 to execute the "32-kbyte align" process that has been explained early with reference to FIG. 36 (step ST816).

When text information is to be appended to the selected picture, for example, when text "Africa" is to be appended to picture A, the user inputs text (step ST818). This text input can be implemented by displaying alphabets or kana characters on the monitor screen, and repeating operations for selecting a specific character using the cursor key of remote controller 5 and determining a desired character by the enter key.

The input text information that pertains to the selected picture is saved in the internal work RAM of MPU 30 so as to be recorded in the user menu file header later (step ST820).

User operations in steps ST810 to ST820 repeat themselves until all pictures of desired PGCs are selected. That is, the user shifts the time cursor to point to a certain playback time zone of PGC3 to display picture a1 (see the middle left screen in FIG. 71). Likewise, the user shifts the time cursor to point to certain playback time zones of PGC4 and PGC5 in turn to display pictures a3 and a4 (see the middle right screen in FIG. 71).

If title A "African Continent" contains PGC6 of another video scene, and the user shifts the time cursor to point to a given playback time zone of this PGC5, the user menu screen is switched to the next screen (YES in step ST822). For example, when the user shifts the time cursor to point to a playback time zone from 75 min to 90 min, the thumbnail screen display area of the user menu displayed so far is cleared (step ST824), and new picture a5 of PGC6 is displayed as a thumbnail picture at the center of the screen (see the lower left screen in FIG. 71).

If no next screen is available, or if the user does not move the time cursor to point to the playback time zone of the next screen (NO in step ST822), clearing of the screen in step ST824 is skipped.

Upon completion of all screen selection operations of desired playback time bands, the user inputs the end of the menu edit process (the user selects "YES" on the lower right screen in FIG. 71, and then turns on the enter key of remote controller 5). Then, the menu edit process by the user ends (step ST826).

Upon completion of the menu edit process by the user, a registration process of edited data on disc 10 starts.

More specifically, referring to FIG. 61, "1" is set in index N, and the total number of background pictures stored in the internal ROM of MPU 30 is set in index M (step ST828).

The N-th background picture in the ROM of MPU 30 is displayed (step ST830). This N-th background picture includes all selectable background patterns (see screen example G1 in FIG. 68).

Furthermore, the selected pictures (A, a1, a2, a3, and a4 in the example of FIG. 70) saved in temporary storage 34A or 34B in the processes in steps ST810 to ST826 in FIG. 60 are displayed above the background picture as the registered thumbnail pictures (step ST832). In this state, a request message "select background picture" is presented to the user (see screen example G2 in FIG. 68).

If the user does not determine the type of background picture yet (NO in step ST834), he or she designates a desired one of a plurality of types of displayed background picture patterns by operating the cursor key (or a ten-key pad; not shown) of remote controller 5. In response to this designation, the numerical value of index N set at "1" in step ST828 changes (step ST836). Upon a change in numerical value of index N, the background picture pattern to be displayed changes (see screen example G3 in FIG. 68).

Figure 68:
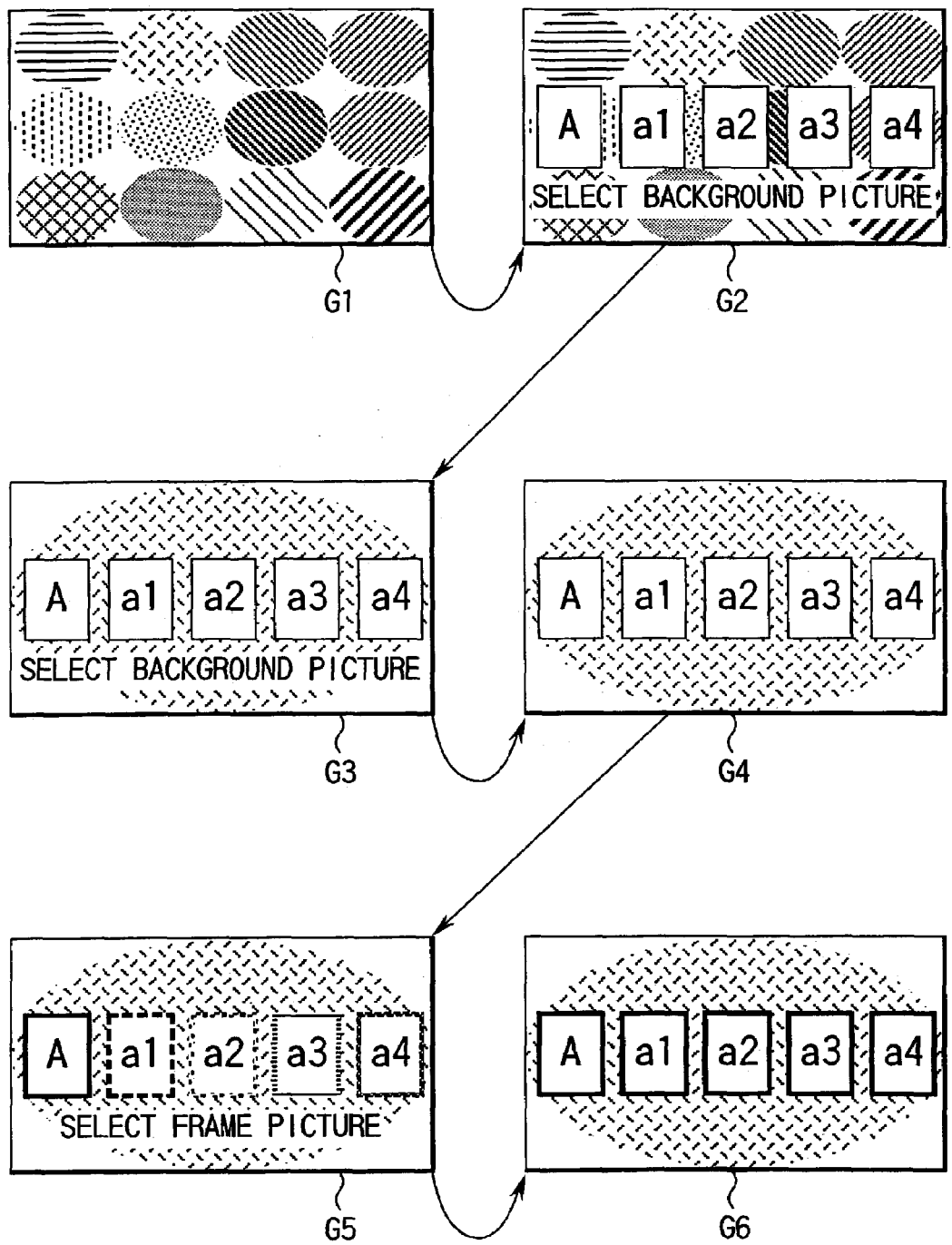
FIG. 68 is a view for explaining an example of operation for selecting a background picture and frame picture of a user menu (chapter menu) in the apparatus shown in FIG. 40 or 41.

When the user turns on the enter key of remote controller 5 while a desired background picture pattern is displayed, the background pattern corresponding to the numerical value of index N at that time is settled as a background picture (YES in step ST834) (see screen example G4 in FIG. 68).

The settled background picture (or its registration number) is read out from the ROM of MPU 30, and is recorded in the user menu file (step ST838). The data of the background picture to be registered undergoes the "32-kbyte align" process as in step ST816 in FIG. 60 (step ST840).

Then, a "frame picture" that fringes the registered thumbnail pictures which form the user menu is selected.

More specifically, "1" is set in index N, and the total number of frame pictures stored in the internal ROM of MPU 30 is set in index M (step ST842).

The N-th frame picture in the ROM of MPU 30 is then displayed (step ST844). This N-th frame picture includes all selectable frame patterns. Within these frame patterns, the selected pictures (A, a1, a2, a3, and a4 in the example of FIG. 70) saved in temporary storage 34A or 34B are displayed as thumbnail pictures. In this state, a request message "select frame picture" is presented to the user (see screen example G5 in FIG. 68).

Note that the frame picture is used to decorate the edges of a thumbnail picture or to show thumbnail pictures in contrast to the background picture.

If the user has not determined the type of frame picture yet (NO in step ST848), he or she designates a desired one of a plurality of types of displayed frame picture patterns by operating the cursor key (or a ten-key pad; not shown) of remote controller 5. In response to this designation, the numerical value of index N set at "1" in step ST842 changes (step ST850). Upon a change in numerical value of index N, the frame picture pattern to be displayed changes.

When the user turns on the enter key of remote controller 5 while a desired frame picture pattern is displayed, the frame pattern corresponding to the numerical value of index N at that time is settled as a frame picture (YES in step ST848). For example, if a solid-line frame of thumbnail picture A is selected, the solid-line frame is used as the frame pattern of thumbnail pictures (see screen example G6 in FIG. 68).

When the thumbnail pictures and frame picture used in the user menu are determined in this way, necessary data are recorded in the header of the user menu file created in step ST802 in FIG. 60 (step ST852).

After that, information (e.g., the user menu flag, main PGC number, display position, and the like in FIG. 18) required for user menu file management is recorded in VMGI, VTSI, or control information DA21 (step ST854).

Finally, the created user menu file is registered in the area of volume/file management information 70 shown in FIGS. 2 to 4 (step ST856), thus ending the process shown in FIG. 61.

Figure 62:
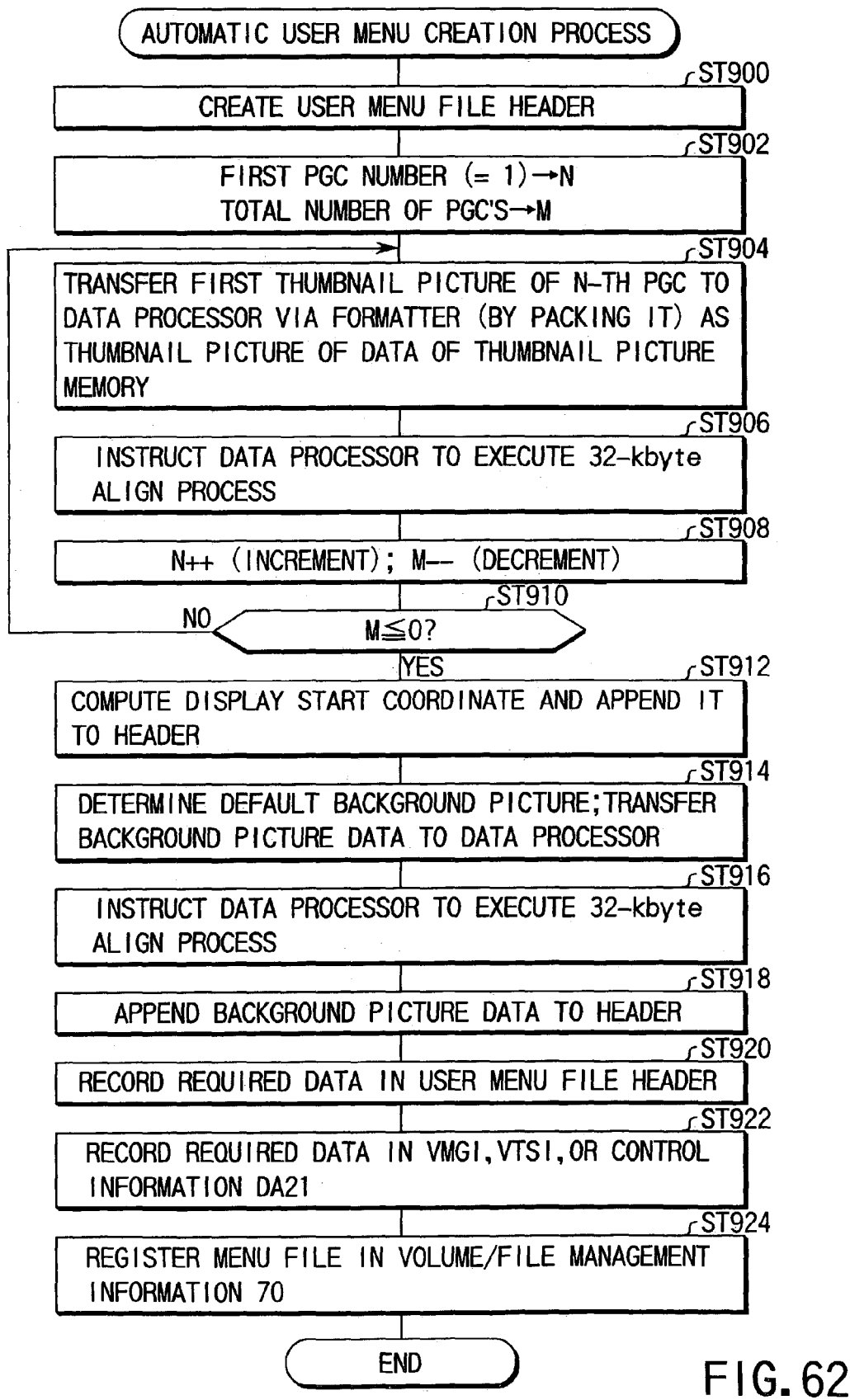
FIG. 62 is a flow chart for explaining an example of a process for automatically creating a user menu file in the apparatus shown in FIG. 40 or 41.

FIG. 62 is a flow chart for explaining an example of the process for automatically creating a user menu file in the apparatus shown in, e.g., FIG. 40. The user menu file automatic creation operation shown in FIG. 62 is executed after the video recording process shown in FIG. 49.

When the user successively presses menu edit key 5edt twice within a short period of time (e.g., within 1 sec) (that is, when the user double-clicks the menu edit key), MPU 30 in FIG. 40 or 41 starts the automatic user menu creation process shown in FIG. 62.

When this process starts, MPU 30 creates a header of a user menu file (see FIG. 36), and records required data therein (step ST900). In this header, only data that can be recorded there are created and recorded. Every time a thumbnail picture for a user menu is registered, the header data is updated.

The total number of program chains PGC that form the title (audio/video data) to be played back is set in index "M", and the first program chain number (=1) is set in index N (step ST902).

Subsequently, the first thumbnail picture of the N-th PGC is packed by formatter 56 as a thumbnail picture of data of a thumbnail picture memory, and is transferred to data processor 36 (step ST904). After that, MPU 30 instructs data processor 36 to execute the "32-kbyte align" process (step ST906).

Index N is incremented by 1, and at the same time, index M is decremented by 1 (step ST908).

If index M is larger than zero (NO in step ST910), the process loop of steps ST904 to ST908 repeats itself until index M becomes zero.

If index M has been decremented to zero (YES in step ST910), i.e., if all thumbnail pictures have been transferred, the display start coordinates (X- and Y-coordinates) of thumbnail pictures obtained by the repetitive processes in steps ST904 to ST908 are computed, and are additionally described in the header file created in step ST900 (step ST912). The display start coordinates are computed so that the display positions of thumbnail pictures do not overlap each other.

Then, a default background picture of the user menu is determined, and data of that background picture is transferred to data processor 36 (step ST914). Assume that the background picture data is saved in the internal ROM of MPU 30 after it is compressed by MPEG2 and is packed. After transfer of this background picture data, MPU 30 instructs data processor 36 to execute the aforementioned "32-kbyte align" process (step ST916).

After that, the background picture data is added to the header created in step ST900 (step ST918), and required data are also recorded in this header (step ST920).

Necessary data (user menu flag, main PGC number, display position, and the like) are recorded in management information (VMGI or VTSI) or control information DA21 (step ST922), and the automatically created menu file is registered in volume/file management information 70 (step ST924).

Upon determining the background picture (and/or frame picture) of the user menu, it (they) may be selected in accordance with the type of thumbnail picture.

For example, a method of selecting a background picture in correspondence with the brightness of a thumbnail picture to be displayed may be used. More specifically, pictures having stepwise different luminance levels (brightest picture, bright picture, normal picture, dark picture, darkest picture, and the like) are prepared in a background picture pattern ROM in MPU 30. Upon playback, the average of the luminance levels of all the thumbnail pictures to be displayed is computed. If the average luminance is high, a picture is selected from dark background pictures; if the average luminance is high, a picture is selected from bright background pictures.

Alternatively, a method of selecting a background picture in correspondence with the hue of a thumbnail picture to be displayed may be used. More specifically, pictures with different hues (reddish picture, bluish picture, greenish picture, whitish picture, blackish picture, and so forth) are prepared in a background picture pattern ROM in MPU 30. Upon playback, the average of the hues of all thumbnail pictures to be displayed is computed. If the average hue indicates red, a picture is selected from blue background pictures; if the average hue indicates blue, a picture is selected from red background pictures; if the average hue indicates white, a picture is selected from black background pictures; and if the average hue indicates green, a picture is selected from red background pictures.

Figure 63:
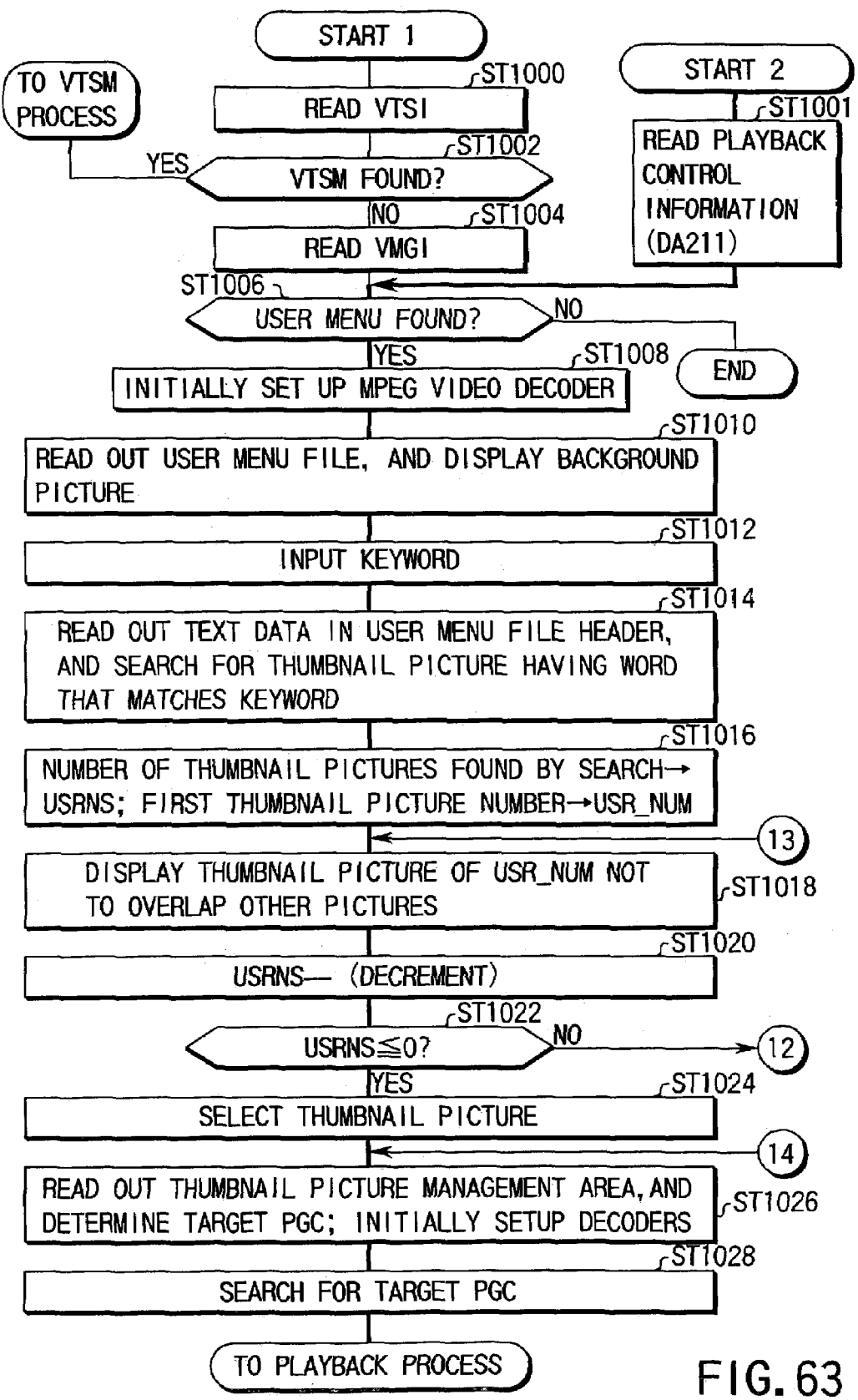
FIG. 63 is a flow chart (part 1) for explaining an example of a process for searching a user menu in the apparatus shown in FIG. 40 or 41.
Figure 64:
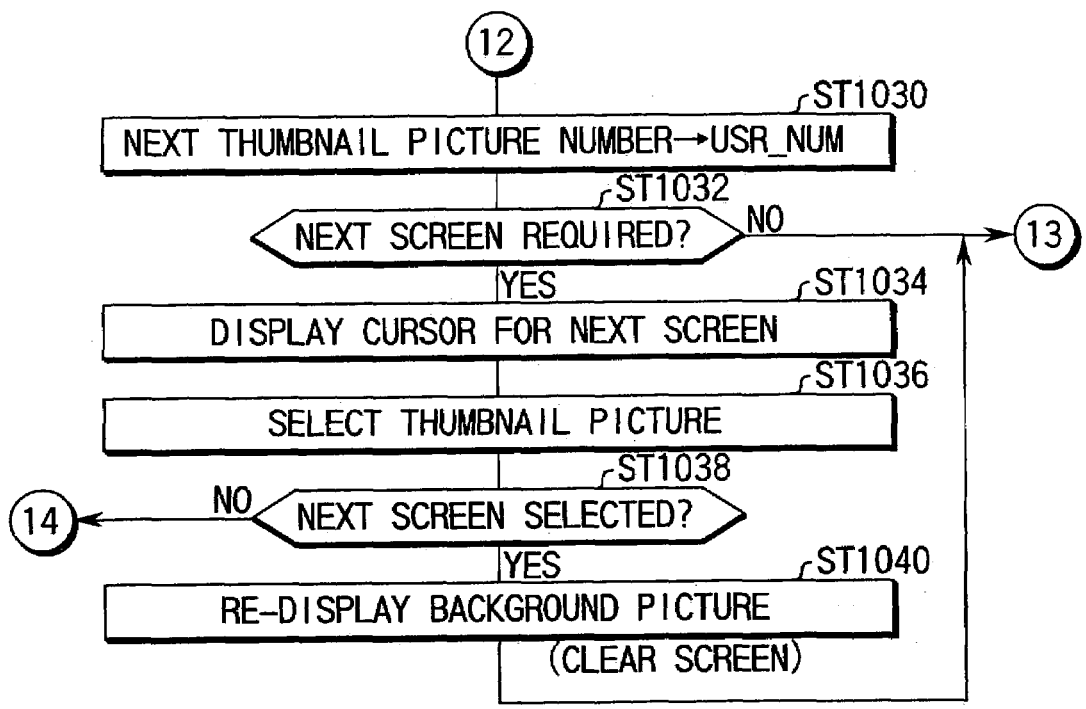
FIG. 64 is a flow chart (part 2) for explaining an example of a process for searching a user menu in the apparatus shown in FIG. 40 or 41.

FIGS. 63 and 64 are flow charts for explaining an example of the process for searching the user menu in the apparatus shown in FIG. 40 or 41.

Upon depression of menu key 5n of remote controller 5 shown in FIG. 43, a menu search is conducted.

If disc 10 loaded in disc drive 32 at that time is a DVD-R having the data structure shown in FIG. 5 (start 1 in FIG. 63), MPU 30 reads VTSI (step ST1000). If VTSI includes VTSM (YES in step ST1002), the flow advances to a VTSM process. If no VTSM is available (NO in step ST1002), MPU 30 reads VMGI (step ST1004).

On the other hand, if disc 10 loaded in disc drive 32 is a DVD-RAM or DVD-RW having the data structure shown in FIGS. 2 to 4 (start 2 in FIG. 63), MPU 30 reads playback control information DA211 (FIG. 3) (step ST1001).

If the management table (FIG. 15) of the read VMGI includes user menu flag="01" (YES in step ST1006), or if the management table (FIG. 18) of read playback control information DA211 includes user menu flag="01" (YES in step ST1006), initial setups of MPEG video recorder 64 are done (step ST1008).

Subsequently, the user menu file created in the process shown in FIGS. 60 and 61 or FIG. 62 is read out, and the background picture is displayed (step ST1010).

In this state, the user inputs a keyword (e.g., "Africa") by operating keys on remote controller 5 (step ST1012). MPU 30 then reads out text data in the user menu file header, and searches for a thumbnail picture appended with the same word as the input keyword ("Africa") (step ST1014).

MPU 30 sets the number of thumbnail pictures found as a result of the search in index "USRNS", and sets the first thumbnail picture number in parameter "USR_NUM" (step ST1016).

Then, a thumbnail picture designated by "USR_NUM" is displayed not to overlap other thumbnail pictures (step ST1018). After that, index "USRNS" is decremented (step ST1020). If decremented index "USRNS" becomes zero (YES in step S1022), the user selects a desired one (e.g., Kenya on the African Continent) of the displayed thumbnail pictures (step ST1024).

If a specific thumbnail picture (e.g., Kenya) is selected, MPU 30 reads out the contents of the thumbnail picture management area (FIG. 36) to determine a target PGC, and initially sets up the respective decoders (step ST1026). Then, MPU 30 searches for a target PGC (e.g., a program that has recorded landscapes in Kenya) (step ST1028), and plays that PGC back if it is found.

If it is determined in step ST1022 that decremented index "USRNS" is larger than zero (NO in step ST1022), the flow jumps to step ST1030 in FIG. 64.

The next thumbnail picture number is set in parameter "USR_NUM" (step ST1030). If the next screen is not required (NO in step ST1032), the flow returns to step ST1018 in FIG. 63. Whether or not the next screen is required is determined by checking if a plurality of thumbnail pictures can be displayed without overlapping each other.

If the next screen including another thumbnail picture is required (YES in step ST1032), a cursor display for the next screen is made (step ST1034), and the user selects a desired thumbnail picture from that display (step ST1036). If the next screen need not be selected (NO in step ST1038), the flow returns to step ST1026 in FIG. 63.

If the next screen is selected-(YES in step ST1038), the screen is cleared, and the background picture is re-displayed (step ST1040). The flow then returns to step ST1018 in FIG. 63.

Figure 65:
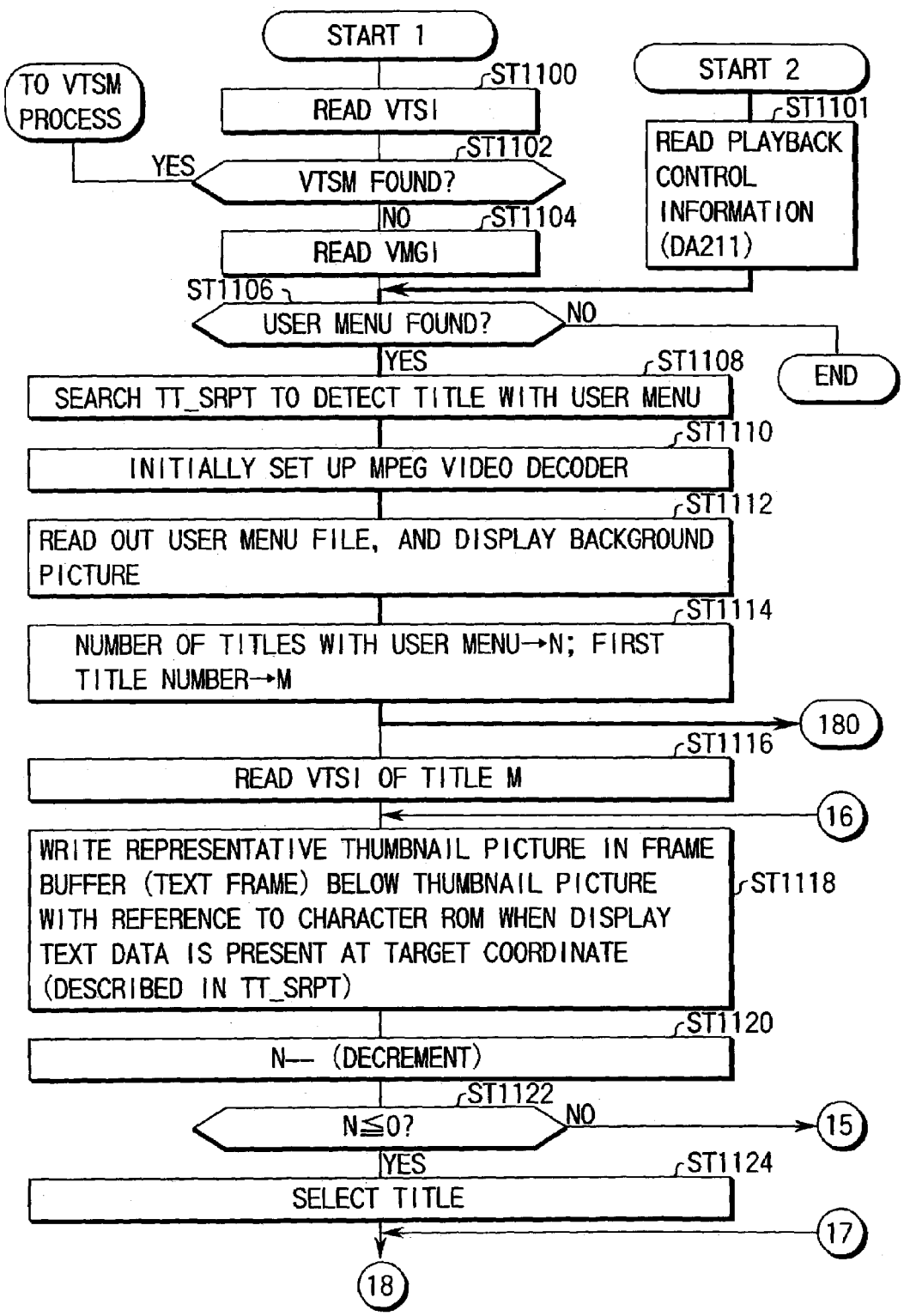
FIG. 65 is a flow chart (part 1) for explaining an example of a process for playing back a user menu in the apparatus shown in FIG. 40 or 41.
Figure 66:
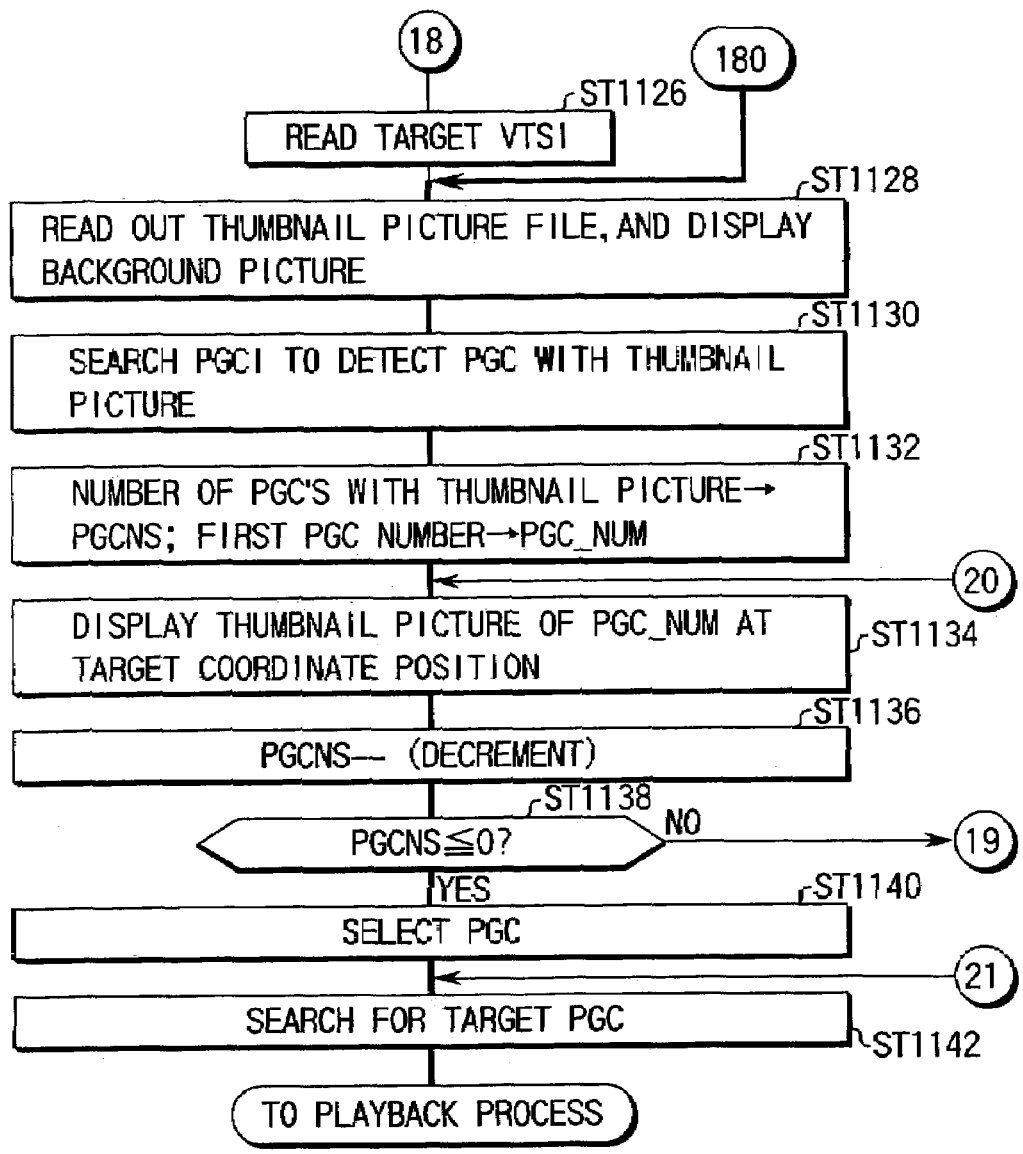
FIG. 66 is a flow chart (part 2) for explaining an example of a process for playing back a user menu in the apparatus shown in FIG. 40 or 41.
Figure 67:
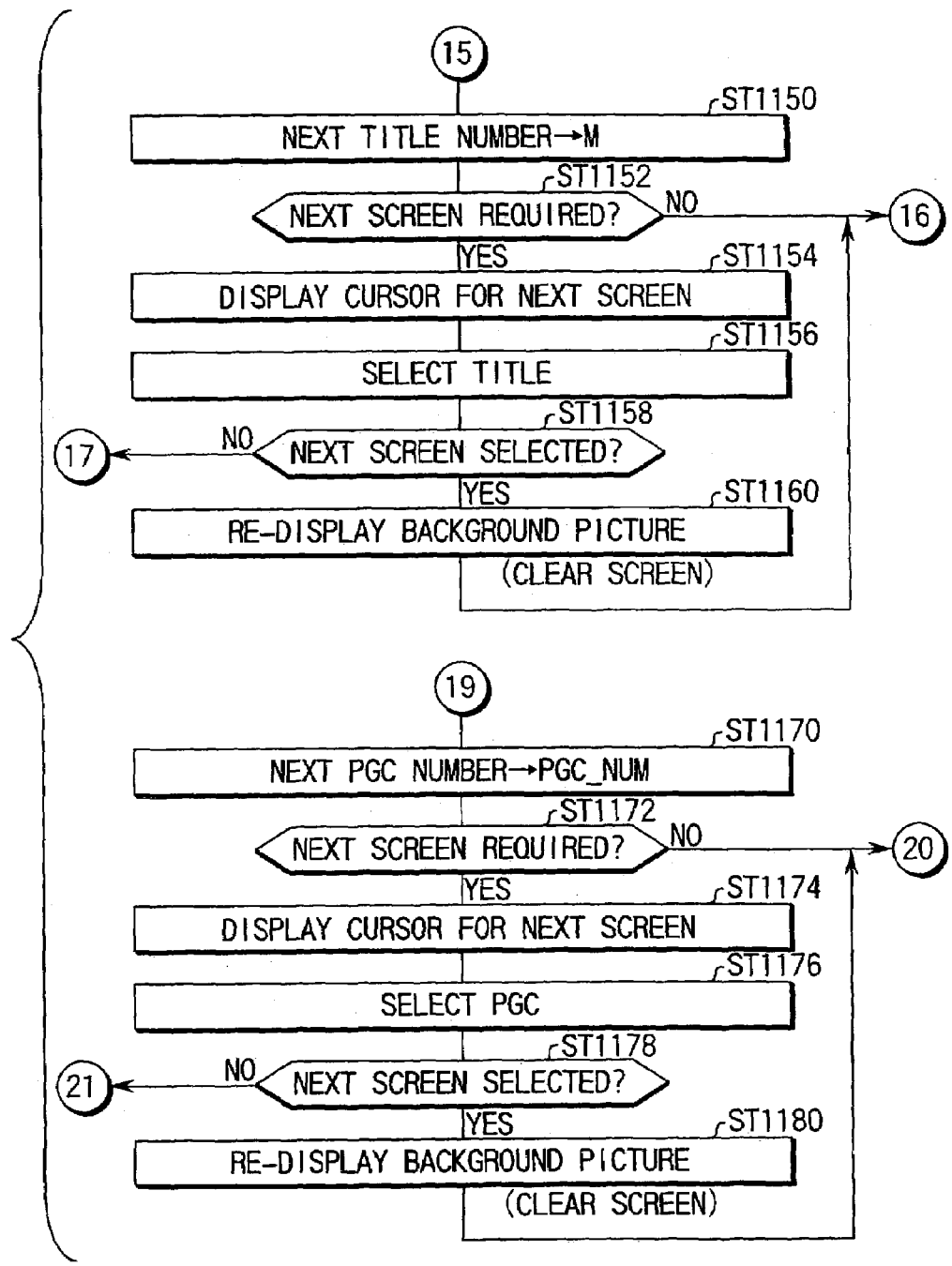
FIG. 67 is a flow chart (part 3) for explaining an example of a process for playing back a user menu in the apparatus shown in FIG. 40 or 41.

FIGS. 65 to 67 are flow charts for explaining an example of the process for playing back the user menu in the apparatus shown in FIG. 40 or 41.

Upon depression of menu key 5n of remote controller 5 shown in FIG. 43, a menu search is conducted.

If disc 10 loaded in disc drive 32 at that time is a DVD-R having the data structure shown in FIG. 5 (start 1 in FIG. 65), MPU 30 reads VTSI (step ST1100). If VTSI includes VTSM (YES in step ST1102), the flow advances to a VTSM process. If no VTSM is available (NO in step ST1102), MPU 30 reads VMGI (step ST1104).

On the other hand, if disc 10 loaded in disc drive 32 is a DVD-RAM or DVD-RW having the data structure shown in FIGS. 2 to 4 (start 2 in FIG. 65), MPU 30 reads playback control information DA211 (FIG. 3) (step ST1101).

If the management table (FIG. 15) of the read VMGI includes user menu flag="01" (YES in step ST1106), or if the management table (FIG. 18) of read playback control information DA211 includes user menu flag="01" (YES in step ST1106), MPU 30 searches title search pointer table TT_SRPT (FIG. 16) for titles including the user menus (step ST1108). After that, initial setups of MPEG video decoder 64 are done (step ST1110).

Subsequently, the user menu file created in the process shown in FIGS. 60 and 61 or FIG. 62 is read out, and the background picture is displayed (step ST1112).

MPU 30 then sets the number of titles including the user menus in index "N", and sets the first title number in parameter "M" (step ST1114).

In this case, if this process started from "start 2", the flow jumps to step ST1128 in FIG. 66. On the other hand, if this process started from "start 1", VTSI of title number "M" is read (step ST1116).

If display text data is present at a target coordinate position (display position at the byte positions "19 to 22" in FIG. 16) described in title search pointer table TT_SRPT, MPU 30 writes a representative thumbnail image corresponding to the display text data in a frame buffer below the thumbnail image on the basis of that text data with reference to its internal character ROM (step ST1118).

Index "N" is then decremented (step ST1120). If index "N" becomes zero (YES in step ST1122), a title is selected at that time (step ST1124). After that, the flow jumps to step ST1126 in FIG. 66. If index "N" is larger than zero (NO in step ST1122), the flow jumps to step ST1150 in FIG. 67.

If a given title is selected in step ST1124 in FIG. 65, target VTSI is read (step ST1126) in FIG. 66.

The thumbnail picture file is read out, and the background picture is displayed (step ST1128). PGCI is searched for PGCs having thumbnail pictures (step ST1130).

The number of PGCs having thumbnail pictures is set in index "PGCNS", and the first PGC number is set in parameter "PGC NUM" (step ST1132).

The thumbnail picture designated by parameter "PGC_NUM" set in this manner is displayed at the target coordinate position (described in TT_SRPT) (not to overlap other pictures) (step ST1134), and index PGCNS" is decremented (step ST1136). If decremented index "PGCNS" is larger than zero (NO in step ST1138), the flow jumps to step ST1170 in FIG. 67.

If decremented index "PGCNS" becomes zero (YES in step ST1138), PGC at that time is selected (step ST1140), and a target PGC is searched (step ST1142), thus starting the playback process of that PGC.

If it is determined in step ST1122 in FIG. 65 that decremented index "N" is larger than zero (NO in step ST1122), the flow jumps to step ST1150 in FIG. 67.

The next title number is set in parameter "M" (step ST1150). If the next screen is not required (NO in step ST1152), the flow returns to step ST1118 in FIG. 65.

If the next screen is required (YES in step ST1152), a cursor display for the next screen is made (step ST1154), and the user selects a desired title from that display (step ST1156). If the next screen need not be selected (NO in step ST1158), the flow returns to step ST1124 in FIG. 65.

If the next screen is selected (YES in step ST1158), the screen is cleared, and the background picture is re-displayed (step ST1160). The flow then returns to step ST1118 in FIG. 65.

If it is determined in step ST1138 in FIG. 66 that decremented index "PGCNS" is larger than zero (NO in step ST1138), the flow jumps to step ST1170 in FIG. 67.

The next title number is set in parameter "PGC_NUM" (step ST1170). If the next screen is not required (NO in step ST1172), the flow returns to step ST1134 in FIG. 66.

If the next screen is required (YES in step ST1172), a cursor display for the next screen is made (step ST1174), and the user selects a desired PGC from that display (step ST1176). If the next screen need not be selected (NO in step ST1178), the flow returns to step ST1142 in FIG. 66.

If the next screen is selected (YES in step ST1178), the screen is cleared, and the background picture is re-displayed (step ST1180). The flow then returns to step ST1134 in FIG. 66.

Note that remote controller 5 in FIG. 43 has menu key 5*n* and title key 5*p*. Title key 5*p* can be used to call a title menu (VMGM), and menu key 5*n* can be used to call a root menu (VTSM). From the root menu, an audio switching menu, sub-picture switching menu, part-of-title PTT menu (chapter menu), and the like can be selected. Note that VTSM is defined as a menu that the provider can freely produce.

On the other hand, in the DVD video recorder that can record and play back data, since a normal user records video, neither VMGM nor VTSM are normally set unlike a DVD-video ROM. Hence, in the embodiment shown in FIGS. 65 to 67, the user menu is displayed as one of the menu key processes, and if no VTSM is recorded on the disc, the user menu file operation is made.

Various embodiments have been explained. However, the embodiments of the present application also disclose auxiliary contents other than items indispensable to the present invention. More specifically, which of various building components in the plurality of embodiments disclosed in the present application are to be selected to constitute the invention (apparatus, method, system) is determined case by case. The determination result is reflected in the appended claims, and the contents of the appended claims need not always include all building components disclosed in the embodiments.

As described above, according to the present invention, the user can relatively easily create a visual menu used in search for recorded contents and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer-readable medium encoded with a computer program, said medium comprising:
   a data area configured to store video data; and
   a management area configured to store control information, the control information including:
      program chain information associated with one of a plurality of program chains, said program chain information describing an order of reproduction of individual cells, plural cells of the cells being able to form a program, another one of the program chains being able to be identified by a representative picture, and
      a table including at least one representative picture relating information, the representative picture relating information including,
         information corresponding to a portion of said another one of the program chains, said representative picture identifying said another one of the program chains, and
         information corresponding to a location of said representative picture in said data area, the location information including time information or address information, wherein,
   said representative picture is a picture included in said video data, and
   a portion of said one of the program chains and another portion of said another one of the program chains are configured to refer to a same portion of the video data.

2. A method of recording information on an information medium including,
   a data area configured to store video data, and
   a management area configured to store control information, the control information including:
      program chain information associated with one of a plurality of program chains, said program chain information describing an order of reproduction of individual cells, plural cells of the cells being able to form a program, another one of the program chains being able to be identified by a representative picture, and
      a table including at least one representative picture relating information, the representative picture relating information including,
         information corresponding to a portion of said another one of the program chains, said representative picture identifying said another one of the program chains, and information corresponding to a location of said representative picture in said data area, the location information including time information or address information, wherein, said representative picture is a picture included in said video data, and a portion of said one of the program chains and another portion of said another one of the program chains are configured to refer to a same portion of the video data, said method comprising:

recording said video data in said data area; and recording said control information in said management area.

3. An information recording apparatus for recording information on an information medium including, a data area configured to store video data, and a management area configured to store control information, the control information including:

program chain information associated with one of a plurality of program chains, said program chain information describing an order of reproduction of individual cells, plural cells of the cells being able to form a program, another one of the program chains being able to be identified by a representative picture, and a table including at least one representative picture relating information, the representative picture relating information including, information corresponding to a portion of said another one of the program chains, said representative picture identifying said another one of the program chains, and information corresponding to a location of said representative picture in said data area, the location information including time information or address information, wherein, said representative picture is a picture included in said video data, and a portion of said one of the program chains and another portion of said another one of the program chains are configured to refer to a same portion of the video data, said information recording apparatus comprising:

a first recorder configured to record video data in said data area; and a second recorder configured to record said control information in said management area.

4. A method of reproducing recorded information from an information medium including, a data area including video data, and a management area including control information, the control information including:

program chain information associated with one of a plurality of program chains, said program chain information describing an order of reproduction of individual cells, plural cells of the cells being able to form a program, another one of the program chains being able to be identified by a representative picture, and a table including at least one representative picture relating information, the representative picture relating information including, information corresponding to a portion of said another one of the program chains, said representative picture identifying said another one of the program chains, and information corresponding to a location of said representative picture in said data area, the location information including time information or address information, wherein, said representative picture is a picture included in said video data, and a portion of said one of the program chains and another portion of said another one of the program chains are configured to refer to a same portion of the video data, said method comprising:

reproducing control information from said management area; and reproducing video data from said data area.

5. An apparatus for reproducing recorded information from an information medium including, a data area including video data, and a management area including control information, the control information including:

program chain information associated with one of a plurality of program chains, said program chain information describing an order of reproduction of individual cells, plural cells of the cells being able to form a program, another one of the program chains being able to be identified by a representative picture, and a table including at least one representative picture relating information, the representative picture relating information including, information corresponding to a portion of said another one of the program chains, said representative picture identifying said another one of the program chains, and information corresponding to a location of said representative picture in said data area, the location information including time information or address information, wherein, said representative picture is a picture included in said video data, and a portion of said one of the program chains and another portion of said another one of the program chains are configured to refer to a same portion of the video data, said apparatus comprising:

a first reproducer configured to reproduce said control information from said management area; and a second reproducer configured to reproduce said video data from said data area.

* * * * *